US009453985B2

(12) United States Patent
Sato et al.

(10) Patent No.: US 9,453,985 B2
(45) Date of Patent: Sep. 27, 2016

(54) MIRROR DRIVING DEVICE

(71) Applicant: CANON KABUSHIKI KAISHA, Tokyo (JP)

(72) Inventors: Kei Sato, Kawasaki (JP); Kentaro Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 86 days.

(21) Appl. No.: 14/301,874

(22) Filed: Jun. 11, 2014

(65) Prior Publication Data

US 2014/0368941 A1    Dec. 18, 2014

(30) Foreign Application Priority Data

Jun. 13, 2013 (JP) .................. 2013-125067
Jun. 13, 2013 (JP) .................. 2013-125068
Mar. 3, 2014 (JP) .................. 2014-040965

(51) Int. Cl.
*G02B 7/182* (2006.01)
*G03B 19/12* (2006.01)

(52) U.S. Cl.
CPC ........... *G02B 7/1821* (2013.01); *G02B 7/1827* (2013.01); *G03B 19/12* (2013.01)

(58) Field of Classification Search
CPC .............. G02B 7/182; G02B 7/1821–7/1822; G02B 7/1824–7/1825; G02B 7/1827–7/1828; G02B 7/198; G02B 5/005; G02B 5/02; G02B 5/08; B60R 1/072; G03B 19/12; G03B 17/17; G03B 2205/0069; G03B 17/425; G03B 7/10; G03B 7/085; G03B 7/095; G03B 7/09971
USPC ......... 359/877, 358, 871–872; 396/257, 358, 396/505, 259–260, 351–352, 354, 447
See application file for complete search history.

(56) References Cited

FOREIGN PATENT DOCUMENTS

| JP | 11-95317 A | 4/1999 |
| JP | 2010-44271 A | 2/2010 |
| JP | 2010181494 A | * 8/2010 |

* cited by examiner

*Primary Examiner* — Scott J Sugarman
*Assistant Examiner* — Ibrahima Diedhiou
(74) *Attorney, Agent, or Firm* — Canon U.S.A., Inc. IP Division

(57) ABSTRACT

A mirror driving device includes a lead screw configured to be driven by a drive source, a mirror member configured to be movable between a mirror-down position and a mirror-up position, a mirror driving member configured to rectilinearly move to drive the mirror member between the mirror-down position and the mirror-up position, and a restriction unit configured to switch between a restriction state that restricts a rectilinear movement of the mirror driving member and a restriction release state that releases the restriction state. The restriction unit switches between the restriction state and the restriction release state without allowing the mirror driving member to rectilinearly move when the mirror member is in the mirror-up position or the mirror-down position, and the mirror driving member rectilinearly moves in conjunction with driving of the lead screw after the restriction unit switches from the restriction state to the restriction release state.

13 Claims, 57 Drawing Sheets

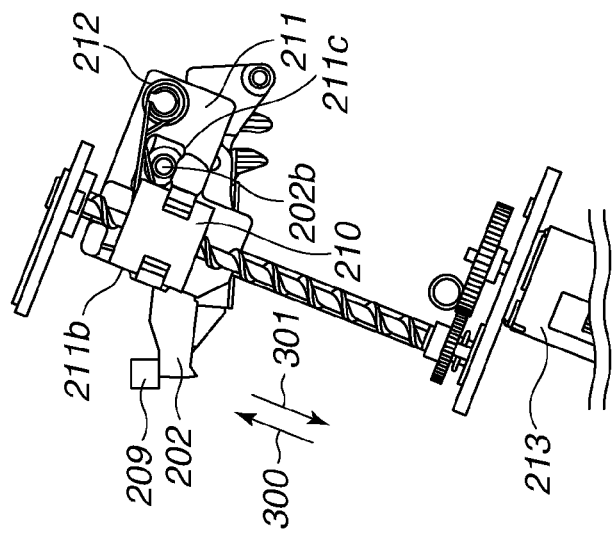
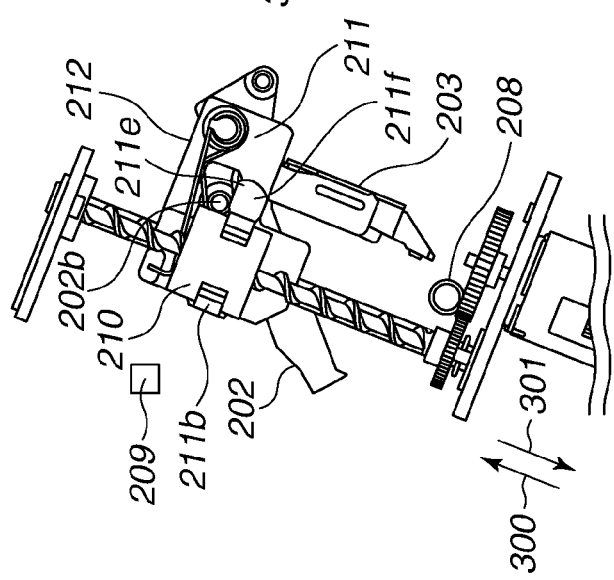
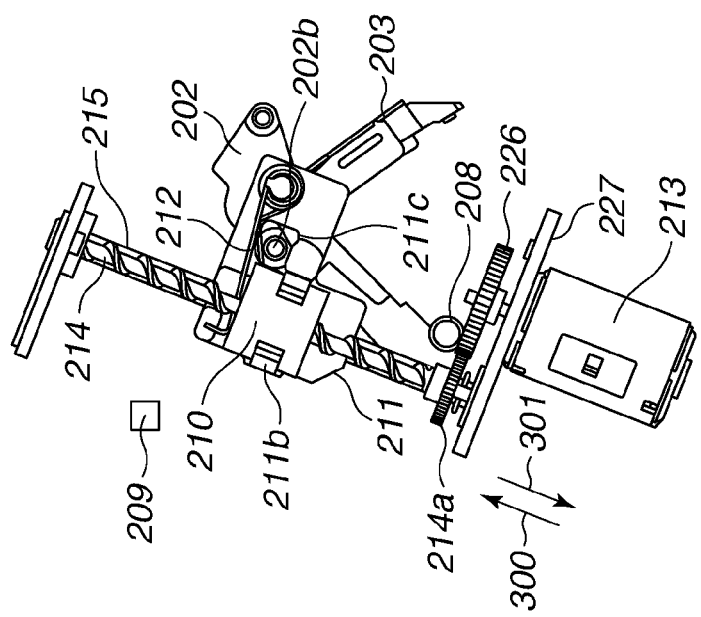

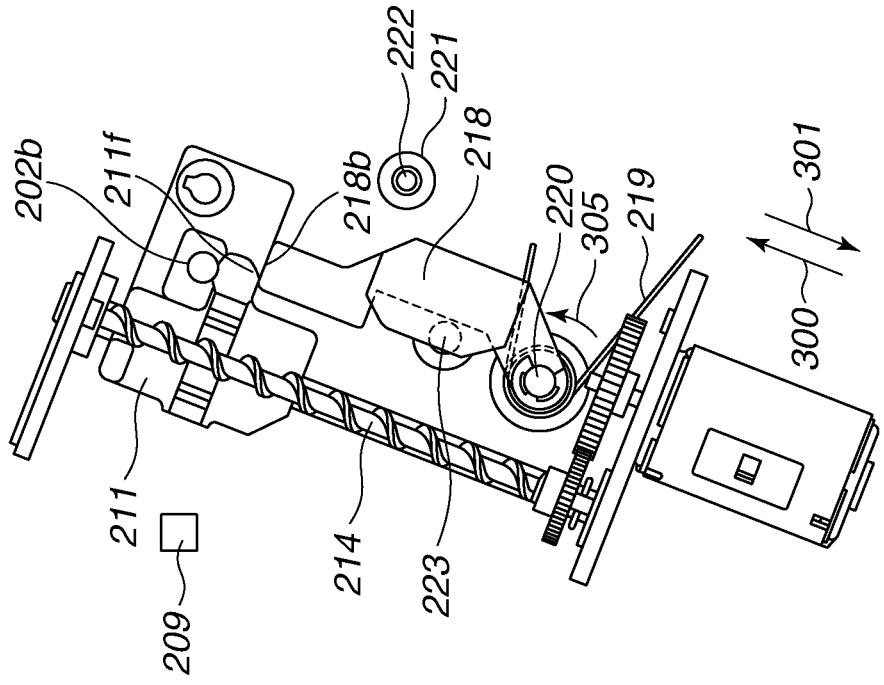
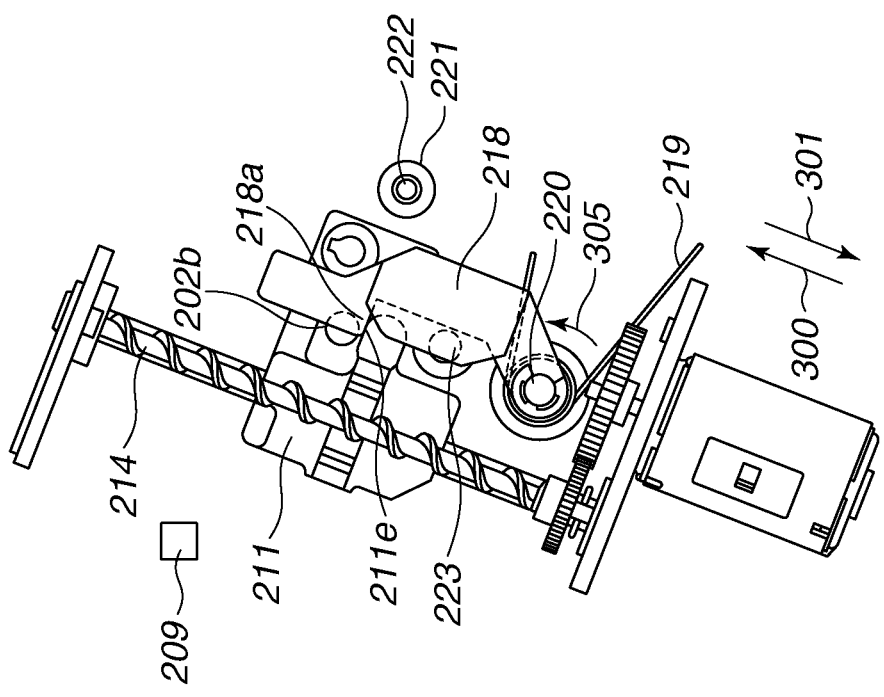

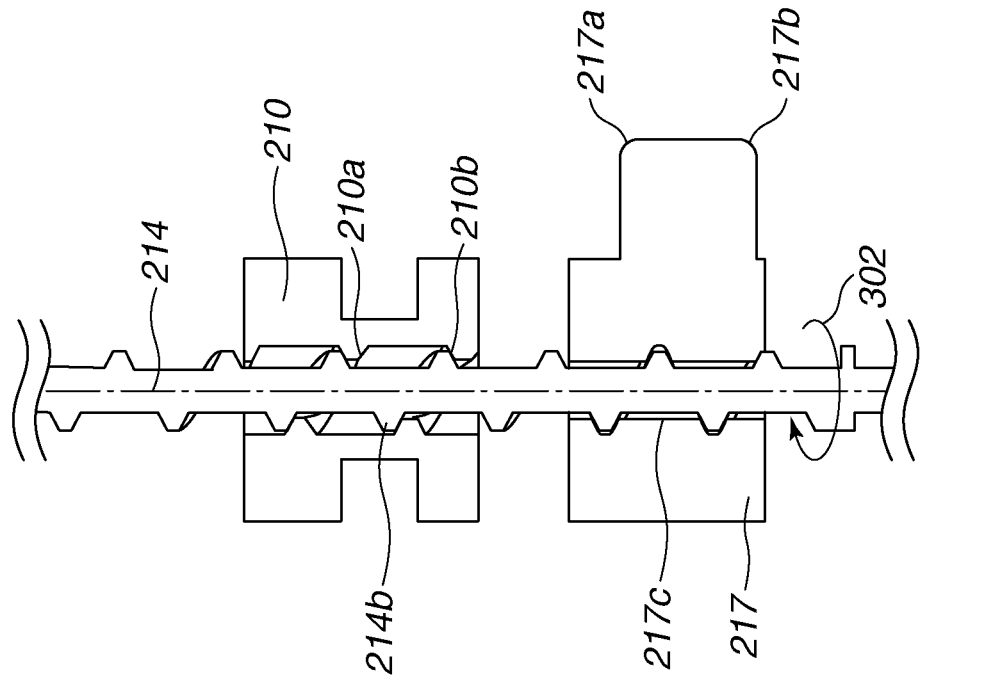
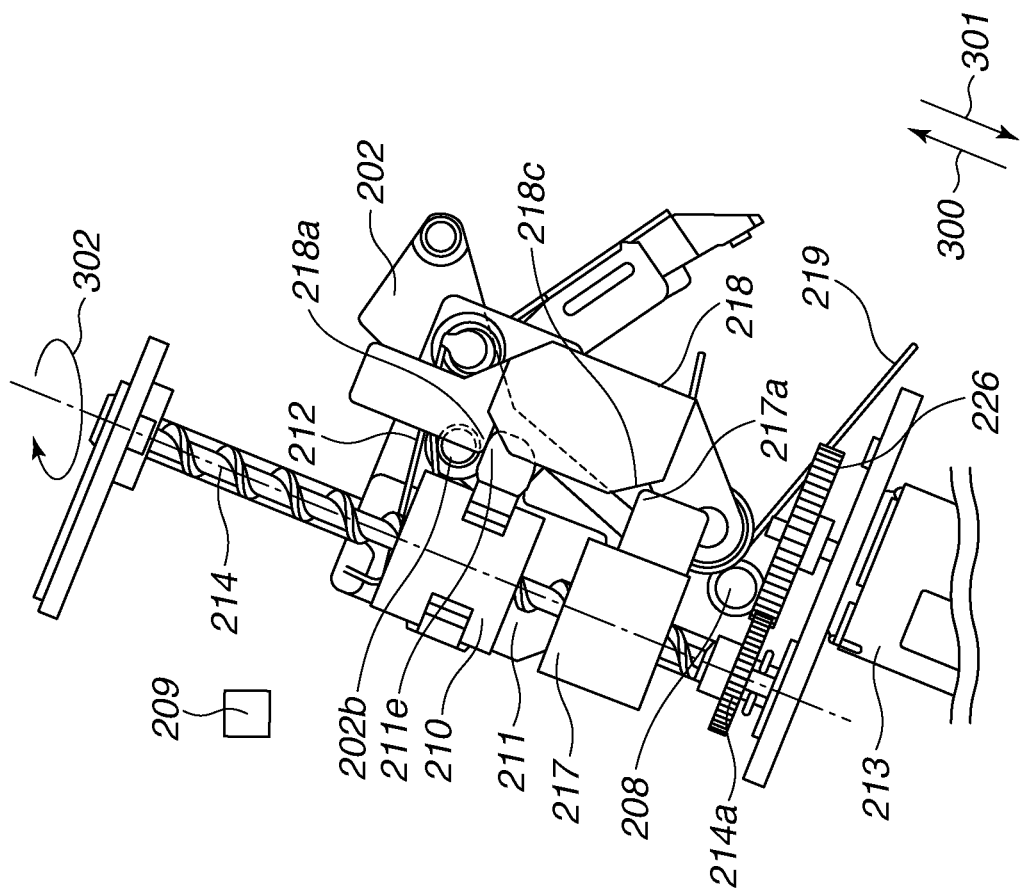

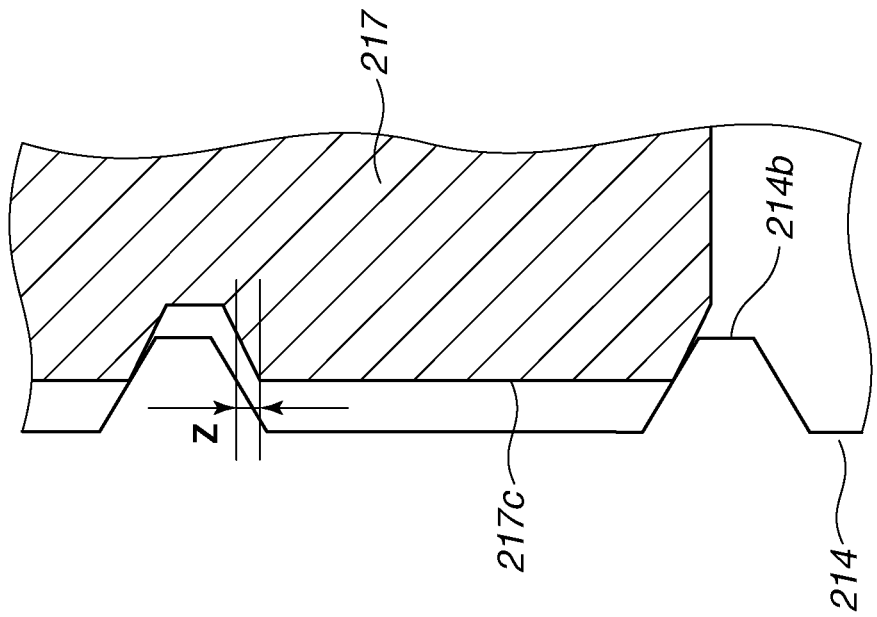
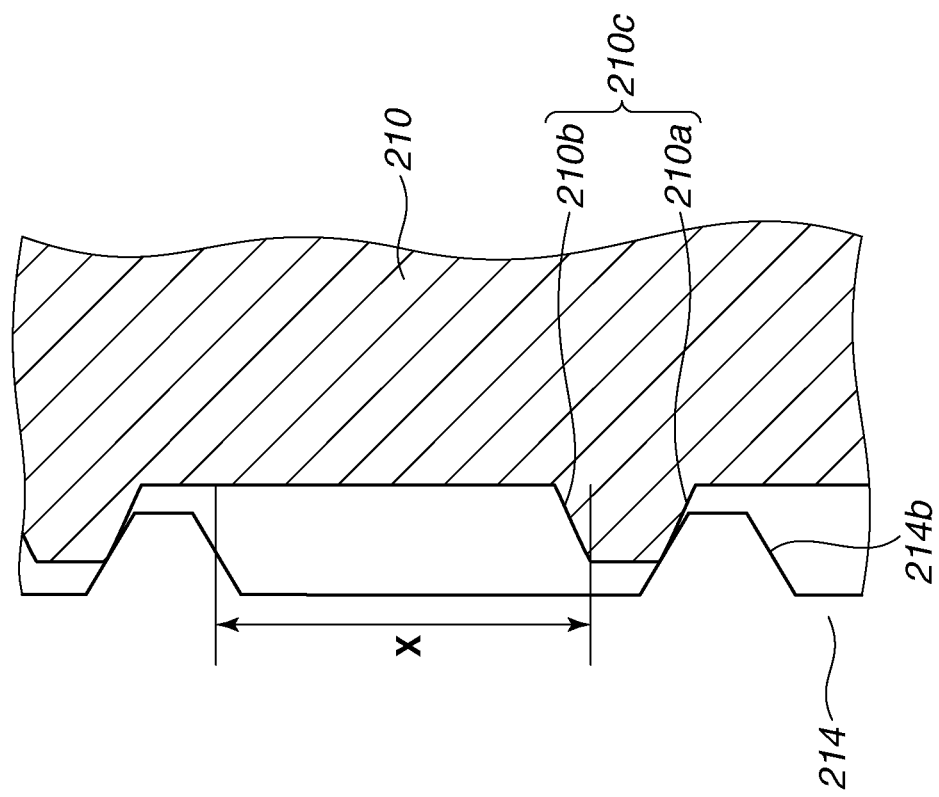

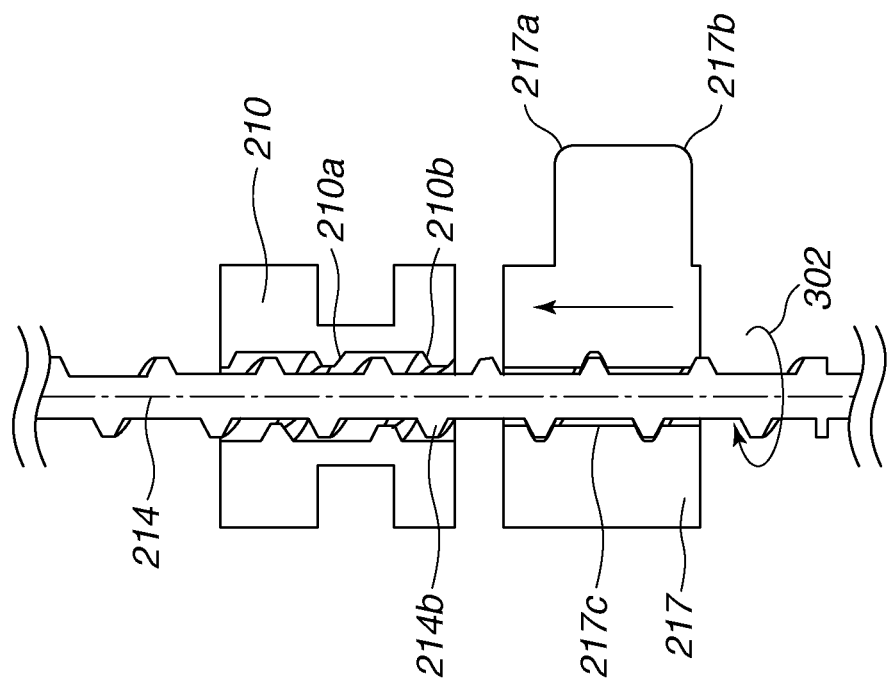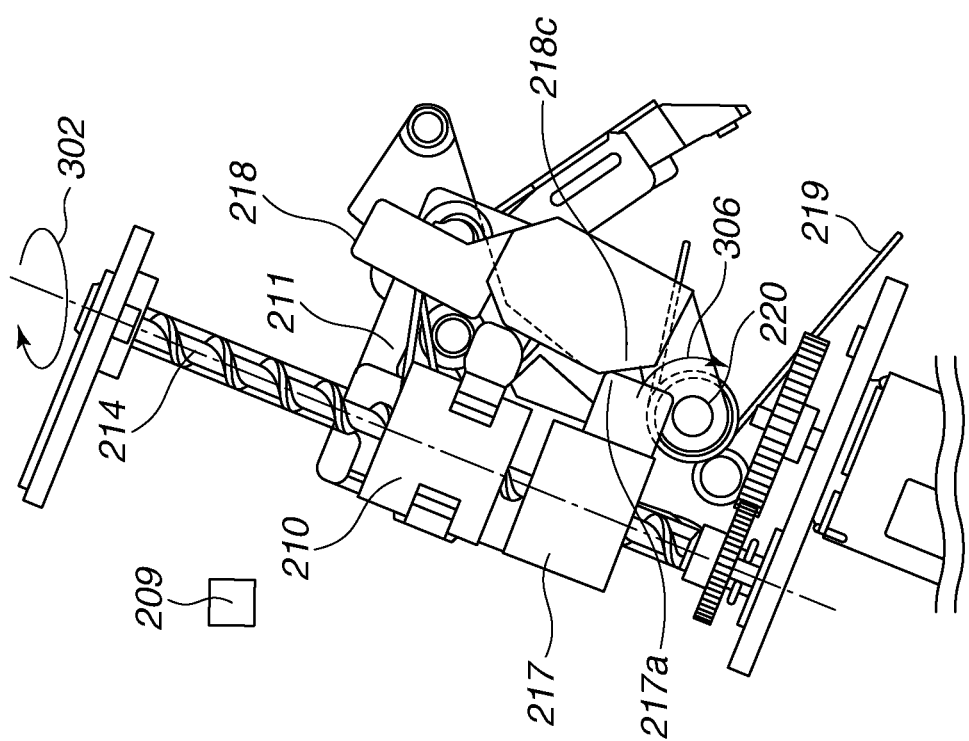

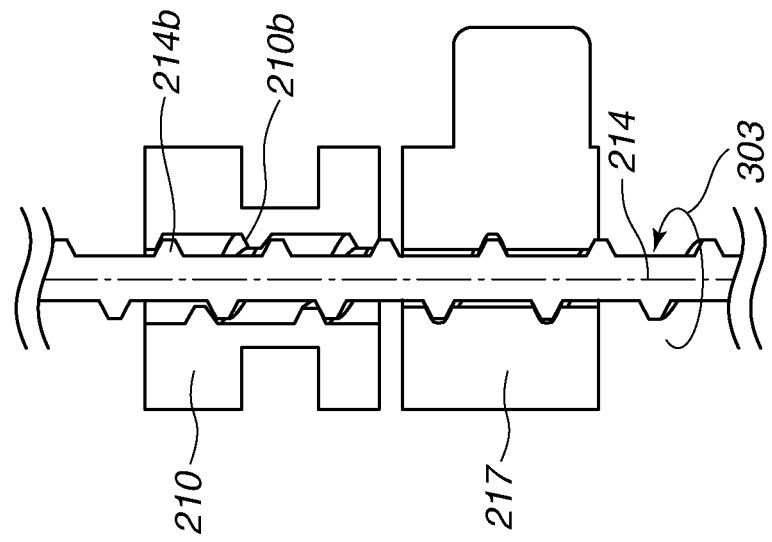
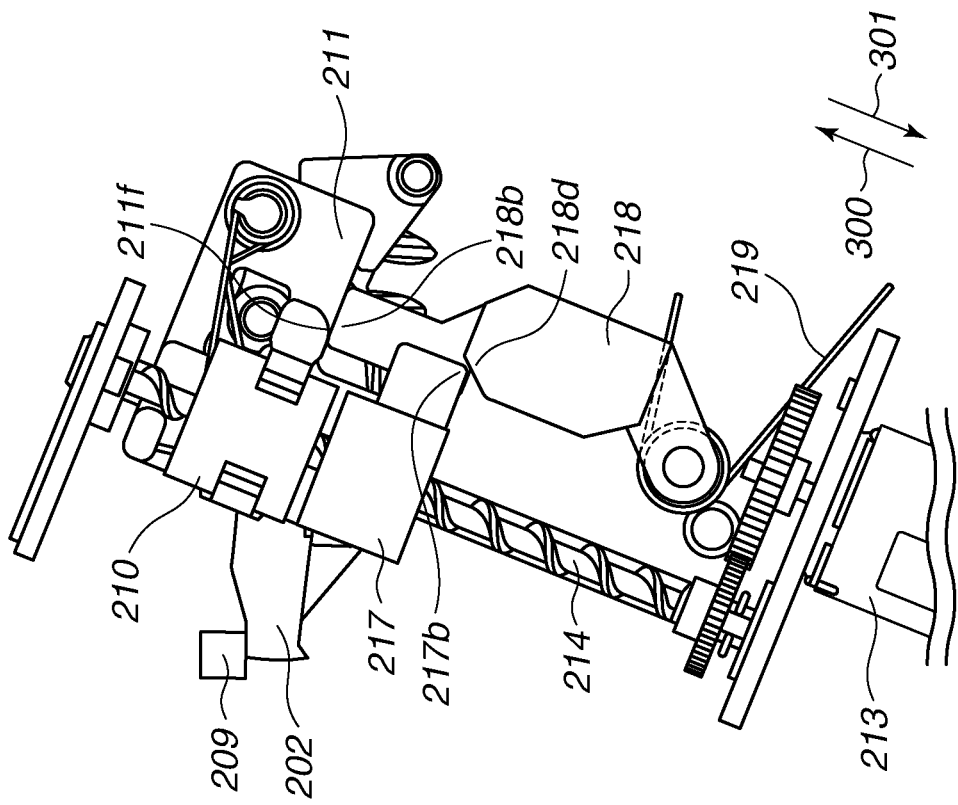

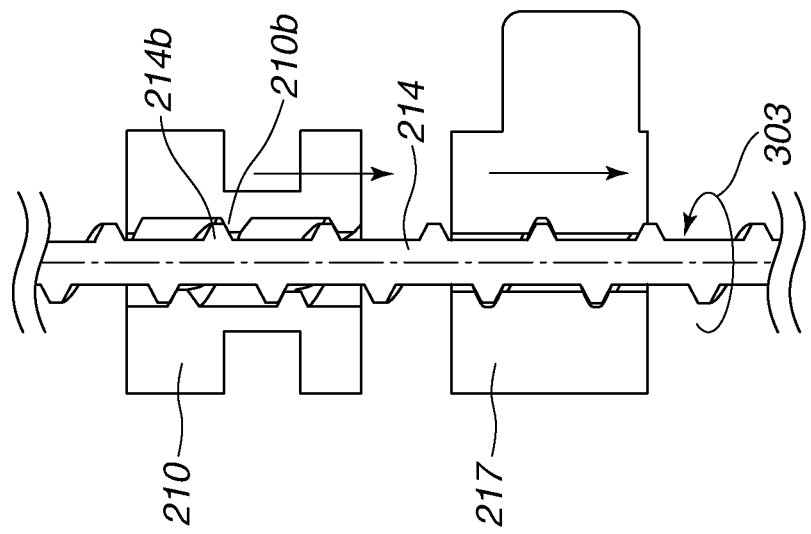
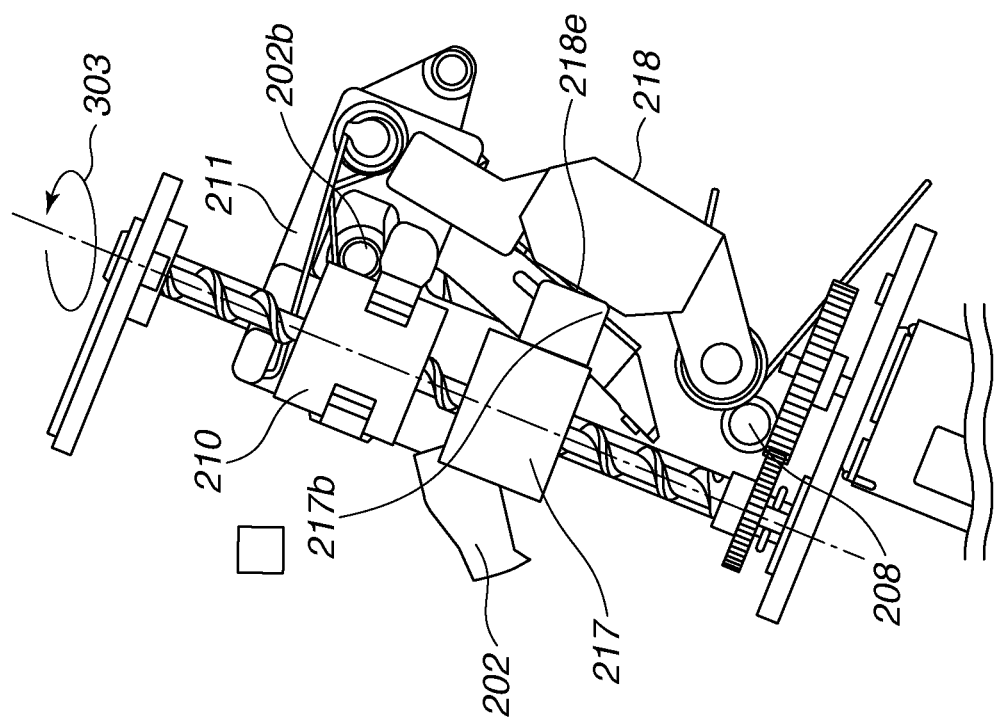

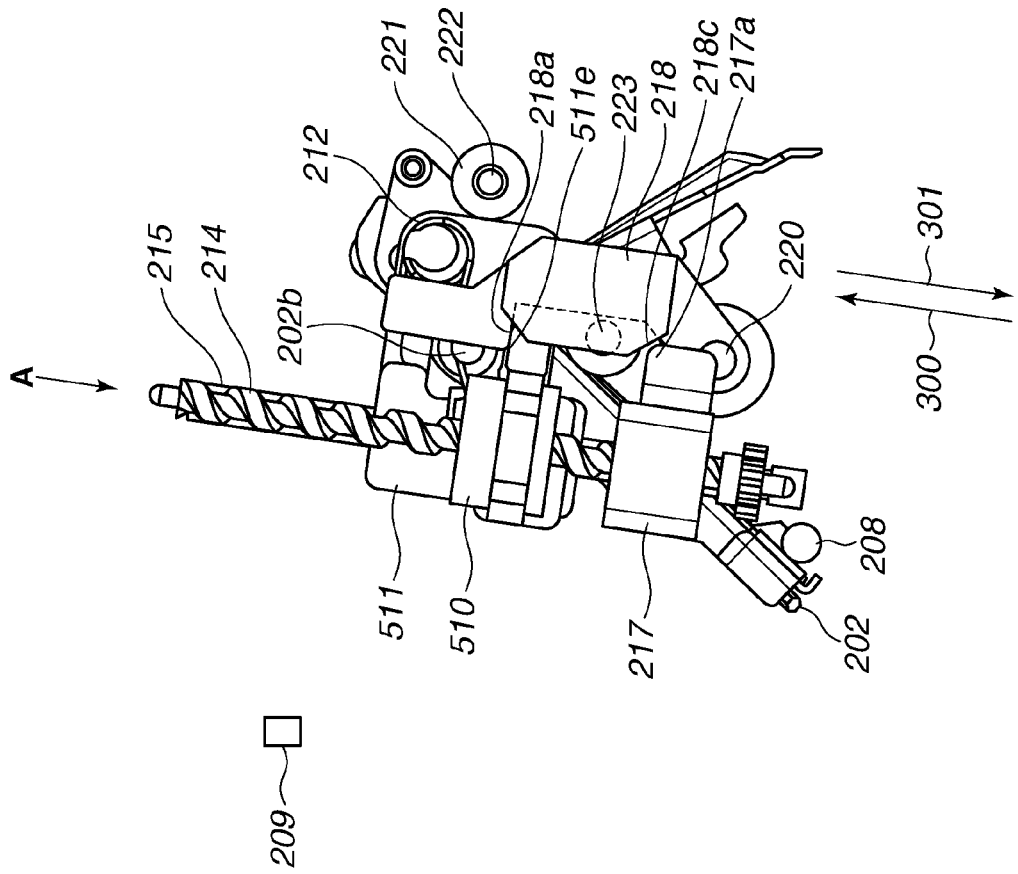

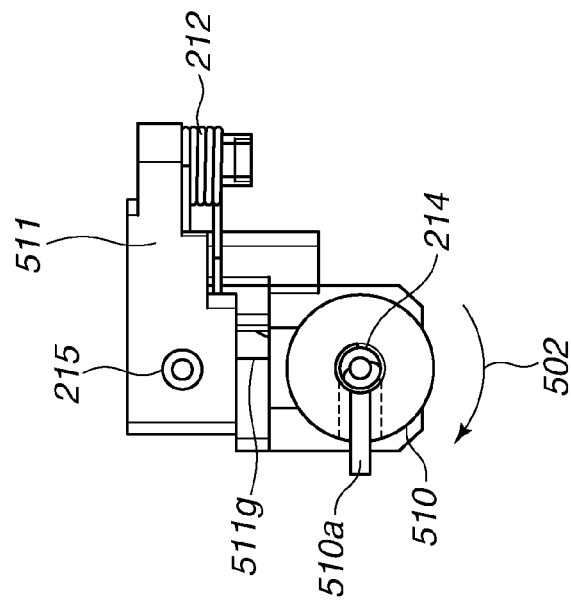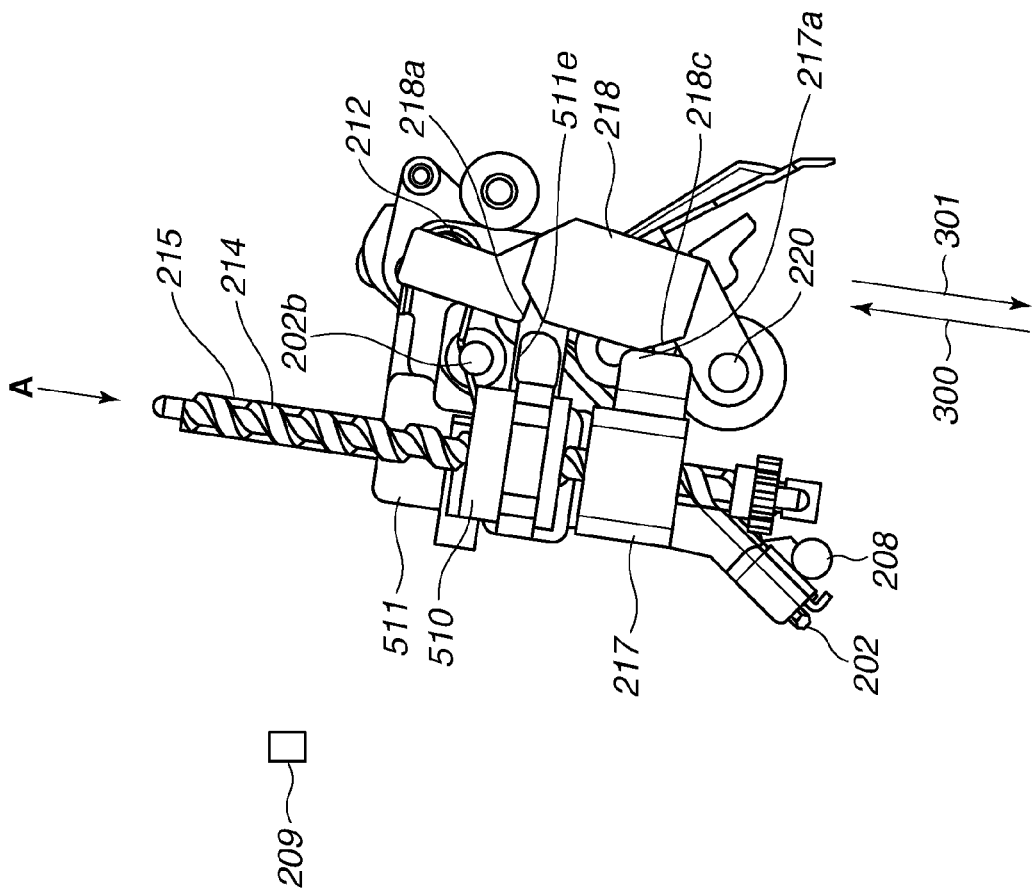

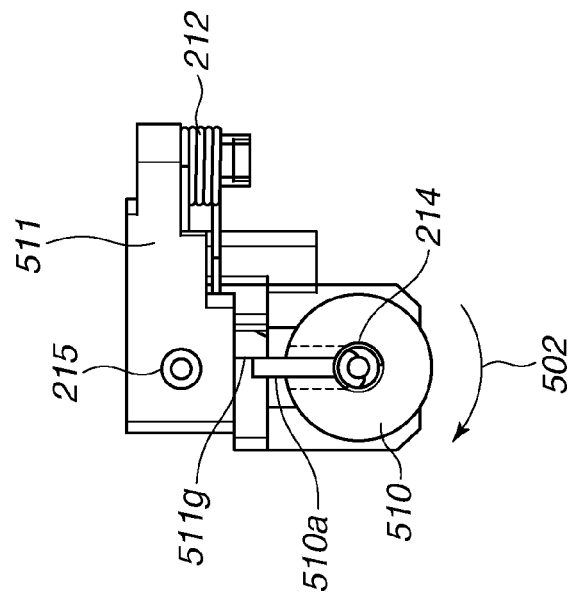
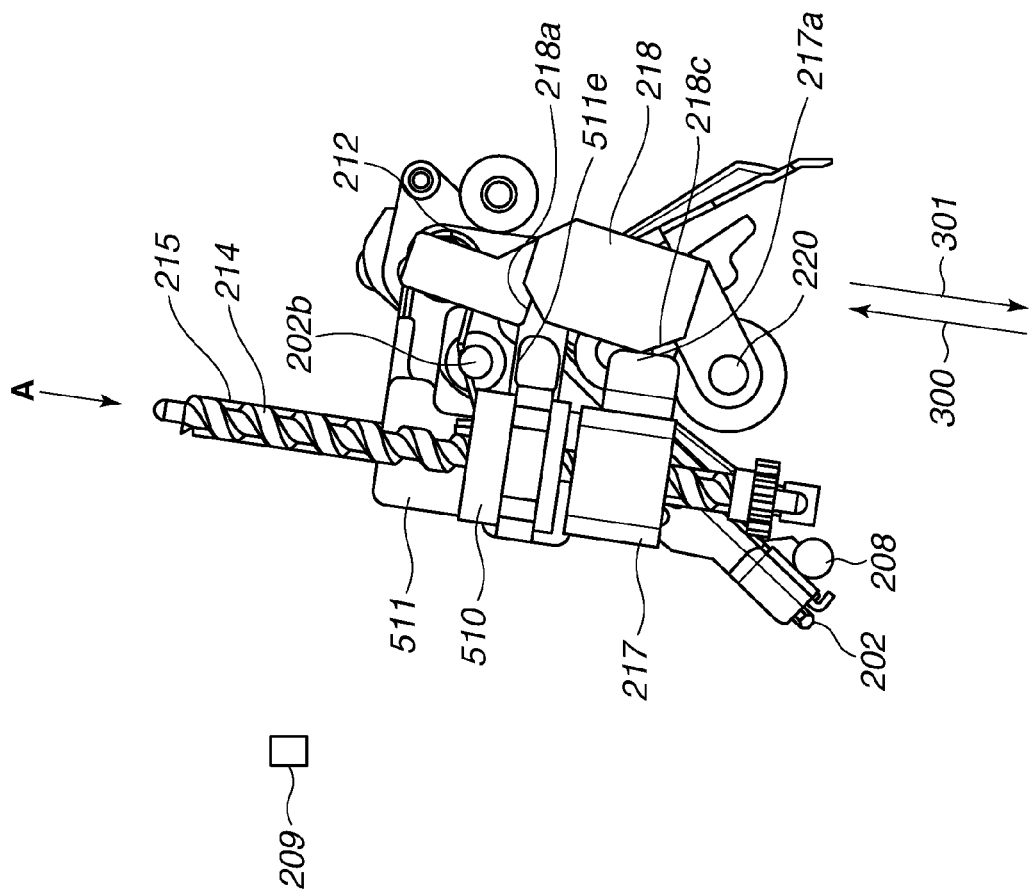
FIG.22A
FIG.22B

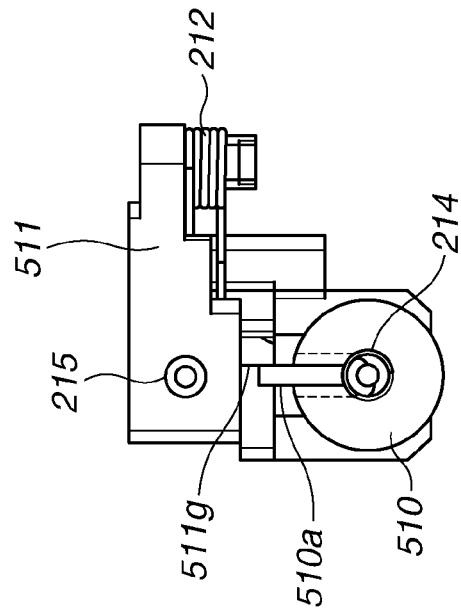
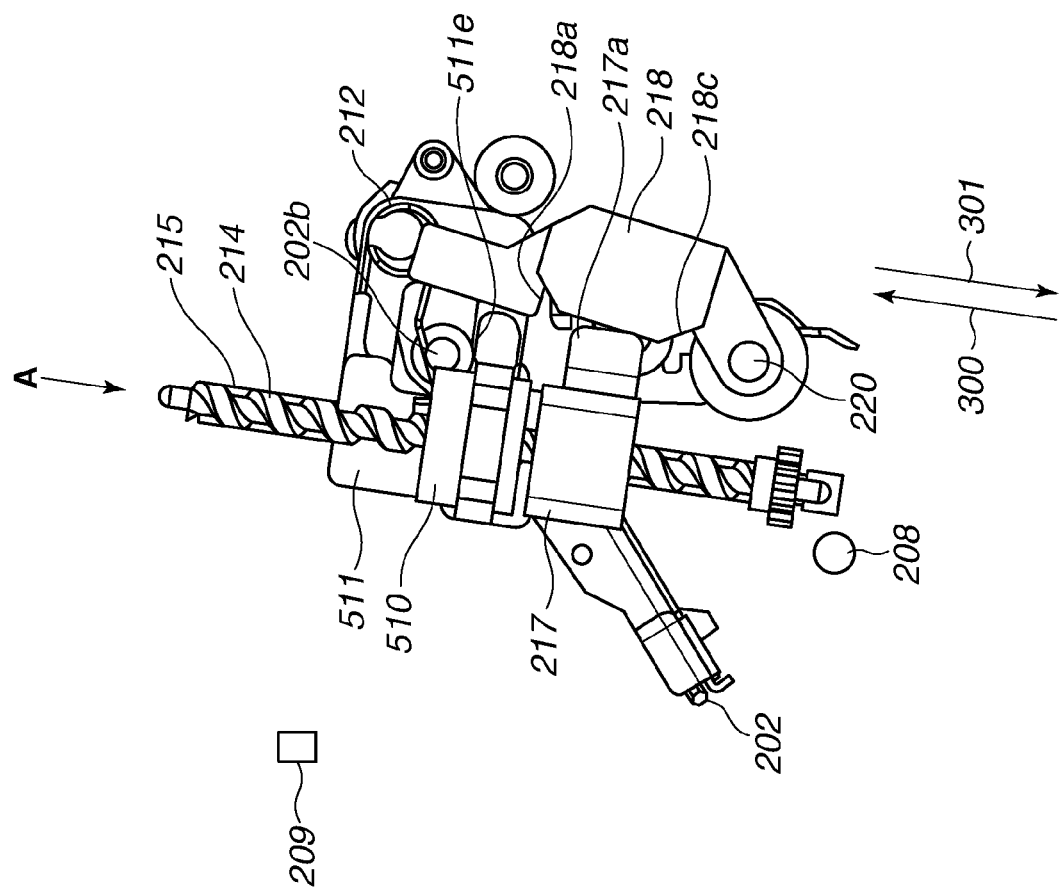
FIG.23B
FIG.23A

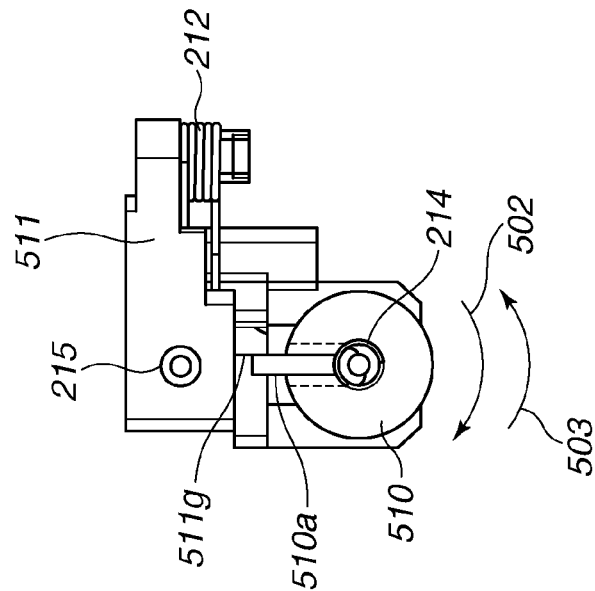
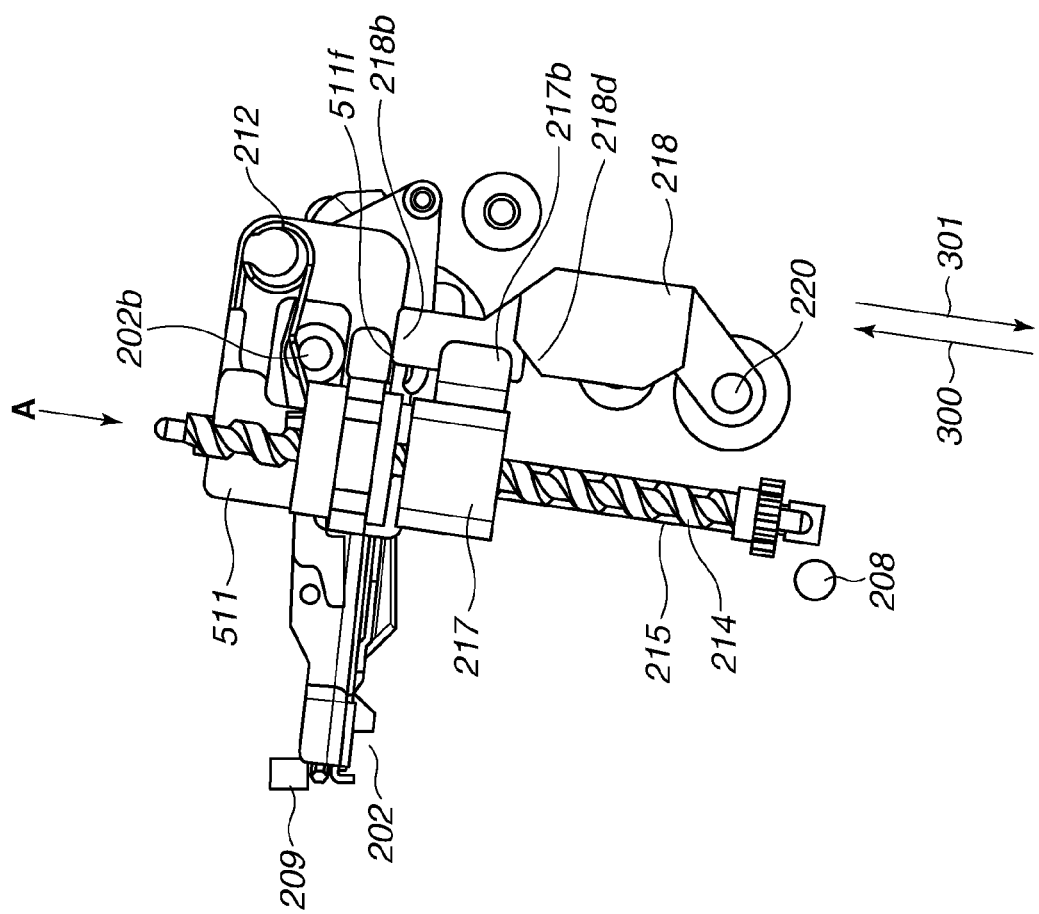
FIG.24A / FIG.24B

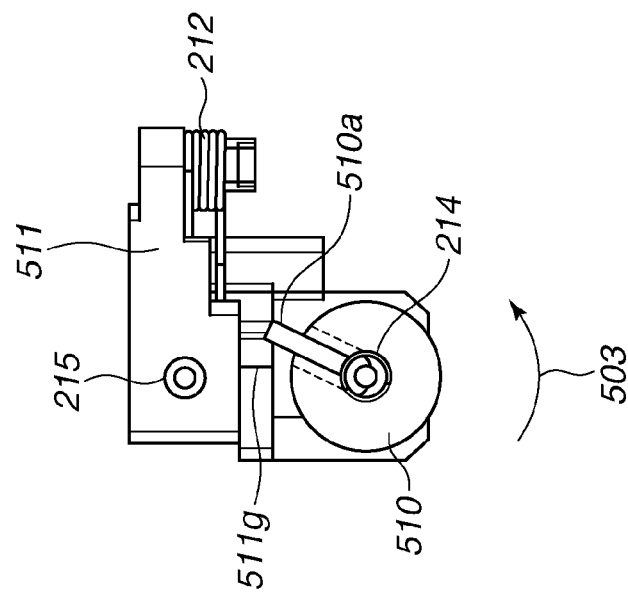
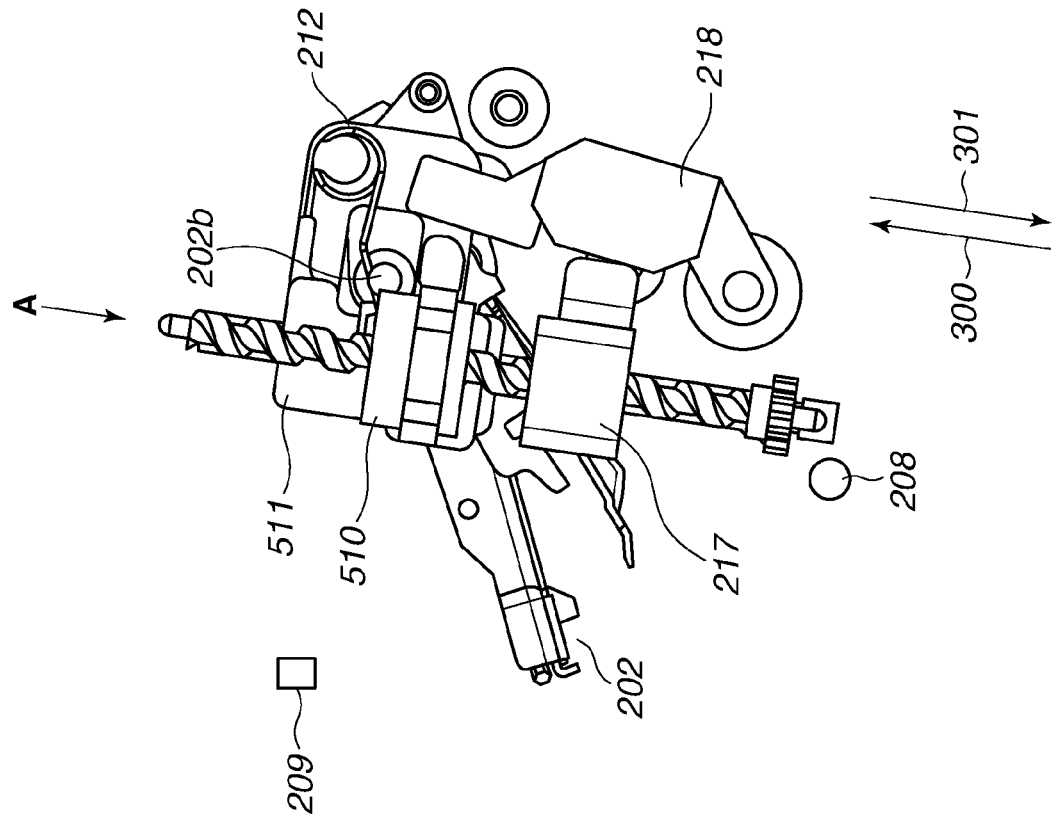

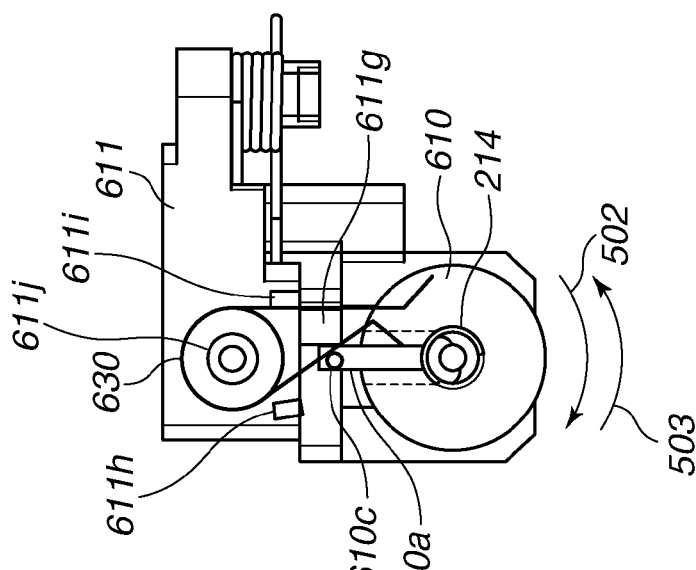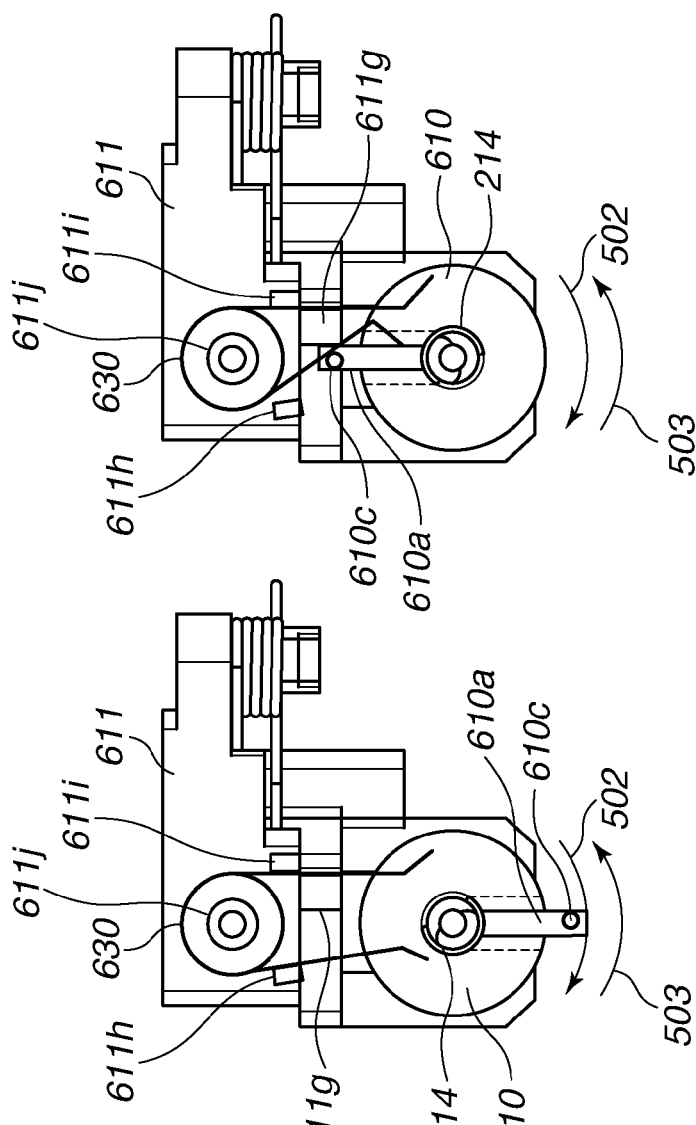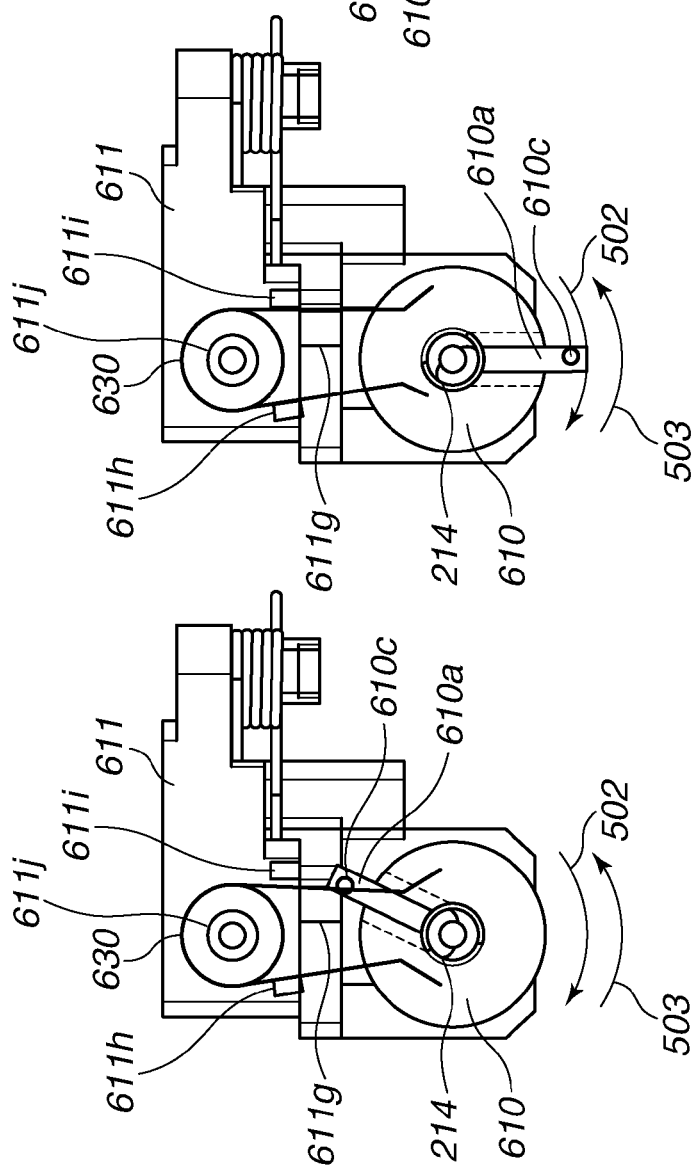

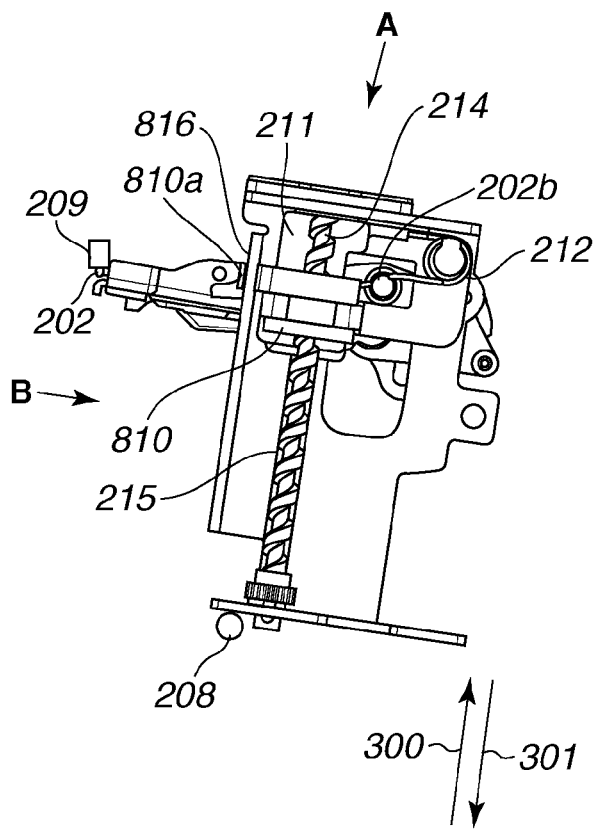
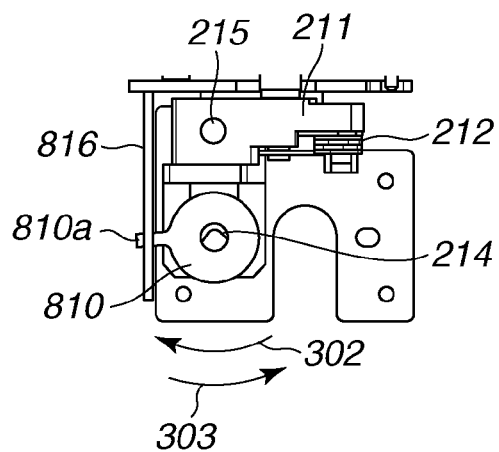
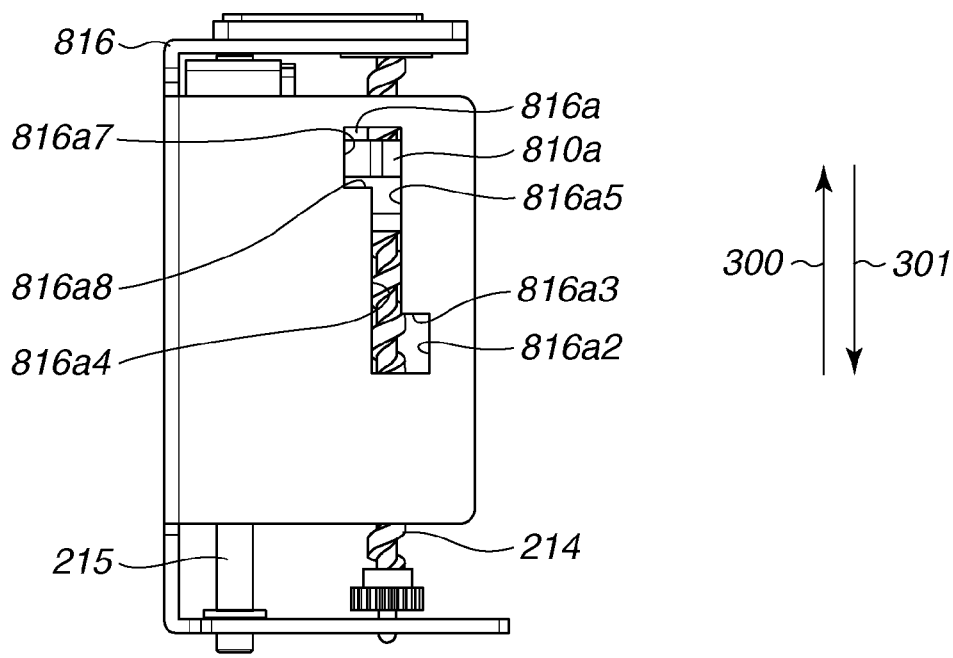

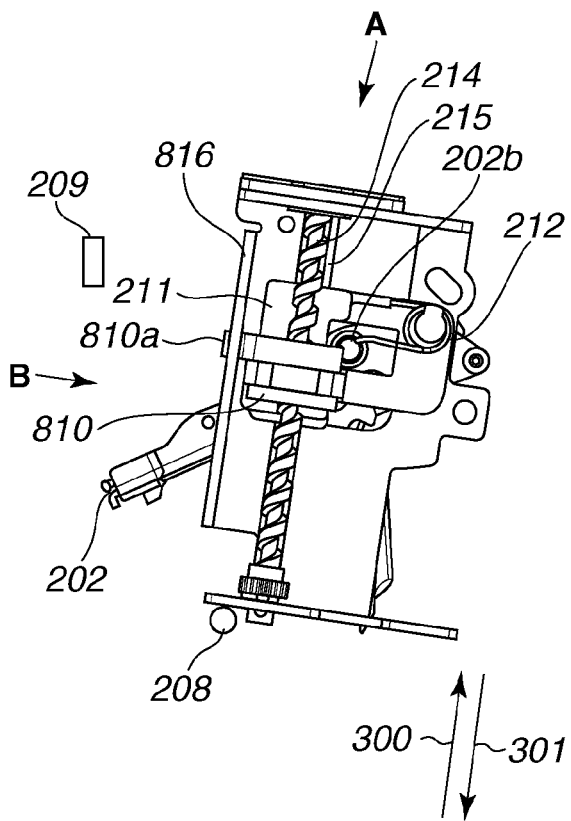
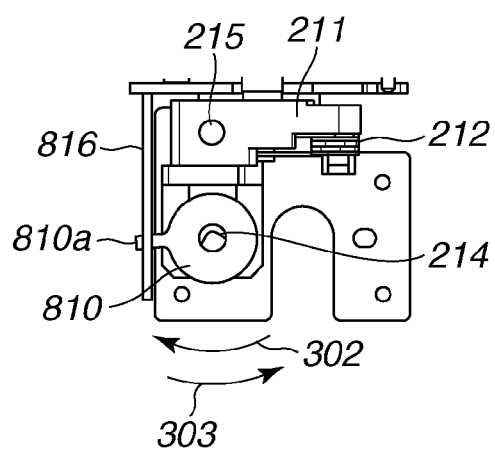
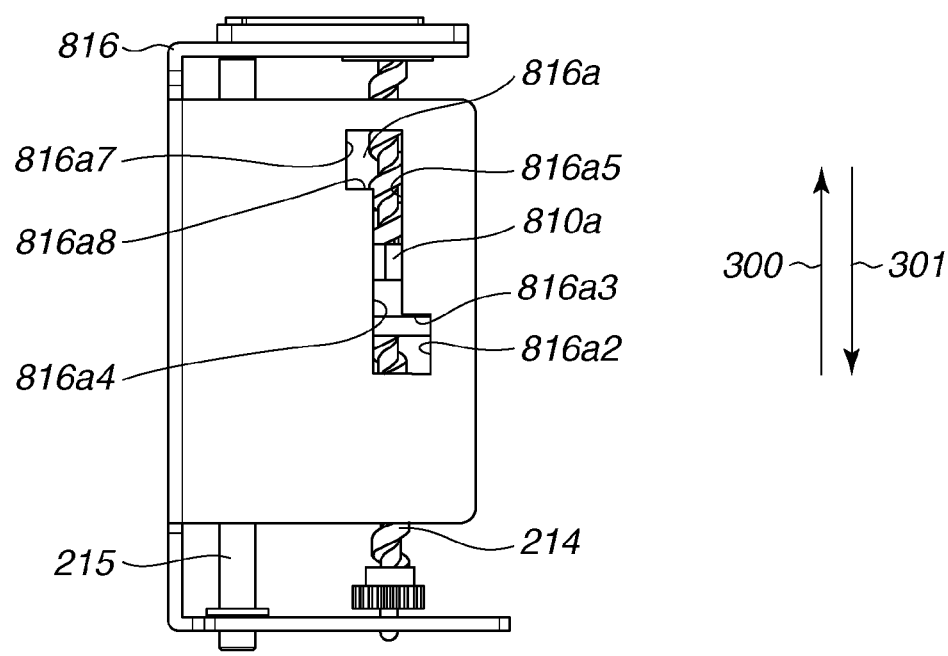
FIG.55A
FIG.55B
FIG.55C

MIRROR DRIVING DEVICE

BACKGROUND OF THE INVENTION

1. Field of the Invention

The present invention relates to a mirror driving device that drives a mirror member between a mirror-up position and a mirror-down position.

2. Description of the Related Art

Operations in some conventional single-lens reflex cameras involve turning (flipping up and down) a main mirror and a sub-mirror between a mirror-down position and a mirror-up position.

Japanese Patent Application Laid-Open No. 11-95317 discusses turning a main mirror and a sub-mirror via a liner motor serving as a drive source.

Japanese Patent Application Laid-Open No. 2010-44271 discusses turning a mirror via a voice coil motor.

SUMMARY OF THE INVENTION

According to an aspect of the claimed invention, a mirror driving device includes a drive source, a lead screw configured to be driven by the drive source, a mirror member configured to be movable between a mirror-down position and a mirror-up position, a mirror driving member configured to rectilinearly move to drive the mirror member between the mirror-down position and the mirror-up position, and a restriction unit configured to switch between a restriction state that restricts a rectilinear movement of the mirror driving member and a restriction release state that releases the restriction state, wherein the restriction unit switches between the restriction state and the restriction release state without allowing the mirror driving member to rectilinearly move when the mirror member is in the mirror-up position or the mirror-down position, and wherein the mirror driving member rectilinearly moves in conjunction with driving of the lead screw after the restriction unit switches from the restriction state to the restriction release state.

According to an exemplary embodiment of the claimed invention, a mirror driving device can hold the mirror member in the mirror-down position without consuming electric power.

Further features of the present invention will become apparent from the following description of exemplary embodiments with reference to the attached drawings.

BRIEF DESCRIPTION OF THE DRAWINGS

FIGS. 4A, 4B, and 4C are side views illustrating the mirror driving unit driving a main mirror and a sub-mirror between the mirror-down position and the mirror-up position according to the first exemplary embodiment.

FIGS. 6A and 6B are side views illustrating the mirror driving unit driving the main mirror and the sub-mirror between the mirror-down position and the mirror-up position according to the first exemplary embodiment.

FIGS. 7A and 7B are a side view and a sectional view, respectively, illustrating the mirror driving unit driving the main mirror and the sub-mirror between the mirror-down position and the mirror-up position according to the first exemplary embodiment.

FIGS. 8A and 8B are sectional views illustrating an amount of backlash between a lead screw and a drive nut and an amount of backlash between the lead screw and an unlock nut according to the first exemplary embodiment.

FIGS. 9A and 9B, FIGS. 10A and 10B, FIGS. 11A and 11B, FIGS. 12A and 12B, FIGS. 13A and 13B, FIGS. 14A and 14B, and FIGS. 15A and 15B are side views and sectional views, respectively, illustrating the mirror driving unit driving the main mirror and the sub-mirror between the mirror-down position and the mirror-up position according to the first exemplary embodiment.

FIGS. 20A and 20B, FIGS. 21A and 21B, FIGS. 22A and 22B, FIGS. 23A and 23B, FIGS. 24A and 24B, FIGS. 25A and 25B, FIGS. 26A and 26B, and FIGS. 27A and 27B are side views illustrating the mirror driving unit driving the main mirror and the sub-mirror between the mirror-down position and the mirror-up position according to the second exemplary embodiment.

FIGS. 29A, 29B, and 29C are side views illustrating components of the mirror driving unit according to a second modification example of the second exemplary embodiment.

FIGS. 47A, 47B, and 47C, FIGS. 48A, 48B, and 48C, FIGS. 49A, 49B, and 49C, FIGS. 50A, 50B, and 50C, FIGS. 51A, 51B, and 51C, FIGS. 52A, 52B, and 52C, FIGS. 53A, 53B, and 53C, FIGS. 54A, 54B, and 54C, FIGS. 55A, 55B, and 55C, and FIGS. 56A, 56B, and 56C illustrating the mirror driving unit driving the main mirror and the sub-mirror between the mirror-down position and the mirror-up position according to the fourth exemplary embodiment.

DESCRIPTION OF THE EMBODIMENTS

Figure 1:
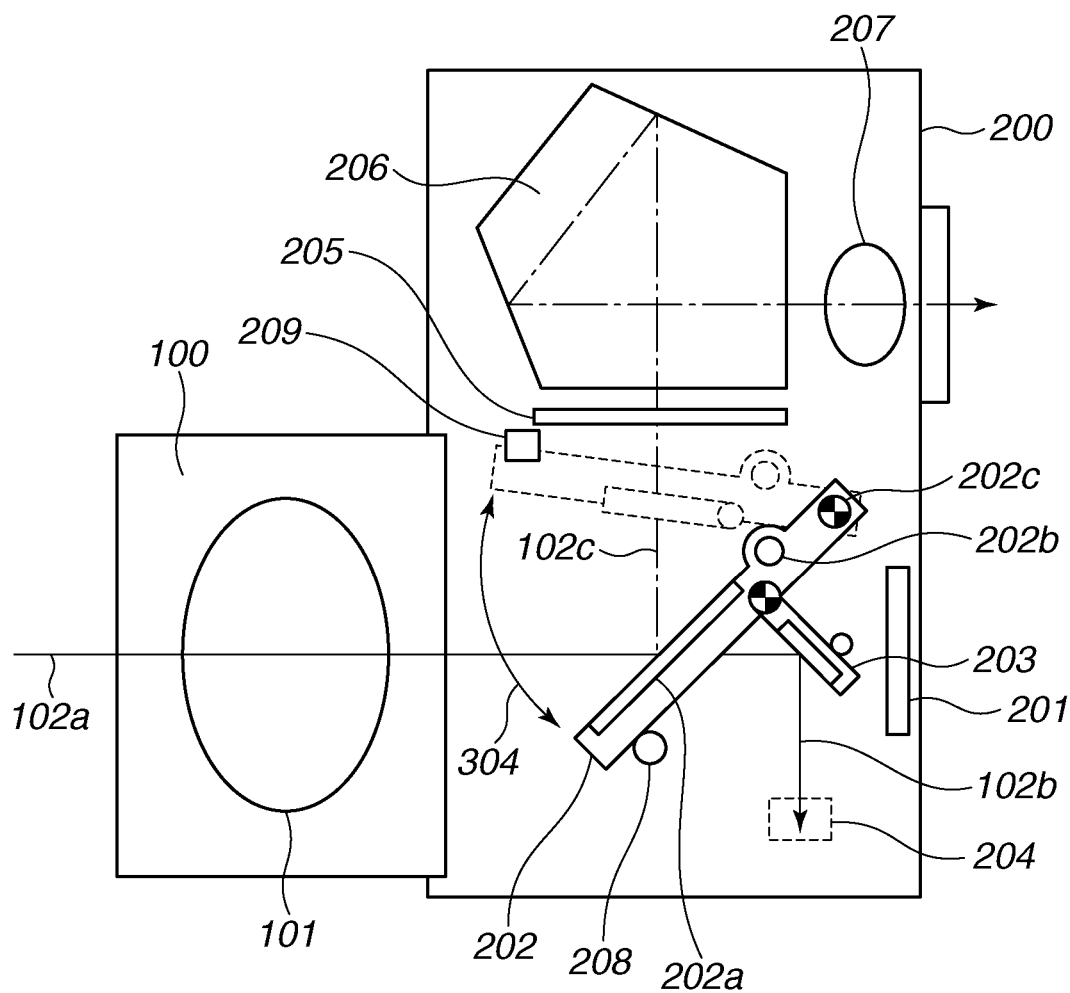
FIG. 1 is a center sectional schematic view illustrating a digital single-lens reflex camera according to a first exemplary embodiment.

Hereinafter, a digital single-lens reflex camera serving as an imaging apparatus equipped with a mirror driving device according to a first exemplary embodiment of the present invention is described with reference to FIG. 1 to FIGS. 15A and 15B. FIG. 1 is a center sectional schematic view illustrating the digital single-lens reflex camera according to the first exemplary embodiment.

As illustrated in FIG. 1, the digital single-lens reflex camera includes a camera body 200 and a photographic lens 100, which is detachably attached to the camera body 200. The photographic lens 100 includes a lens unit 101, which includes a focusing lens group and a zoom lens group.

An image sensor 201, such as a complementary metal-oxide semiconductor (CMOS) sensor, is mounted near a predetermined image plane of the photographic lens 100.

A main mirror 202, which has a half mirror portion 202a, and a sub-mirror 203 are mounted between the photographic lens 100 and the image sensor 201 at an angle of 45 degrees relative to a photographic optical axis 102a. The main mirror 202 is able to turn around a rotational shaft 202c in directions of arrows 304. The main mirror 202 and the sub-mirror 203 are configured to be movable between a mirror-down position and a mirror-up position.

The mirror-down position corresponds to a state in which the main mirror 202 is in contact with a down stopper 208, which is a mirror-down position restriction portion. The mirror-up position corresponds to a state in which the main mirror 202 is in contact with an up stopper 209, which is a mirror-up position restriction portion, and the main mirror 202 and the sub-mirror 203 are retracted from the photographic optical axis 102a.

Furthermore, a mirror driving position corresponds to a state in which the main mirror 202 is in the middle of turning movement, i.e., is moving between the mirror-down position and the mirror-up position. The sub-mirror 203 turns relative to the main mirror 202 in conjunction with the turning movement of the main mirror 202.

When the main mirror 202 and the sub-mirror 203 are located in the mirror-down position, a light beam reflected from the main mirror 202 is focused on a mat surface of a focusing screen 205, which has the mat surface and a Fresnel surface, and is then guided to an eyepiece optical system 207 via a pentaprism 206. An optical axis 102c is a photographic optical axis reflected from the half mirror portion 202a of the main mirror 202.

In addition, a light beam having passed through the half mirror portion 202a of the main mirror 202 is reflected by the sub-mirror 203 and is then guided to a focus detection unit 204. An optical axis 102b is a photographic optical axis that has passed through the half mirror portion 202a of the main mirror 202 and has then been reflected from the sub-mirror 203. When the main mirror 202 is located in the mirror-up position, a light beam having passed through the photographic lens 100 is focused on the imaging plane of the image sensor 201.

Figure 2:
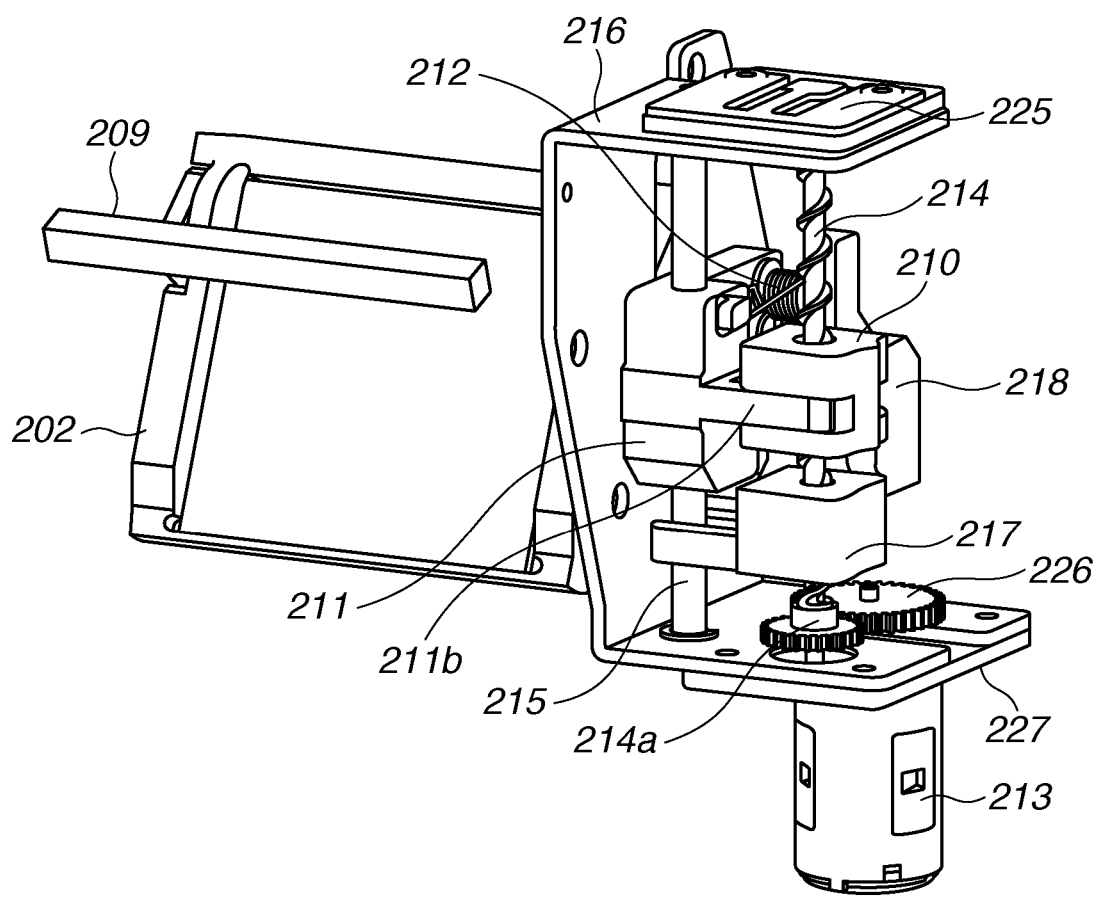
FIG. 2 is a perspective view of a mirror driving unit according to the first exemplary embodiment.

Next, a mirror driving unit configured to drive the main mirror 202 and the sub-mirror 203 between the mirror-down position and the mirror-up position is described. FIG. 2 is a perspective view of the mirror driving unit (a mirror driving device) according to the first exemplary embodiment.

As illustrated in FIG. 2, the mirror driving unit includes the main mirror 202, a mirror driving holder 211, a drive nut 210, a lead screw 214, a step motor 213, a lock lever 218, and an unlock nut 217.

The main mirror 202 functions as a mirror member configured to be movable between the mirror-down position and the mirror-up position. The drive nut 210 meshes with the lead screw 214 and rectilinearly moves as the lead screw 214 is driven to rotate. The drive nut 210 is fixed to and held by the mirror driving holder 211. The drive nut 210 and the mirror driving holder 211 function as a mirror driving member configured to drive the main mirror 202 between the mirror-down position and the mirror-up position by rectilinearly moving as the lead screw 214 is driven to rotate. The step motor 213 functions as a drive source. The lock lever 218 functions as a restriction member configured to be movable between a restriction position that restricts the rectilinear movement of the drive nut 210 and the mirror driving holder 211 and a restriction release position that releases the restriction of the drive nut 210 and the mirror driving holder 211. The unlock nut 217 functions as a drive member configured to drive the lock lever 218 between the restriction position and the restriction release position by rectilinearly moving as the lead screw 214 is driven to rotate.

The step motor 213 is mounted to a motor base 227. The motor base 227, to which the step motor 213 is mounted, is mounted to a driving unit base 216. A pinion gear 226 is fixed to the rotational shaft of the step motor 213. The lead screw 214 is rotatably mounted to the driving unit base 216. A leaf spring 225, which urges the lead screw 214 toward the step motor 213, is mounted to the driving unit base 216.

The lead screw 214 is mounted to the driving unit base 216 in such a manner that the lead screw 214 is approximately parallel to a line connecting the position of a drive pin 202b of the main mirror 202 when the main mirror 202 is in the mirror-down position and the position of the drive pin 202b when the main mirror 202 is in the mirror-up position. The lead screw 214 includes a gear portion 214a. The gear portion 214a of the lead screw 214 meshes with the pinion gear 226. A guide shaft 215 is mounted to the driving unit base 216 in parallel with the lead screw 214.

Accordingly, the guide shaft 215 is also mounted to the driving unit base 216 in such a manner that the guide shaft 215 is approximately parallel to a line connecting the position of the drive pin 202b when the main mirror 202 is in the mirror-down position and the position of the drive pin 202b when the main mirror 202 is in the mirror-up position.

Figure 3:
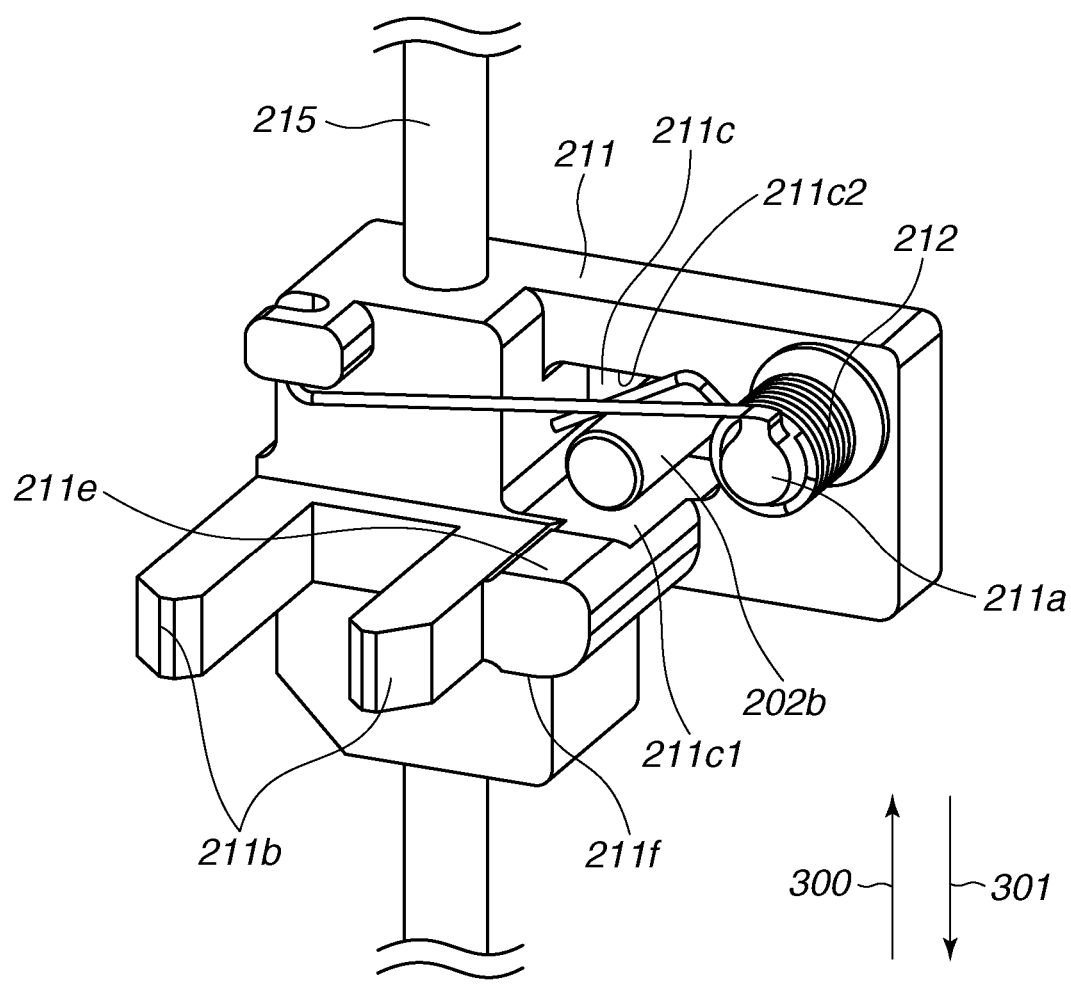
FIG. 3 is an enlarged perspective view of a mirror driving holder according to the first exemplary embodiment.

FIG. 3 is an enlarged perspective view of the mirror driving holder 211.

As illustrated in FIG. 3, a spring mounting portion 211a, a drive nut holding portion 211b, and a drive pin engaging portion 211c are formed on the mirror driving holder 211. The coiled portion of a torsion spring 212 is freely fitted on the spring mounting portion 211a. The drive pin 202b, which is formed on the main mirror 202, is inserted into the drive pin engaging portion 211c. Drive pin stoppers 211c1 and 211c2 are formed on the drive pin engaging portion 211c.

One end of the torsion spring 212, which is mounted on the spring mounting portion 211a, is supported by the mirror driving holder 211, and the other end of the torsion spring 212 is supported by the drive pin 202b. This enables the torsion spring 212 to urge the drive pin 202b toward the drive pin stopper 211c1.

The drive nut 210, which meshes with the lead screw 214, is fixed to and held by the drive nut holding portion 211b.

The mirror driving holder 211 rectilinearly moves in directions of arrows 300 and 301 while being guided by the guide shaft 215. Accordingly, as the lead screw 214 is driven to rotate by the step motor 213, the drive nut 210 and the mirror driving holder 211 rectilinearly move integrally with each other along the guide shaft 215.

FIGS. 4A, 4B, and 4C are side views illustrating the mirror driving unit driving the main mirror 202 and the sub-mirror 203 between the mirror-down position and the mirror-up position according to the present exemplary embodiment. Incidentally, the lock lever 218 and the unlock nut 217 are not illustrated in FIGS. 4A, 4B, and 4C.

FIG. 4A illustrates a state in which the main mirror 202 and the sub-mirror 203 are in the mirror-down position. FIG. 4B illustrates a state in which the main mirror 202 and the sub-mirror 203 are in the mirror driving position. FIG. 4C illustrates a state in which the main mirror 202 and the sub-mirror 203 are in the mirror-up position.

As illustrated in FIG. 4A, when the main mirror 202 and the sub-mirror 203 are in the mirror-down position, the main mirror 202 is in contact with the down stopper 208, and the drive pin 202b is not in contact with the drive pin stopper 211c1. Accordingly, the angle of the main mirror 202 in the mirror-down position is determined only by the position of the down stopper 208 and the position of the main mirror rotational shaft 202c. Therefore, there are no variations in position of the main mirror 202 and the sub-mirror 203 in the mirror-down position due to any mounting error of the mirror driving unit or any component tolerance of the mirror driving unit.

As the lead screw 214 is driven to rotate by the step motor 213 from the state illustrated in FIG. 4A, the drive nut 210 and the mirror driving holder 211 start to rectilinearly move in the direction of arrow 300.

As illustrated in FIG. 4B, when the main mirror 202 and the sub-mirror 203 are in the mirror driving position, the main mirror 202 is moving away from the down stopper 208. At this time, since the drive pin 202b is urged by the torsion spring 212 toward the drive pin stopper 211c1, the drive pin 202b contacts the drive pin stopper 211c1. The mirror driving holder 211 rectilinearly moves in the direction of arrow 300 with the drive pin 202b kept in contact with the drive pin stopper 211c1.

As illustrated in FIG. 4C, when the main mirror 202 and the sub-mirror 203 are in the mirror-up position, the main mirror 202 contacts the up stopper 209. Since the up stopper 209 is formed of an elastic material, such as moltoprene or rubber, for shock absorption, when the bounce of the main mirror 202 has converged, the up stopper 209 is compressed and deformed by receiving a force in the direction of arrow 300 from the main mirror 202.

The mirror-up position of the main mirror 202 is previously set in consideration of such a deformation of the up stopper 209, and is thus designed not to interfere with a photographic light flux, which passes through the photographic lens 100 and then falls on the image sensor 201.

When the main mirror 202 bounces in the mirror-up position, the drive pin 202b vibrates inside the drive pin engaging portion 211c. When the bounce of the main mirror 202 has converged, the drive pin 202b contacts the drive pin stopper 211c1.

By the way, when the step motor 213 is de-energized when the mirror driving unit is in the state illustrated in FIG. 4A, the mirror driving holder 211 receives a force moving in the direction of arrow 300 due to the reactive force of the urging force of the torsion spring 212. At this time, if the cogging torque of the step motor 213 is larger than the force moving in the direction of arrow 300, the mirror driving holder 211 is held in the state illustrated in FIG. 4A.

However, in a case where the cogging torque of the step motor 213 is insufficient or an impact or vibration is applied to the camera body 200, the lead screw 214 may rotate against the cogging torque of the step motor 213. As a result, the mirror driving holder 211 may possibly move in the direction of arrow 300 from the state illustrated in FIG. 4A.

If the mirror driving holder 211 moves in the direction of arrow 300 from the state illustrated in FIG. 4A, it becomes impossible to keep the main mirror 202 and the sub-mirror 203 in the mirror-down position. Therefore, to keep the main mirror 202 and the sub-mirror 203 in the mirror-down position, it is necessary to continue energizing the step motor 213, thus resulting in an increase of power consumption.

Similarly, even in the state illustrated in FIG. 4C, since the mirror driving holder 211 receives a force moving in the direction of arrow 301 due to the reactive force of the up stopper 209 being compressed, the mirror driving holder 211 may move in the direction of arrow 301 from the state illustrated in FIG. 4C. In this case also, it becomes impossible to keep the main mirror 202 and the sub-mirror 203 in the mirror-up position.

Therefore, to perform bulb photography, live view photography, or moving image photography, which is the setting for long exposure times, it is necessary to continue energizing the step motor 213, thus increasing power consumption.

In the present exemplary embodiment, the lock lever 218 is configured to restrict the rectilinear movement of the mirror driving holder 211 when the main mirror 202 and the sub-mirror 203 are in the mirror-down position and when the main mirror 202 and the sub-mirror 203 are in the mirror-up position. Also, the unlock nut 217 is configured to release the movement restriction of the mirror driving holder 211 by the lock lever 218.

Figure 5:
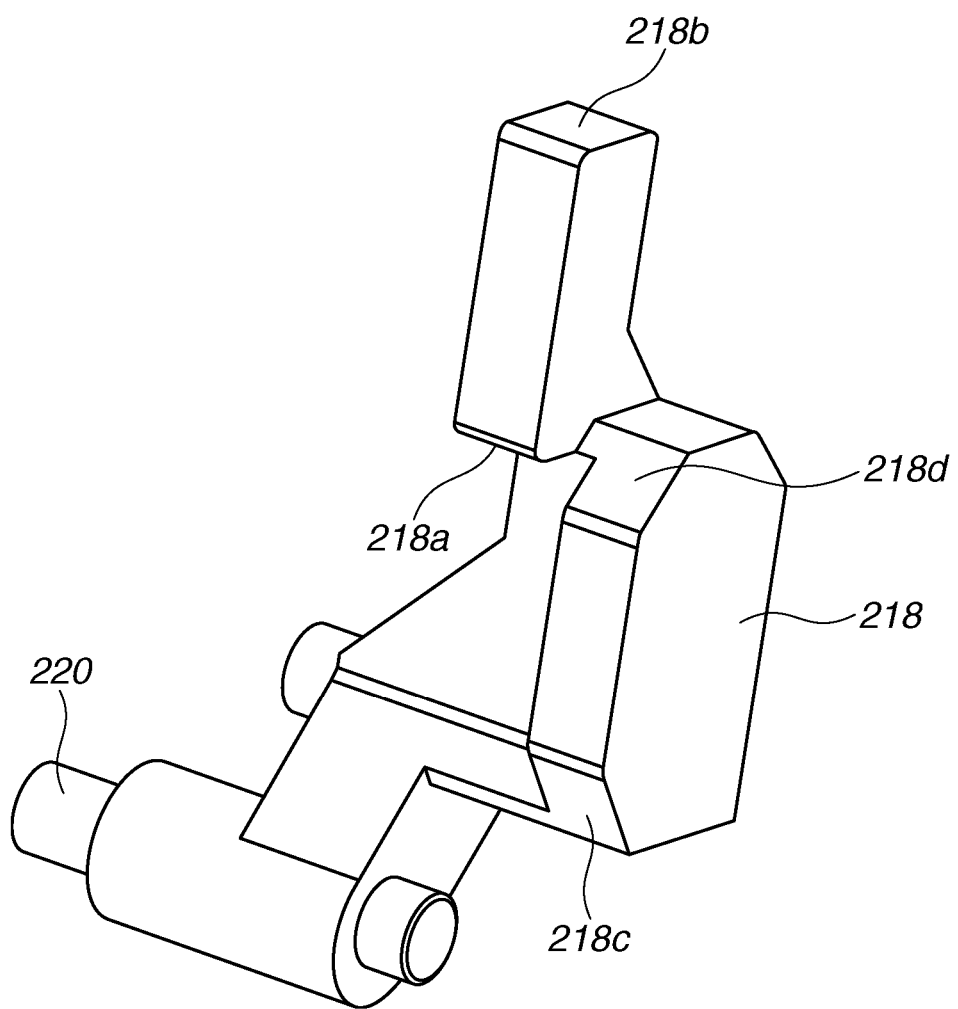
FIG. 5 is an enlarged perspective view of a lock lever according to the first exemplary embodiment.

FIG. 5 is an enlarged perspective view of the lock lever 218.

As illustrated in FIG. 5, the lock lever 218 includes a first cam portion 218c, a second cam portion 218d, a down lock portion 218a, and an up lock portion 218b.

The lock lever 218 is mounted on the driving unit based 216 to be rotatable around a lock lever rotational shaft 220.

FIGS. 6A and 6B are side views illustrating the mirror driving unit driving the main mirror 202 and the sub-mirror 203 between the mirror-down position and the mirror-up position according to the present exemplary embodiment. Incidentally, the main mirror 202 and the sub-mirror 203 are not illustrated in FIGS. 6A and 6B.

FIG. 6A illustrates a state in which the main mirror 202 and the sub-mirror 203 are in the mirror-down position. FIG. 6A illustrates a state in which the main mirror 202 and the sub-mirror 203 are in the mirror-up position.

A lock lever urging spring 219 urges the lock lever 218 in the direction of arrow 305. The lock lever urging spring 219 functions as a first urging member configured to urge the lock lever 218 toward the respective restriction positions.

A first lock lever restriction shaft 222 and a second lock lever restriction shaft 223 are formed on the driving unit base 216. A lock lever buffer rubber 221 is mounted on the first lock lever restriction shaft 222.

In the states illustrated in FIGS. 6A and 6B, the lock lever 218 is urged by the lock lever urging spring 219 in the direction of arrow 305 and is thus in contact with the second lock lever restriction shaft 223.

As illustrated in FIG. 6A, when the main mirror 202 and the sub-mirror 203 are in the mirror-down position, the lock lever 218 is urged by the lock lever urging spring 219 in the direction of arrow 305 and is thus in contact with the second lock lever restriction shaft 223.

At this time, the down lock portion 218a of the lock lever 218 latches a down lock latched portion 211e of the mirror driving holder 211. Accordingly, the lock lever 218 restricts the movement of the mirror driving holder 211 in the direction of arrow 300. Therefore, the main mirror 202 and the sub-mirror 203 can be kept in the mirror-down position without the step motor 213 being energized.

As illustrated in FIG. 6B, when the main mirror 202 and the sub-mirror 203 are in the mirror-up position, the lock lever 218 is urged by the lock lever urging spring 219 in the direction of arrow 350 and is thus in contact with the second lock lever restriction shaft 223.

At this time, the up lock portion 218b of the lock lever 218 latches an up lock latched portion 211f of the mirror driving holder 211. Accordingly, the lock lever 218 restricts the movement of the mirror driving holder 211 in the direction of arrow 301. Therefore, the main mirror 202 and the sub-mirror 203 can be kept in the mirror-up position without the step motor 213 being energized.

Since the up lock portion 218b of the lock lever 218 latches the up lock latched portion 211f of the mirror driving holder 211, even if the main mirror 202 bounces at the mirror-up position, the amount of bounce of the main mirror 202 can be reduced.

Furthermore, the surfaces of the down lock portion 2118a and the up lock portion 218b of the lock lever 218 are shaped in such a manner that a force applied from the mirror driving holder 211 acts toward the center of the lock lever rotational shaft 220.

Moving the unlock nut 217, to be described below, releases the mirror driving holder 211 from being latched by the lock lever 218. At this time, the lock lever 218 turns against the urging force of the lock lever urging spring 219 and then contacts the lock lever buffer rubber 221, which is mounted on the lock lever restriction shaft 222.

FIGS. 7A and 7B and FIGS. 9A and 9B to FIGS. 15A and 15B illustrate the mirror driving unit driving the main mirror 202 and the sub-mirror 203 between the mirror-down position and the mirror-up position according to the first exemplary embodiment.

FIG. 7A is a side view of the mirror driving unit when the main mirror 202 and the sub-mirror 203 are in the mirror-down position. FIG. 7B is a sectional view of the drive nut 210, the unlock nut 217, and the lead screw 214 when the mirror driving unit is in the state illustrated in FIG. 7A. The state illustrated in FIG. 7A corresponds to the states illustrated in FIGS. 4A and 6A.

More specifically, the lock lever 218 is urged by the lock lever urging spring 219 in the direction of arrow 305 and is thus in contact with the second lock lever restriction shaft 223. The down lock portion 218a latches the down lock latched portion 211e of the mirror driving holder 211.

As illustrated in FIG. 7A, in this state, the unlock nut 217 is not in contact with the lock lever 218. As illustrated in FIG. 7B, the amount of backlash between the lead screw 214 and the drive nut 210 is larger than the amount of backlash between the lead screw 214 and the unlock nut 217.

Therefore, as the lead screw 214 is driven to rotate, only the unlock nut 217 rectilinearly moves without the drive nut 210 rectilinearly moving. After that, both the drive nut 210 and the unlock nut 217 rectilinearly move. In other words, there are set a first drive region in which only the unlock nut 217 rectilinearly moves without the drive nut 210 rectilinearly moving and a second drive region in which both the drive nut 210 and the unlock nut 217 rectilinearly move.

FIG. 8A is a sectional view illustrating the amount of backlash between the lead screw 214 and the drive nut 210. FIG. 8B is a sectional view illustrating the amount of backlash between the lead screw 214 and the unlock nut 217.

The amount of backlash x between the lead screw 214 and the drive nut 210 is set as illustrated in FIG. 8A. The amount of backlash z between the lead screw 214 and the unlock nut 217 is set as illustrated in FIG. 8B. The amount of backlash x is set larger than the amount of backlash z as described above. A difference S obtained by subtracting the amount of backlash z from the amount of backlash x corresponds to an amount of movement by which only the unlock nut 217 rectilinearly moves without the drive nut 210 rectilinearly moving.

As the lead screw 214 is driven to rotate in the direction of arrow 302 in FIGS. 7A and 7B, the lead screw 214 starts the rectilinear movement of the unlock nut 217 after rotating idle by the amount of backlash z. At this time, since the tooth 214b of the lead screw 214 does not mesh with the tooth 210a of the drive nut 210, the drive nut 210 does not start rectilinearly moving. Thus, the lead screw 214 has not yet absorbed the amount of backlash x.

FIG. 9A is a side view illustrating the mirror driving unit in a state in which the lead screw 214 has been driven to rotate in the direction of arrow 302 from the state illustrated in FIG. 7A. Between the state illustrated in FIG. 7A and state illustrated in FIG. 9A, the unlock nut 217 rectilinearly moves in the direction of arrow 300, and the drive nut 210 does not rectilinearly move from the state illustrated in FIG. 7A. FIG. 9B is a sectional view of the drive nut 210, the unlock nut 217, and the lead screw 214 in the state illustrated in FIG. 9A.

In the state illustrated in FIG. 9A, the unlock nut 217 rectilinearly moves in the direction of arrow 300 and a down unlock portion 217a of the unlock nut 217 contacts the first cam portion 218c of the lock lever 218. Then, the down unlock portion 217a of the unlock nut 217 pushes the first cam portion 218c of the lock lever 218 with a force larger than the urging force of the lock lever urging spring 219. This causes the lock lever 218 to turn in the direction of arrow 306 to release the down lock latched portion 211e from being latched by the down lock portion 218a.

In the state illustrated in FIG. 9A, since the drive nut 210 does not rectilinearly move in the direction of arrow 300, the mirror driving holder 211 is in the same state as the state illustrated in FIG. 7A, and the main mirror 202 and the sub-mirror 203 are in the mirror-down position.

The above-described difference S, which is obtained by subtracting the amount of backlash z from the amount of backlash x, is set so as to obtain the amount of movement of the unlock nut 217 required for releasing the down lock latched portion 211e from being latched by the down lock portion 218a.

Figure 10B:
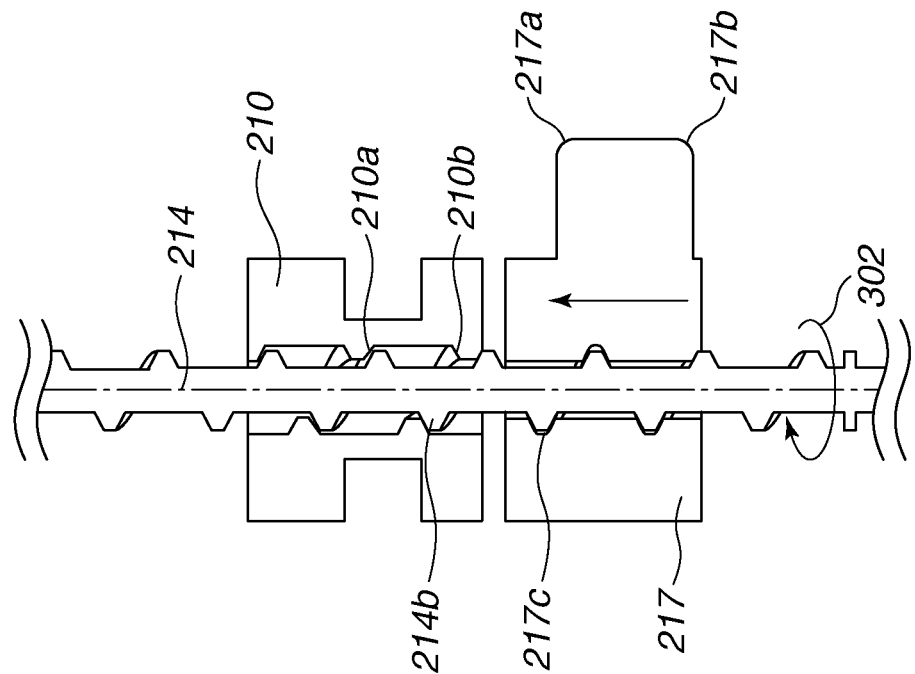
Figure 10A:
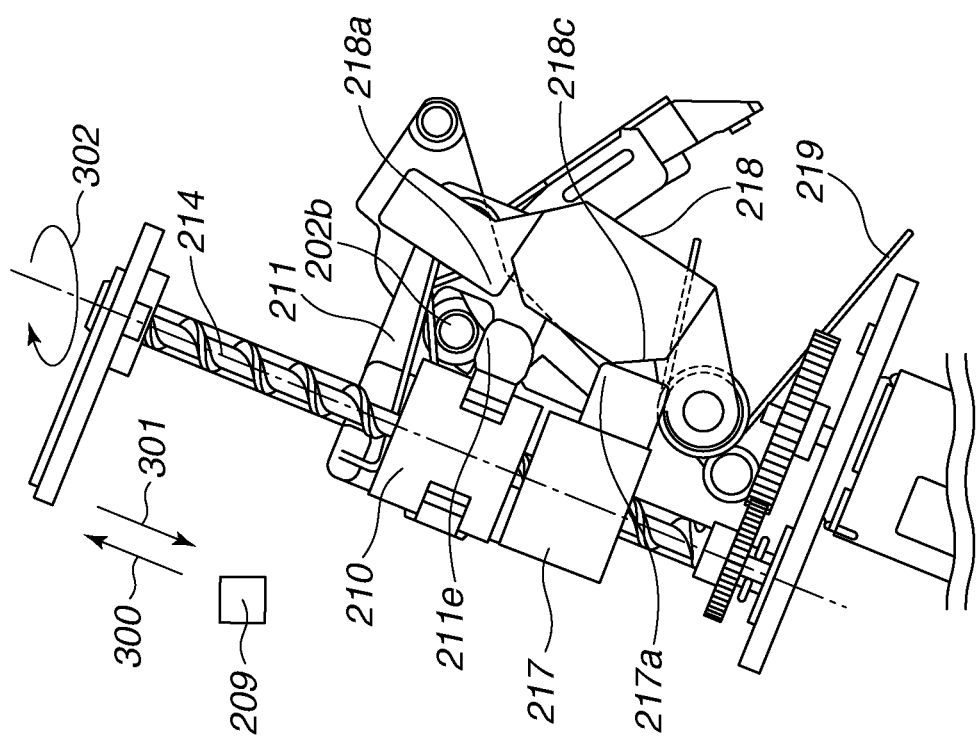

FIG. 10A is a side view of the mirror driving unit in a state in which the lead screw 214 has been driven to rotate in the direction of arrow 302 from the state illustrated in FIG. 9A. Even between the state illustrated in FIG. 9A and the state illustrated in FIG. 10A, only the unlock nut 217 rectilinearly moves in the direction of arrow 300. FIG. 10B is a sectional view of the drive nut 210, the unlock nut 217, and the lead screw 214 in the state illustrated in FIG. 10A.

In the state illustrated in FIG. 10A, the unlock nut 217 has completed rectilinearly moving by the above-described difference S in the amount of backlash. At this time, the unlock nut 217 keeps a state in which the down lock latched portion 211e is released from being latched by the down lock unit 218a. Then, as illustrated in FIG. 10B, the lead screw 214 absorbs the amount of backlash x to allow the tooth 214b of the lead screw 214 to mesh with the tooth 210a of the drive nut 210.

An interval from the state illustrated in FIG. 7A to the state illustrated in FIG. 10A corresponds to the first drive region, in which only the unlock nut 217 rectilinearly moves in the direction of arrow 300 due to the rotational driving of the lead screw 214 and the drive nut 210 does not rectilinearly move in the direction of arrow 300. Accordingly, the mirror driving holder 211 can be released from being latched by the lock lever 218 while the mirror driving holder 211 is in the stopped state.

Figure 11B:
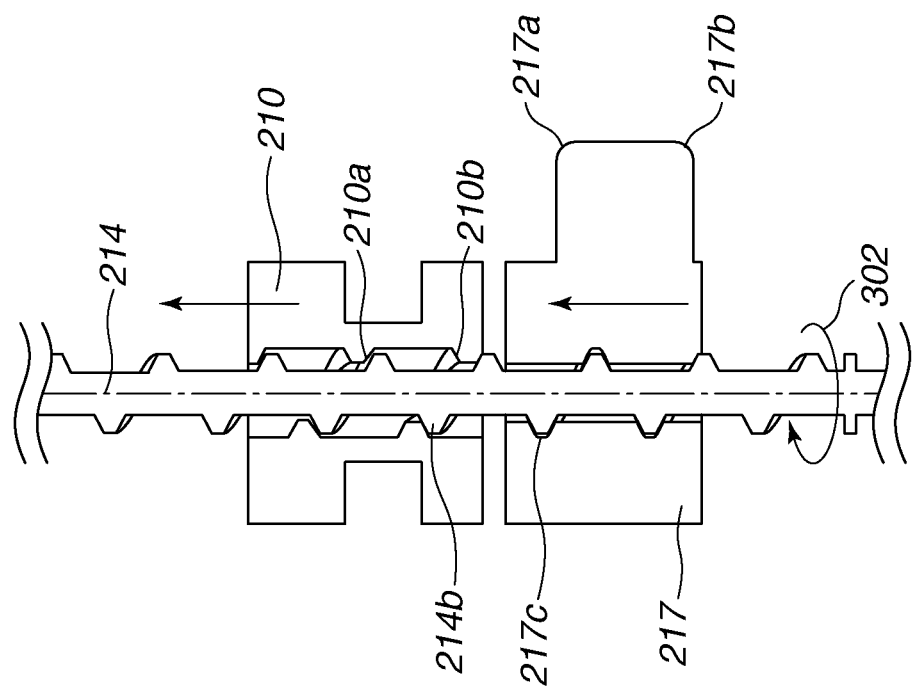
Figure 11A:
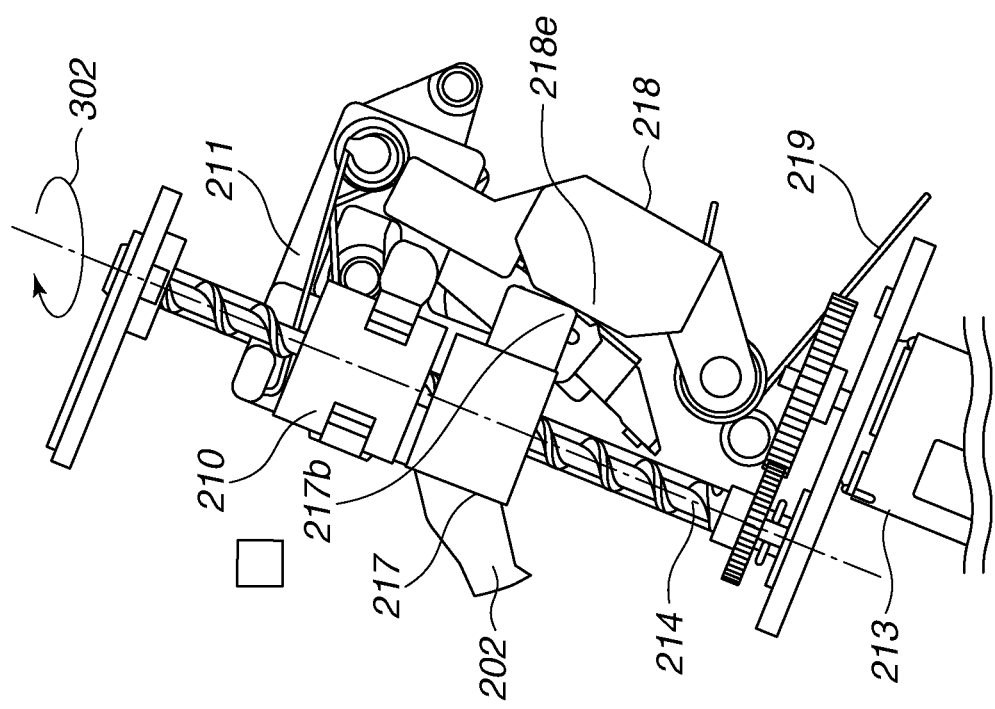

FIG. 11A is a side view of the mirror driving unit in a state in which the lead screw 214 has been driven to rotate in the direction of arrow 302 from the state illustrated in FIG. 10A. Between the state illustrated in FIG. 10A and the state illustrated in FIG. 11A, the drive nut 210 and the unlock nut 217 rectilinearly move in the direction of arrow 300. FIG. 11B is a sectional view of the drive nut 210, the unlock nut 217, and the lead screw 214 in the state illustrated in FIG. 11A.

In the state illustrated in FIG. 11A, the drive nut 210 rectilinearly moves in the direction of arrow 300 due to the rotational driving of the lead screw 214, and the mirror driving holder 211 also rectilinearly moves in the direction of arrow 300. This causes the main mirror 202 and the sub-mirror 203 to start a mirror-up operation. At this time, the unlock nut 217 also rectilinearly moves in the direction of arrow 300, so that an up unlock portion 217b of the unlock nut 217 slides on a sliding surface 218e of the lock lever 218. This keeps a state in which the down lock latched portion 211e is released from being latched by the down lock portion 218a.

FIG. 12A is a side view of the mirror driving unit in a state in which the lead screw 214 has been driven to rotate in the direction of arrow 302 from the state illustrated in FIG. 11A. Between the state illustrated in FIG. 11A and the state illustrated in FIG. 12A, the drive nut 210 and the unlock nut 217 rectilinearly move in the direction of arrow 300. FIG. 12B is a sectional view of the drive nut 210, the unlock nut 217, and the lead screw 214 in the state illustrated in FIG. 12A.

In the state illustrated in FIG. 12A, the drive nut 210 rectilinearly moves in the direction of arrow 300 due to the rotational driving of the lead screw 214, so that the main mirror 202 and the sub-mirror 203 reach the mirror-up position. The state illustrated in FIG. 12A corresponds to the states illustrated in FIGS. 4C and 6B.

When the mirror driving unit comes into the state illustrated in FIG. 12A from the state illustrated in FIG. 11A, the up unlock portion 217b of the unlock nut 217 slides on the second cam portion 218d of the lock lever 218. Accordingly, the lock lever 218 turns counterclockwise due to the urging force of the lock lever urging spring 219.

In the state illustrated in FIG. 12A, the up unlock portion 217b moves away from the second cam portion 218d and the lock lever 218 contacts the second lock lever restriction shaft 223. At this time, the up lock portion 218b of the lock lever 218 latches the up lock latched portion 211f of the mirror driving holder 211. Thus, the lock lever 218 restricts the mirror driving holder 211 from moving in the direction of arrow 301. Therefore, in the state illustrated in FIG. 12A, the main mirror 202 and the sub-mirror 203 can be kept in the mirror-up position without the step motor 213 being energized.

An interval from the state illustrated in FIG. 11A to the state illustrated in FIG. 12A corresponds to the second drive region, in which the drive nut 210 and the unlock nut 217 rectilinearly move in the direction of arrow 300 due to the rotational driving of the lead screw 214.

Figure 13B:
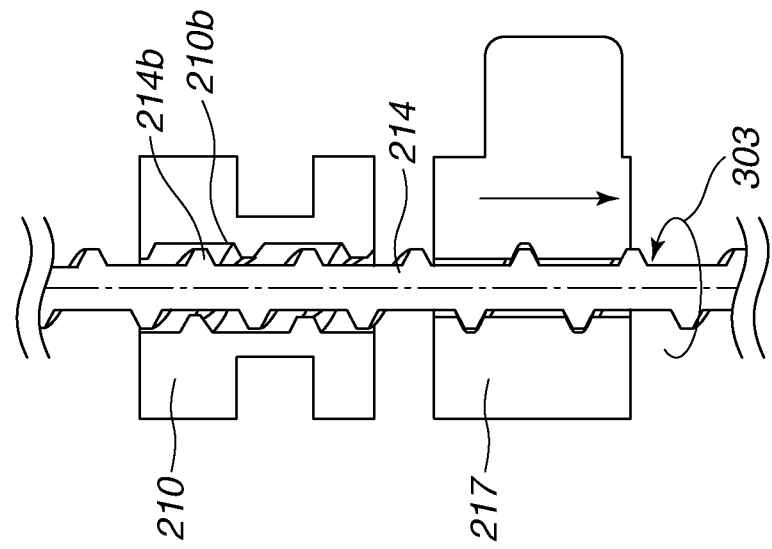
Figure 13A:
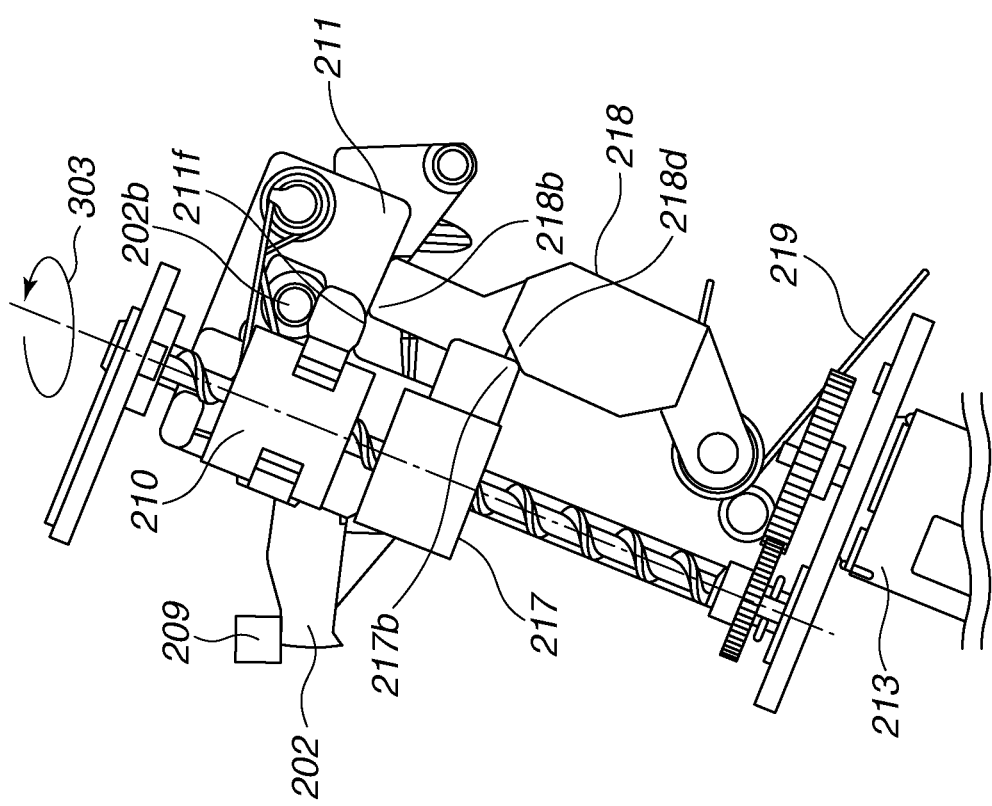

FIG. 13A is a side view of the mirror driving unit in a state in which the lead screw 214 has been driven to rotate in the direction of arrow 303 from the state illustrated in FIG. 12A, so that only the unlock nut 217 has rectilinearly moved in the direction of arrow 301. FIG. 13B is a sectional view of the drive nut 210, the unlock nut 217, and the lead screw 214 in the state illustrated in FIG. 13A.

In the state illustrated in FIG. 13A, the unlock nut 217 rectilinearly moves in the direction of arrow 301, and the up unlock portion 217b of the unlock nut 217 contacts the second cam portion 218d. Then, the up unlock portion 217b of the unlock nut 217 pushes the second cam portion 218d of the lock lever 218 with a force larger than the urging force of the lock lever urging spring 219. This causes the lock lever 218 to turn in the direction of arrow 306 to release the up lock latched portion 211f from being latched by the up lock portion 218b.

In the state illustrated in FIGS. 13A and 13B, when the lead screw 214 is driven to rotate in the direction of arrow 303, the lead screw 214 starts the rectilinear movement of the unlock nut 217 in the direction of arrow 301 after rotating idle by the amount of backlash z. At this time, since the tooth 214b of the lead screw 214 is not in mesh with the tooth 210a of the drive nut 210, the drive nut 210 does not start rectilinearly moving.

In the state illustrated in FIG. 13A, since the drive nut 210 does not rectilinearly move in the direction of arrow 301, the mirror driving holder 211 is in the same state as the state illustrated in FIG. 12A, so that the main mirror 202 and the sub-mirror 203 are in the mirror-up position.

Figure 14B:
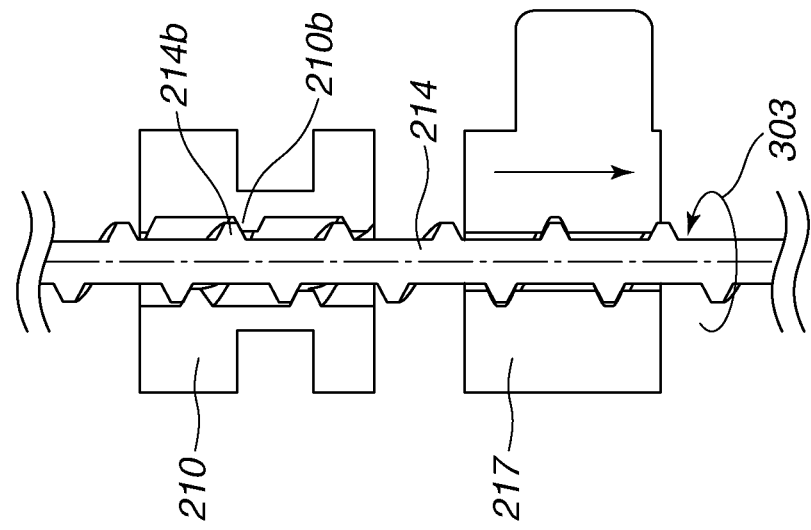
Figure 14A:
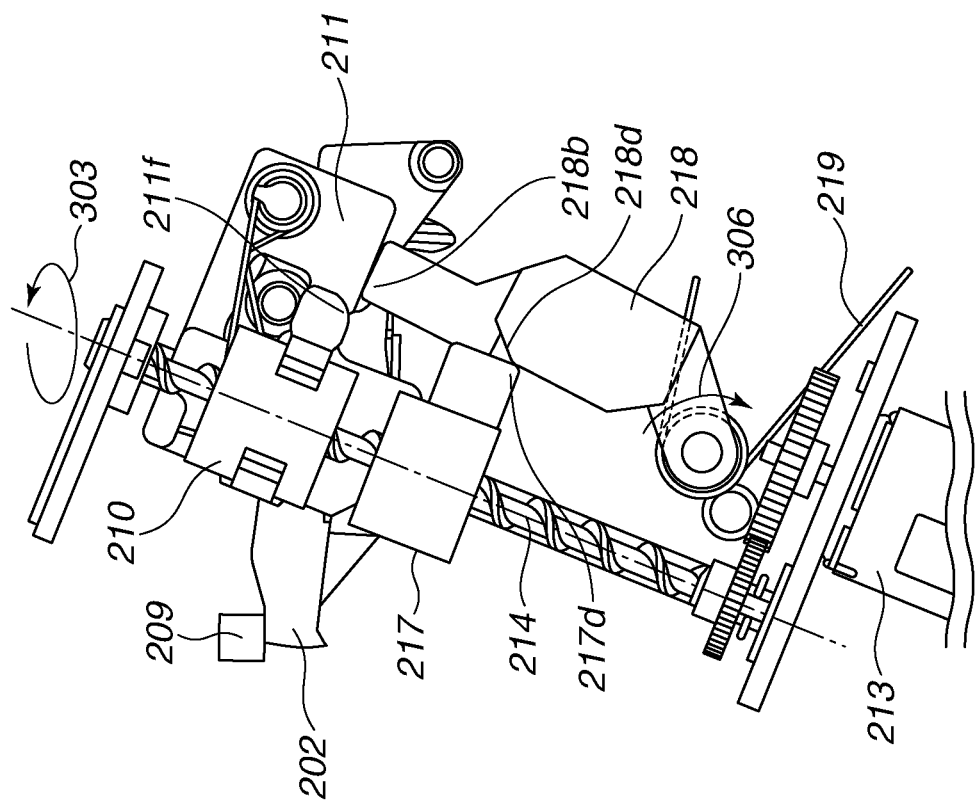

FIG. 14A is a side view of the mirror driving unit in a state in which the lead screw 214 has been driven to rotate in the direction of arrow 303 from the state illustrated in FIG. 13A, so that only the unlock nut 217 has rectilinearly moved in the direction of arrow 301. FIG. 14B is a sectional view of the drive nut 210, the unlock nut 217, and the lead screw 214 in the state illustrated in FIG. 14A.

In the state illustrated in FIG. 14A, the unlock nut 217 has completed rectilinearly moving by the above-described difference S in the amount of backlash. At this time, the up unlock portion 217b of the unlock nut 217 slides on the sliding surface 218e of the lock lever 218. This keeps a state in which the down lock latched portion 211e is released from being latched by the down lock portion 218a. As illustrated in FIG. 14B, the lead screw 214 absorbs the amount of backlash x to allow the tooth 214b of the lead screw 214 to mesh with the tooth 210b of the drive nut 210.

An interval from the state illustrated in FIG. 13A to the state illustrated in FIG. 14A corresponds to the first drive region, in which only the unlock nut 217 rectilinearly moves in the direction of arrow 301 due to the rotational driving of the lead screw 214 and the drive nut 210 does not rectilinearly move in the direction of arrow 301. Accordingly, the mirror driving holder 211 can be released from being latched by the lock lever 218 while the mirror driving holder 211 is in the stopped state.

FIG. 15A is a side view of the mirror driving unit in a state in which the lead screw 214 has been driven to rotate in the direction of arrow 303 from the state illustrated in FIG. 14A, so that the drive nut 210 and the unlock nut 217 have rectilinearly moved in the direction of arrow 301. FIG. 15B is a sectional view of the drive nut 210, the unlock nut 217, and the lead screw 214 in the state illustrated in FIG. 15A.

In the state illustrated in FIG. 15A, the drive nut 210 and the unlock nut 217 rectilinearly move in the direction of arrow 301 while being at a distance of the above-described difference S from each other. The drive nut 210 rectilinearly moves in the direction of arrow 301 due to the rotational driving of the lead screw 214, and the mirror driving holder 211 also moves in the direction of arrow 301. This cause the main mirror 202 and the sub-mirror 203 to start a mirror-down operation. At this time, the up unlock portion 217b of the unlock nut 217 slides on the sliding surface 218e of the lock lever 218 to keep a state in which the down lock latched portion 211e is released from being latched by the down lock portion 218a.

When the lead screw 214 is driven to rotate in the direction of arrow 303 from the state illustrated in FIG. 15A, the drive nut 210 and the unlock nut 217 rectilinearly move in the direction of arrow 301 while being at a distance of the above-described difference S from each other. Then, the down unlock portion 217a of the unlock nut 217 slides on the first cam portion 218c of the lock lever 218, so that the lock lever 218 turns counterclockwise due to the urging force of the lock lever urging spring 219.

When the lead screw 214 is driven to rotate in the direction of arrow 303 up to the state illustrated in FIG. 7A, the down unlock portion 217a moves away from the first cam portion 218c, and the lock lever 218 contacts the second lock lever restriction shaft 223. Accordingly, the down lock portion 218a of the lock lever 218 latches the down lock latched portion 211e of the mirror driving holder 211. This returns the mirror driving unit to the state illustrated in FIG. 7A. Therefore, in the state illustrated in FIG. 7A, the main mirror 202 and the sub-mirror 203 can be kept in the mirror-down position without the step motor 213 being energized.

An interval from the state illustrated in FIG. 14A to the state illustrated in FIG. 7A corresponds to the second drive region, in which the drive nut 210 and the unlock nut 217 rectilinearly move in the direction of arrow 301 due to the rotational driving of the lead screw 214.

When the camera body 200 with the photographic lens 100 attached thereto starts a shooting operation with the main mirror 202 and the sub-mirror 203 kept in the mirror-down position, the step motor 213 drives the lead screw 214 to rotate in the direction of arrow 302. Accordingly, the camera body 200 performs the mirror-up operation described with reference to FIGS. 7A and 7B and FIGS. 9A and 9B to FIGS. 12A and 12B. Then, the camera body 200 performs an exposure operation with the main mirror 202 and the sub-mirror 203 kept in the mirror-down position. When the exposure operation is completed, the step motor 213 drives the lead screw 214 to rotate in the direction of arrow 303, thus performing the mirror-down operation described with reference to FIGS. 13A and 13B to FIGS. 15A and 15B.

Figure 16:
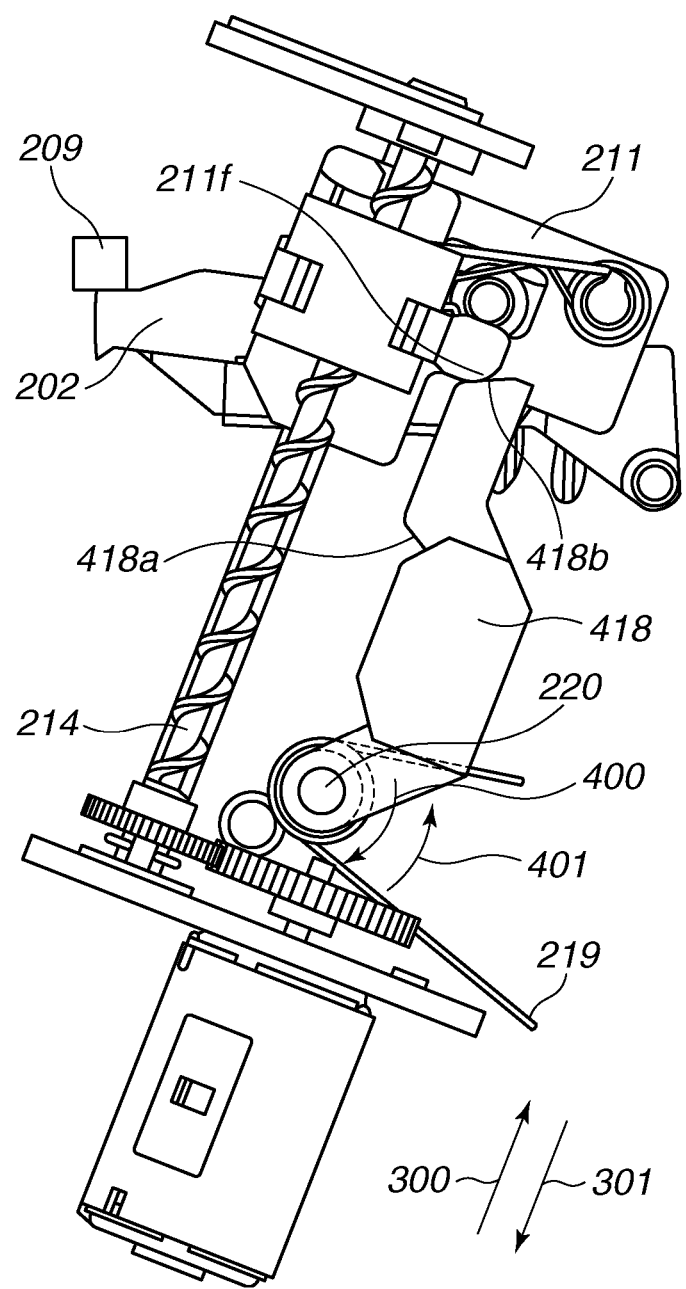
FIG. 16 is a side view illustrating the lock lever according to a modification example of the first exemplary embodiment.

FIG. 16 is a side view illustrating the mirror driving unit including a lock lever 418 as a modification example of the lock lever 218 according to the first exemplary embodiment. The mirror driving unit illustrated in FIG. 16 differs from that according to the first exemplary embodiment only in that the lock lever 218 is changed to the lock lever 418. More specifically, the shapes of a down lock portion 418a and an up lock portion 418b formed on the lock lever 418 are different from the shapes of the down lock portion 218a and the up lock portion 218b.

The down lock portion 418a and the up lock portion 418b of the lock lever 418 are formed in a slope shape. This causes, for example, in the state illustrated in FIG. 16, a component of a force applied from the mirror driving holder 211 to act in a direction to rotate the lock lever 418 in the direction of arrow 400. Therefore, a force required for the unlock nut 217 to release the up lock latched portion 211f of the mirror driving holder 211 from being latched by the up lock portion 418b of the lock lever 418 can be made smaller than that in the first exemplary embodiment.

Furthermore, also when the up lock latched portion 211f of the mirror driving holder 211 is latched by the up lock portion 418b of the lock lever 418, the mirror driving holder 211 can be pushed up in the direction of arrow 300 due to the slope shape of the up lock portion 418b.

Since the down lock portion 418a of the lock lever 418 is also formed in a slope shape, even in the mirror-down position, a component of a force applied from the mirror driving holder 211 acts in a direction to rotate the lock lever 418 in the direction of arrow 400. Also, in the mirror-down position, even when the mirror driving holder 211 is latched by the lock lever 418, the mirror driving holder 211 can be pushed down in the direction of arrow 301 due to the slope shape of the down lock portion 418a.

Next, a second exemplary embodiment of the present invention is described with reference to FIG. 17 to FIGS. 29A, 29B, and 29C.

Figure 17:
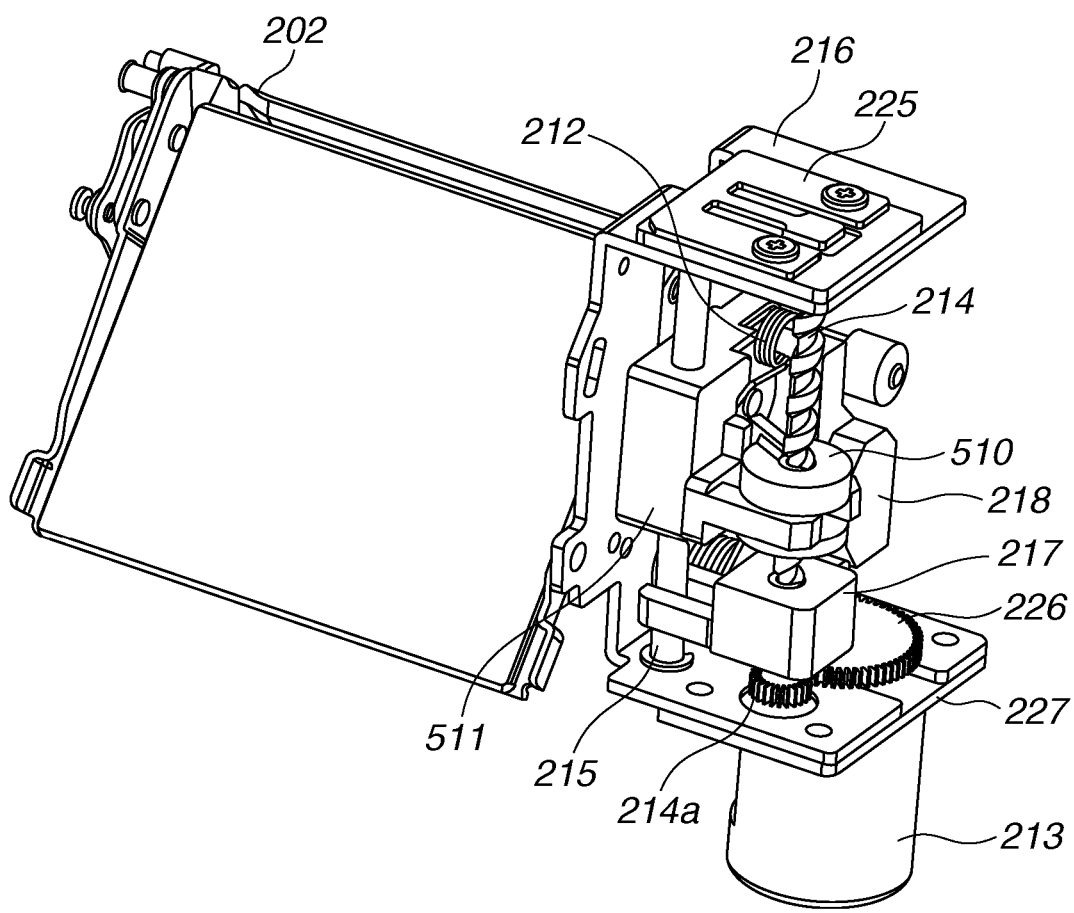
FIG. 17 is a perspective view of a mirror driving unit according to a second exemplary embodiment.

FIG. 17 is a perspective view illustrating a mirror driving unit (a mirror driving device) according to the second exemplary embodiment. Members similar to those in the above-described first exemplary embodiment are assigned with the respective same reference numerals.

As illustrated in FIG. 17, the mirror driving unit includes a main mirror 202, a mirror driving holder 511, a drive nut 510, a lead screw 214, a step motor 213, a lock lever 218, and an unlock nut 217.

The main mirror 202 serves as a mirror member configured to be movable between the mirror-down position and the mirror-up position. The mirror driving holder 511 serves as a mirror driving portion configured to engage with the main mirror 202. The drive nut 511 serves as a rotatable meshing portion configured to mesh with the lead screw 214 and rotatably mounted on the mirror driving holder 511. The drive nut 510 and the mirror driving holder 511 serve as a mirror driving member configured to rectilinearly move due to rotational driving of the lead screw 214 to drive the main mirror 202 between the mirror-down position and the mirror-up position. The step motor 213 serves as a drive source. The lock lever 218 serves as a restriction member configured to be movable between a restriction position that restricts the rectilinear movement of the drive nut 510 and the mirror driving holder 511 and a restriction release position that releases the restriction of the drive nut 510 and the mirror driving holder 511. The unlock nut 217 serves as a drive member configured to mesh with the lead screw 214 and to rectilinear move due to rotational driving of the lead screw 214 to drive the lock lever 218 between the restriction position and the restriction release position.

The step motor 213 is mounted to a motor base 227. The motor base 227, to which the step motor 213 is mounted, is mounted to a driving unit base 216. A pinion gear 226 is fixed to the rotational shaft of the step motor 213. The lead screw 214 is rotatably mounted to the driving unit base 216.

A leaf spring 225, which urges the lead screw 214 toward the step motor 213, is mounted to the driving unit base 216.

The lead screw 214 is mounted to the driving unit base 216 in such a manner that the lead screw 214 is approximately parallel to a line connecting the position of a drive pin 202b of the main mirror 202 when the main mirror 202 is in the mirror-down position and the position of the drive pin 202b when the main mirror 202 is in the mirror-up position. The lead screw 214 includes a gear portion 214a. The gear portion 214a of the lead screw 214 meshes with the pinion gear 226. A guide shaft 215 is mounted to the driving unit base 216 in parallel with the lead screw 214.

Accordingly, the guide shaft 215 is also mounted to the driving unit base 216 in such a manner that the guide shaft 215 is approximately parallel to a line connecting the position of the drive pin 202b when the main mirror 202 is in the mirror-down position and the position of the drive pin 202b when the main mirror 202 is in the mirror-up position.

Figure 18:
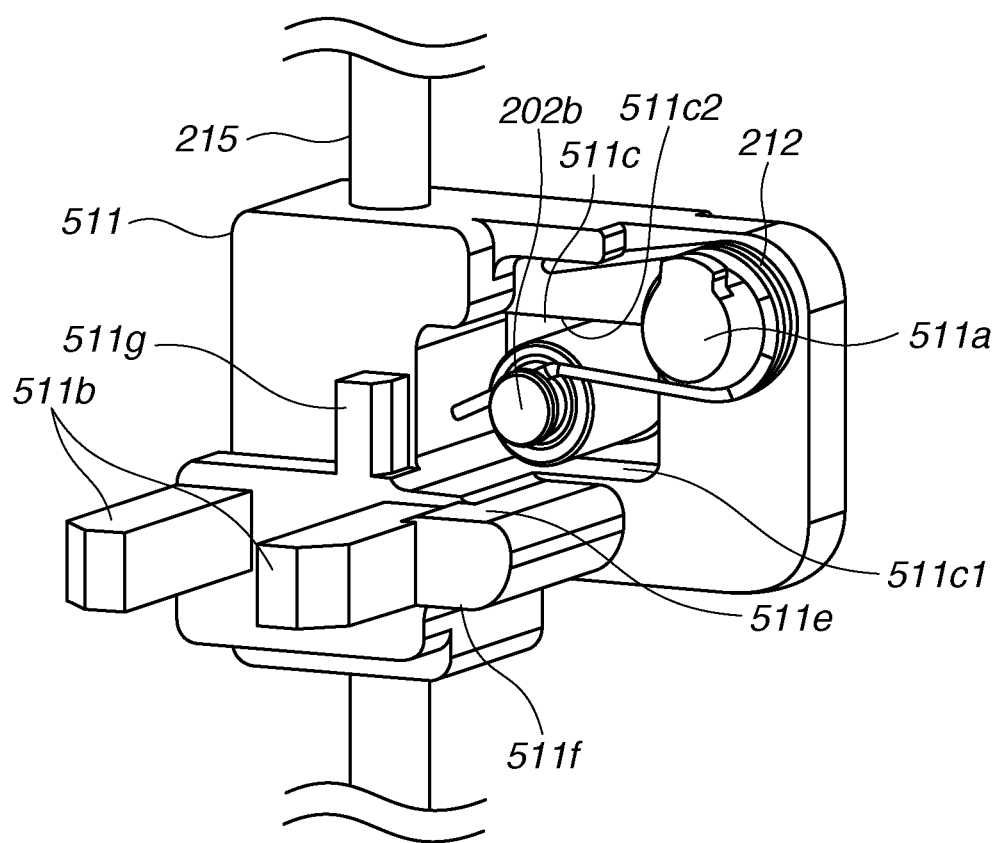
FIG. 18 is an enlarged perspective view of a mirror driving holder according to the second exemplary embodiment.

FIG. 18 is an enlarged perspective view of the mirror driving holder 511.

As illustrated in FIG. 18, a spring mounting portion 511a, a drive nut holding portion 511b, a drive pin engaging portion 511c, and a rotation restriction portion 511g are formed on the mirror driving holder 511. The coiled portion of a torsion spring 212 is freely fitted on the spring mounting portion 511a. The drive pin 202b, which is formed on the main mirror 202, is inserted into the drive pin engaging portion 511c. Drive pin stoppers 511c1 and 511c2 are formed on the drive pin engaging portion 511c.

One end of the torsion spring 212, which is mounted on the spring mounting portion 511a, is supported by the mirror driving holder 511, and the other end of the torsion spring 212 is supported by the drive pin 202b. This enables the torsion spring 212 to urge the drive pin 202b toward the drive pin stopper 511c1.

The drive nut 510, which meshes with the lead screw 214, is rotatably held by the drive nut holding portion 511b. The drive nut 510 includes a protrusion 510a. When the drive nut 510, which is held by the drive nut holding portion 511b, rotates, the protrusion 510a contacts the rotation restriction portion 511g. The contact of the protrusion 510a with the rotation restriction portion 511g restricts the rotation of the drive nut 510 relative to the mirror driving holder 511.

The mirror driving holder 511 rectilinearly moves while being guided by the guide shaft 215. Accordingly, as the lead screw 214 is driven to rotate by the step motor 213 and the rotation of the drive nut 510 relative to the mirror driving holder 511 is restricted, the drive nut 510 and the mirror driving holder 511 rectilinearly move integrally with each other along the guide shaft 215.

Figure 19:
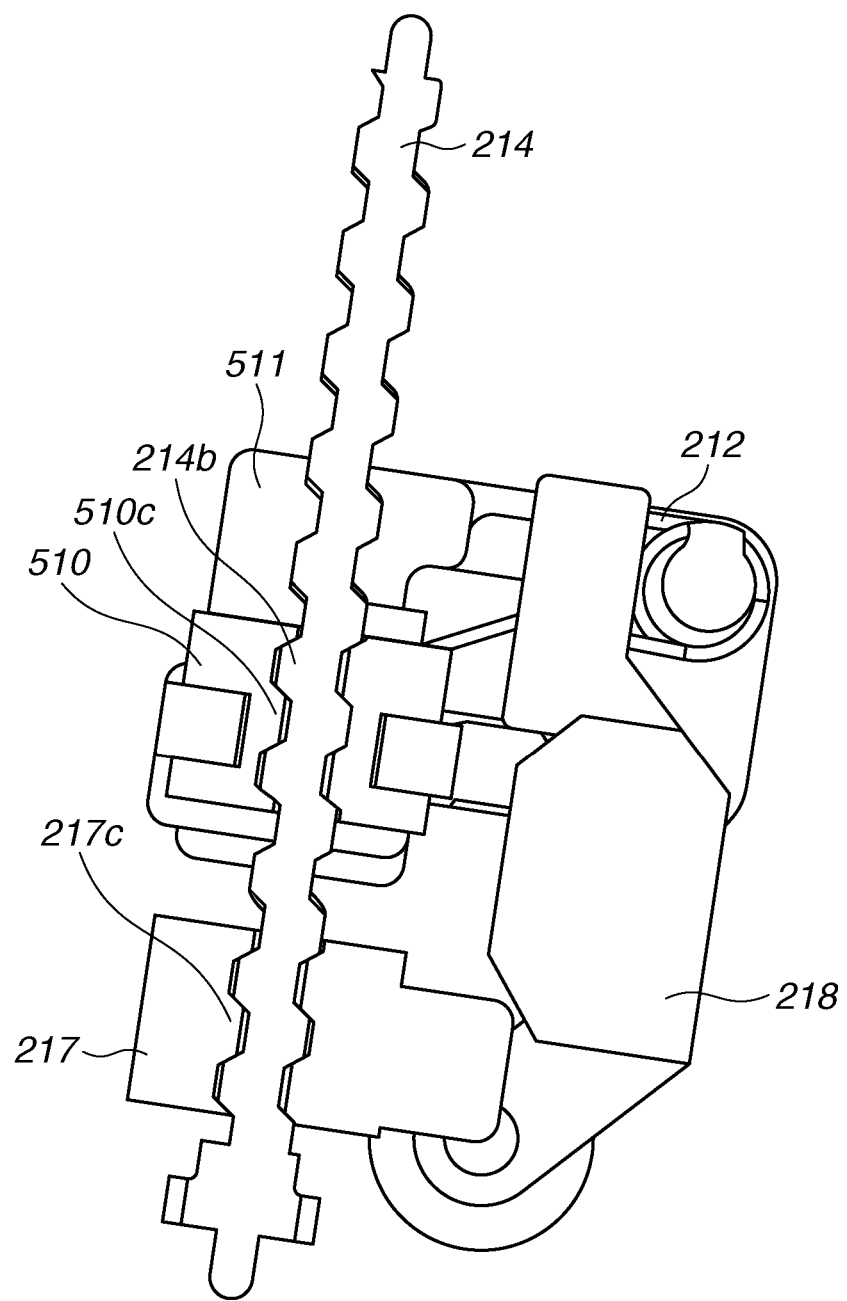
FIG. 19 is a sectional view of a lead screw and a drive nut taken along a rotational center axis of the lead screw according to the second exemplary embodiment.

FIG. 19 is a sectional view of the lead screw 214 and the drive nut 510 taken along the rotational center axis of the lead screw 214. As illustrated in FIG. 19, the tooth 214b of the lead screw 214 meshes with the tooth 510c of the drive nut 510. When the lead screw 214 rotates, the drive nut 510 also rotates in the same direction as the rotational direction of the lead screw 214 due to the frictional force occurring at the contact surface between the tooth 214b of the lead screw 214 and the tooth 510c of the drive nut 510.

Therefore, when the lead screw 214 is driven to rotate, the drive nut 510 rotates together with the lead screw 214 without rectilinearly moving along the lead screw 214. In other words, when the drive nut 510 is allowed to rotate relative to the mirror driving holder 511, the drive nut 510 and the mirror driving holder 511 do not rectilinearly move even when the lead screw 214 is driven to rotate.

When the pitch of the lead screw 214 is denoted by P and the amount of rectilinear movement required for the unlock nut 217 to release the latching of the lock lever 218 is denoted by S, the rotational angle α° by which the drive nut 510 rotates together with the lead screw 214 satisfies the following relationship:

$$\alpha \geq S/P \times 360$$

As illustrated in FIG. 19, the tooth 217c of the unlock nut 217 also meshes with the tooth 214b of the lead screw 214. However, since the guide shaft 215 is inserted into the unlock nut 217, the unlock nut 217 does not rotate together with the lead screw 214.

Accordingly, there are set a first drive region in which only the unlock nut 217 rectilinearly moves without the drive nut 510 rectilinearly moving and a second drive region in which both the drive nut 510 and the unlock nut 217 rectilinearly move.

FIGS. 20A and 20B to FIG. 28 illustrate the mirror driving unit driving the main mirror 202 and the sub-mirror 203 between the mirror-down position and the mirror-up position according to the second exemplary embodiment.

FIG. 20A is a side view of the mirror driving unit when the main mirror 202 and the sub-mirror 203 are in the mirror-down position. FIG. 20B illustrates the mirror driving holder 511, the drive nut 510, the torsion spring 212, the lead screw 214, and the guide shaft 215 in the state illustrated in FIG. 20A as viewed from the direction A in FIG. 20A.

In the state illustrated in FIG. 20A, the lock lever 218 is urged by the lock lever urging spring 219 in the direction of arrow 305, and is thus in contact with the second lock lever restriction shaft 223. The down lock portion 218a of the lock lever 218 latches the down lock latched portion 511e of the mirror driving holder 511.

As illustrated in FIG. 20A, in this state, the unlock nut 217 is not in contact with the lock lever 218. As illustrated in FIG. 20B, the protrusion 510a of the drive nut 510 is in contact with the rotation restriction portion 511g of the mirror driving holder 511. Therefore, the drive nut 510 is restricted from rotating in the direction of arrow 503.

FIG. 21A is a side view of the mirror driving unit in a state in which the lead screw 214 has been driven to rotate in the direction of arrow 502 from the state illustrated in FIG. 20A. FIG. 21B illustrates the mirror driving holder 511, the drive nut 510, the torsion spring 212, the lead screw 214, and the guide shaft 215 in the state illustrated in FIG. 21A as viewed from the direction A in FIG. 21A.

Between the state illustrated in FIG. 20A and the state illustrated in FIG. 21A, the unlock nut 217 rectilinearly moves in the direction of arrow 300. At this time, as illustrated in FIG. 21B, the drive nut 510 rotates in the direction of arrow 502 relative to the mirror driving holder 511. The drive nut 510 only rotates in the direction of arrow 502 relative to the mirror driving holder 511, and does not rectilinearly move in the direction of arrow 300.

In the state illustrated in FIG. 21A, the unlock nut 217 rectilinearly moves in the direction of arrow 300, and the down unlock portion 217a of the unlock nut 217 contacts the first cam portion 218c of the lock lever 218. Then, the down unlock portion 217a of the unlock nut 217 pushes the first cam portion 218c of the lock lever 218 with a force larger than the urging force of the lock lever urging spring 219. This causes the lock lever 218 to rotate clockwise to release the down lock latched portion 511e from being latched by the down lock portion 218a.

In the state illustrated in FIG. 21A, since the drive nut 510 does not rectilinearly move in the direction of arrow 300, the mirror driving holder 511 comes into the same state as the state illustrated in FIG. 20A, so that the main mirror 202 and the sub-mirror 203 are in the mirror-down position.

FIG. 22A is a side view of the mirror driving unit in a state in which the lead screw 214 has been driven to rotate in the direction of arrow 502 from the state illustrated in FIG. 21A.

FIG. 22B illustrates the mirror driving holder 511, the drive nut 510, the torsion spring 212, the lead screw 214, and the guide shaft 215 in the state illustrated in FIG. 22A as viewed from the direction A in FIG. 22A.

Between the state illustrated in FIG. 21A and the state illustrated in FIG. 22A, only the unlock nut 217 rectilinearly moves in the direction of arrow 300. At this time, as illustrated in FIG. 22B, the drive nut 510 rotates in the direction of arrow 502 relative to the mirror driving holder 511, so that the protrusion 510a of the drive nut 510 contacts the rotation restriction portion 511g of the mirror driving holder 511.

The contact of the protrusion 510a with the rotation restriction portion 511g restricts the drive nut 510 from rotating in the direction of arrow 502. When the protrusion 510a of the drive nut 510 contacts the rotation restriction portion 511g of the mirror driving holder 511 and the drive nut 510 is thus restricted from rotating in the direction of arrow 502, the drive nut 510 becomes as if fixed to the mirror driving holder 511.

In the second exemplary embodiment, when the lead screw 214 is driven to rotate in the direction of arrow 502 while the main mirror 202 and the sub-mirror 203 are in the mirror-down position, the drive nut 510 rotates in the direction of arrow 502 relative to the mirror driving holder 511. Then, when the drive nut 510 is restricted from rotating relative to the mirror driving holder 511, the drive nut 510 and the mirror driving holder 511 start rectilinearly moving. On the other hand, when the lead screw 214 is driven to rotate in the direction of arrow 502, the unlock nut 217 starts rectilinearly moving in the direction of arrow 300 after the lead screw 214 rotates idle by the amount of backlash z, as in the above-described first exemplary embodiment.

An interval from the state illustrated in FIG. 20A to the state illustrated in FIG. 22A corresponds to the first drive region, in which only the unlock nut 217 rectilinearly moves in the direction of arrow 300 due to the rotational driving of the lead screw 214 and the drive nut 510 does not rectilinearly move in the direction of arrow 300. Accordingly, the mirror driving holder 511 can be released from being latched by the lock lever 218 while the mirror driving holder 511 is in the stopped state.

FIG. 23A is a side view of the mirror driving unit in a state in which the lead screw 214 has been driven to rotate in the direction of arrow 502 from the state illustrated in FIG. 22A. FIG. 23B illustrates the mirror driving holder 511, the drive nut 510, the torsion spring 212, the lead screw 214, and the guide shaft 215 in the state illustrated in FIG. 23A as viewed from the direction A in FIG. 23A.

When the lead screw 214 is driven to rotate in the direction of arrow 502 from the state illustrated in FIG. 22B, the drive nut 510 becomes fixed to the mirror driving holder 511, so that the drive nut 510 and the mirror driving holder 511 rectilinearly move in the direction of arrow 300. Accordingly, between the state illustrated in FIG. 22A and the state illustrated in FIG. 23A, the drive nut 510, the mirror driving holder 511, and the unlock nut 217 rectilinearly move in the direction of arrow 300.

In the state illustrated in FIG. 23A, since the drive nut 510 and the mirror driving holder 511 rectilinearly move in the direction of arrow 300 due to the rotational driving of the lead screw 214, the main mirror 202 and the sub-mirror 203 start the mirror-up operation. At this time, the unlock nut 217 also rectilinearly moves in the direction of arrow 300, and the up unlock portion 217b of the unlock nut 217 slides on the sliding surface 218e of the lock lever 218. This keeps a state in which the down lock latched portion 511e is released from being latched by the down lock portion 218a.

FIG. 24A is a side view of the mirror driving unit in a state in which the lead screw 214 has been driven to rotate in the direction of arrow 502 from the state illustrated in FIG. 23A. Between the state illustrated in FIG. 23A and the state illustrated in FIG. 24A, the drive nut 510 and the unlock nut 217 rectilinearly move in the direction of arrow 300.

FIG. 24B illustrates the mirror driving holder 511, the drive nut 510, the torsion spring 212, the lead screw 214, and the guide shaft 215 in the state illustrated in FIG. 24A as viewed from the direction A in FIG. 24A.

In the state illustrated in FIG. 24a, the drive nut 510 and the mirror driving holder 511 rectilinearly move in the direction of arrow 300 due to the rotational driving of the lead screw 214, so that the main mirror 202 and the sub-mirror 203 become located in the mirror-up position.

When the mirror driving unit comes into the state illustrated in FIG. 24A from the state illustrated in FIG. 23A, the up unlock portion 217b of the unlock nut 217 slides on the second cam portion 218d of the lock lever 218. Accordingly, the lock lever 218 turns counterclockwise due to the urging force of the lock lever urging spring 219.

In the state illustrated in FIG. 24A, the up unlock portion 217b is away from the second cam portion 218d, and the lock lever 218 contacts the second lock lever restriction shaft 223. At this time, the up lock portion 218b of the lock lever 218 latches the up lock latched portion 511f of the mirror driving holder 511. Accordingly, the lock lever 218 restricts the mirror driving holder 511 from moving in the direction of arrow 301. Therefore, in the state illustrated in FIG. 24A, the main mirror 202 and the sub-mirror 203 can be kept in the mirror-up position without the step motor 213 being energized.

An interval from the state illustrated in FIG. 23A to the state illustrated in FIG. 24A corresponds to the second drive region, in which the drive nut 510 and the unlock nut 217 rectilinearly move in the direction of arrow 300 due to the rotational driving of the lead screw 214.

Figure 25B:
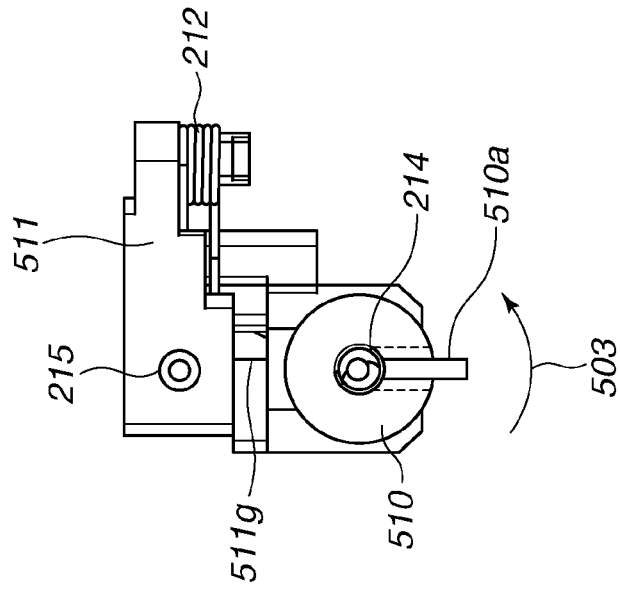
Figure 25A:
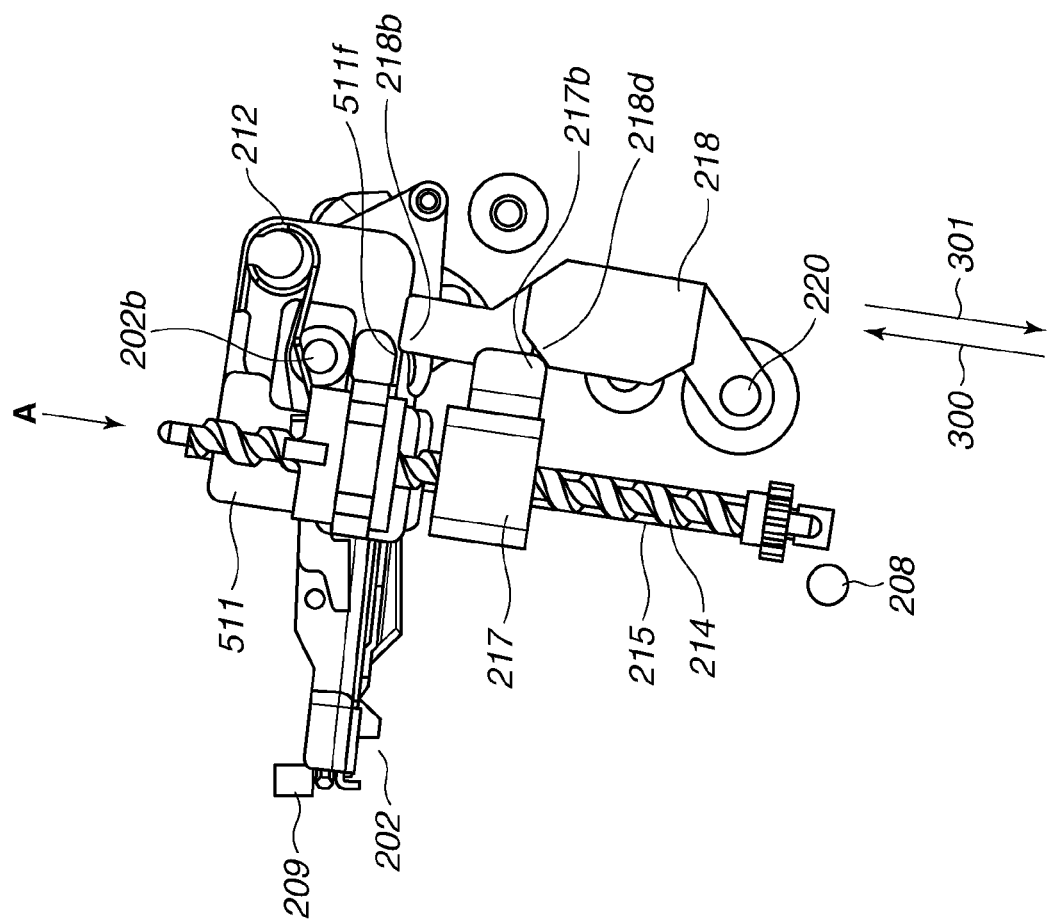

FIG. 25A is a side view of the mirror driving unit in a state in which the lead screw 214 has been driven to rotate in the direction of arrow 503 from the state illustrated in FIG. 24A, so that only the unlock nut 217 has rectilinearly moved in the direction of arrow 301. FIG. 25B illustrates the mirror driving holder 511, the drive nut 510, the torsion spring 212, the lead screw 214, and the guide shaft 215 in the state illustrated in FIG. 25A as viewed from the direction A in FIG. 25A.

Between the state illustrated in FIG. 24A and the state illustrated in FIG. 25A, the unlock nut 217 moves rectilinearly in the direction of arrow 301. At this time, as illustrated in FIG. 25B, the drive nut 510 rotates in the direction of arrow 503 relative to the mirror driving holder 511. The drive nut 510 only rotates in the direction of arrow 503 relative to the mirror driving holder 511, and does not rectilinearly move in the direction of arrow 301.

In the state illustrated in FIG. 25A, the unlock nut 217 rectilinearly moves in the direction of arrow 301, and the up unlock portion 217b of the unlock nut 217 contacts the second cam portion 218d. Then, the up unlock portion 217b of the unlock nut 217 pushes the second cam portion 218d of the lock lever 218 with a force larger than the urging force of the lock lever urging spring 219. This causes the lock lever 218 to turn clockwise to release the up lock latched portion 511f from being latched by the up lock portion 218b.

Figure 26B:
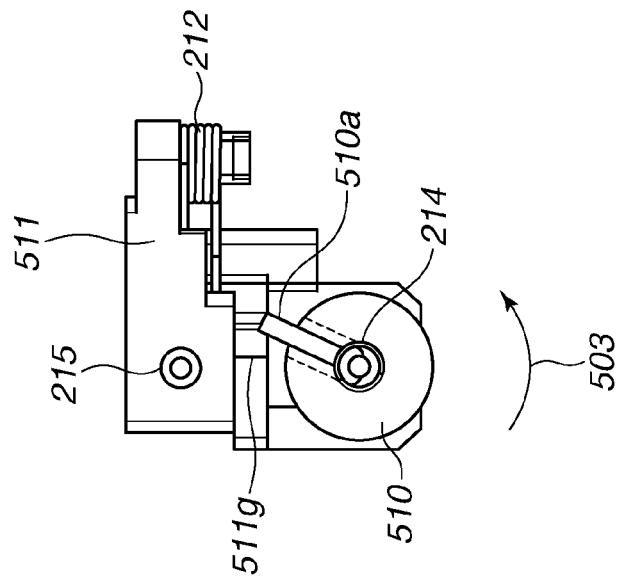
Figure 26A:
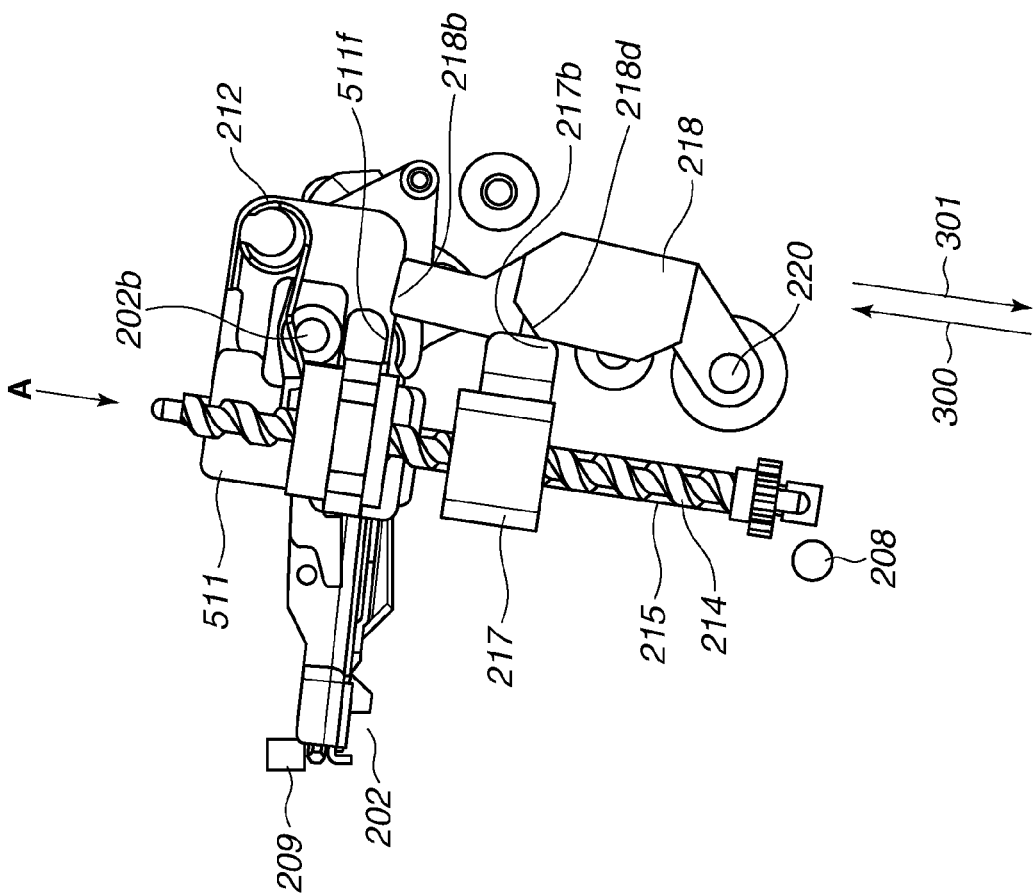

FIG. 26A is a side view of the mirror driving unit in a state in which the lead screw 214 has been driven to rotate in the direction of arrow 503 from the state illustrated in FIG. 25A. FIG. 26B illustrates the mirror driving holder 511, the drive nut 510, the torsion spring 212, the lead screw 214, and the guide shaft 215 in the state illustrated in FIG. 26A as viewed from the direction A in FIG. 26A.

Even between the state illustrated in FIG. 25A and the state illustrated in FIG. 26A, only the unlock nut 217 rectilinearly moves in the direction of arrow 301. At this time, as illustrated in FIG. 26B, the drive nut 510 rotates in the direction of arrow 503 relative to the mirror driving holder 511, so that the protrusion 510a of the drive nut 510 contacts the rotation restriction portion 511g of the mirror driving holder 511. The contact of the protrusion 510a with the rotation restriction portion 511g restricts the drive nut 510 from rotating in the direction of arrow 503. When the protrusion 510a of the drive nut 510 contacts the rotation restriction portion 511g of the mirror driving holder 511 and the drive nut 510 is thus restricted from rotating in the direction of arrow 503, the drive nut 510 becomes as if fixed to the mirror driving holder 511.

In the second exemplary embodiment, when the lead screw 214 is driven to rotate in the direction of arrow 503 while the main mirror 202 and the sub-mirror 203 are in the mirror-up position, the drive nut 510 rotates in the direction of arrow 503 relative to the mirror driving holder 511. Then, when the drive nut 510 is restricted from rotating relative to the mirror driving holder 511, the drive nut 510 and the mirror driving holder 511 start rectilinearly moving. On the other hand, when the lead screw 214 is driven to rotate in the direction of arrow 503, the unlock nut 217 starts rectilinearly moving in the direction of arrow 301 after the lead screw 214 rotates idle by the amount of backlash z, as in the above-described first exemplary embodiment.

An interval from the state illustrated in FIG. 24A to the state illustrated in FIG. 26A corresponds to the first drive region, in which only the unlock nut 217 rectilinearly moves in the direction of arrow 301 due to the rotational driving of the lead screw 214 and the drive nut 510 does not rectilinearly move in the direction of arrow 301. Accordingly, the mirror driving holder 511 can be released from being latched by the lock lever 218 while the mirror driving holder 511 is in the stopped state.

FIG. 27A is a side view of the mirror driving unit in a state in which the lead screw 214 has been driven to rotate in the direction of arrow 503 from the state illustrated in FIG. 26A. FIG. 27B illustrates the mirror driving holder 511, the drive nut 510, the torsion spring 212, the lead screw 214, and the guide shaft 215 in the state illustrated in FIG. 27A as viewed from the direction A in FIG. 27A.

When the lead screw 214 is driven to rotate in the direction of arrow 503 from the state illustrated in FIG. 26B, the drive nut 510 becomes fixed to the mirror driving holder 511, so that the drive nut 510 and the mirror driving holder 511 rectilinearly move in the direction of arrow 301. Accordingly, between the state illustrated in FIG. 26A and the state illustrated in FIG. 27A, the drive nut 510, the mirror driving holder 511, and the unlock nut 217 rectilinearly move in the direction of arrow 301.

In the state illustrated in FIG. 27A, since the drive nut 510 and the mirror driving holder 511 rectilinearly move in the direction of arrow 301 due to the rotational driving of the lead screw 214, the main mirror 202 and the sub-mirror 203 start the mirror-down operation. At this time, the unlock nut 217 also rectilinearly moves in the direction of arrow 301, and the up unlock portion 217b of the unlock nut 217 slides on the sliding surface 218e of the lock lever 218. This keeps a state in which the down lock latched portion 511e is released from being latched by the down lock portion 218a.

When the lead screw 214 is driven to rotate in the direction of arrow 503 from the state illustrated in FIG. 27A, the drive nut 510 and the mirror driving holder 511 rectilinearly move in the direction of arrow 301. Then, the down unlock portion 217a of the unlock nut 217 slides on the first cam portion 218c of the lock lever 218, so that the lock lever 218 rotates counterclockwise due to the urging force of the lock lever urging spring 219.

When the lead screw 214 is driven to rotate in the direction of arrow 503 up to the state illustrated in FIG. 20A, the down unlock portion 217a moves away from the first cam portion 218c, and the lock lever 218 contacts the second lock lever restriction shaft 223. Accordingly, the down lock portion 218a of the lock lever 218 latches the down lock latched portion 511e of the mirror driving holder 511. This returns the mirror driving unit to the state illustrated in FIG. 20A. Therefore, in the state illustrated in FIG. 20A, the main mirror 202 and the sub-mirror 203 can be kept in the mirror-down position without the step motor 213 being energized.

An interval from the state illustrated in FIG. 26A to the state illustrated in FIG. 20A corresponds to the second drive region, in which the drive nut 510 and the unlock nut 217 rectilinearly move in the direction of arrow 301 due to the rotational driving of the lead screw 214.

Figure 28:
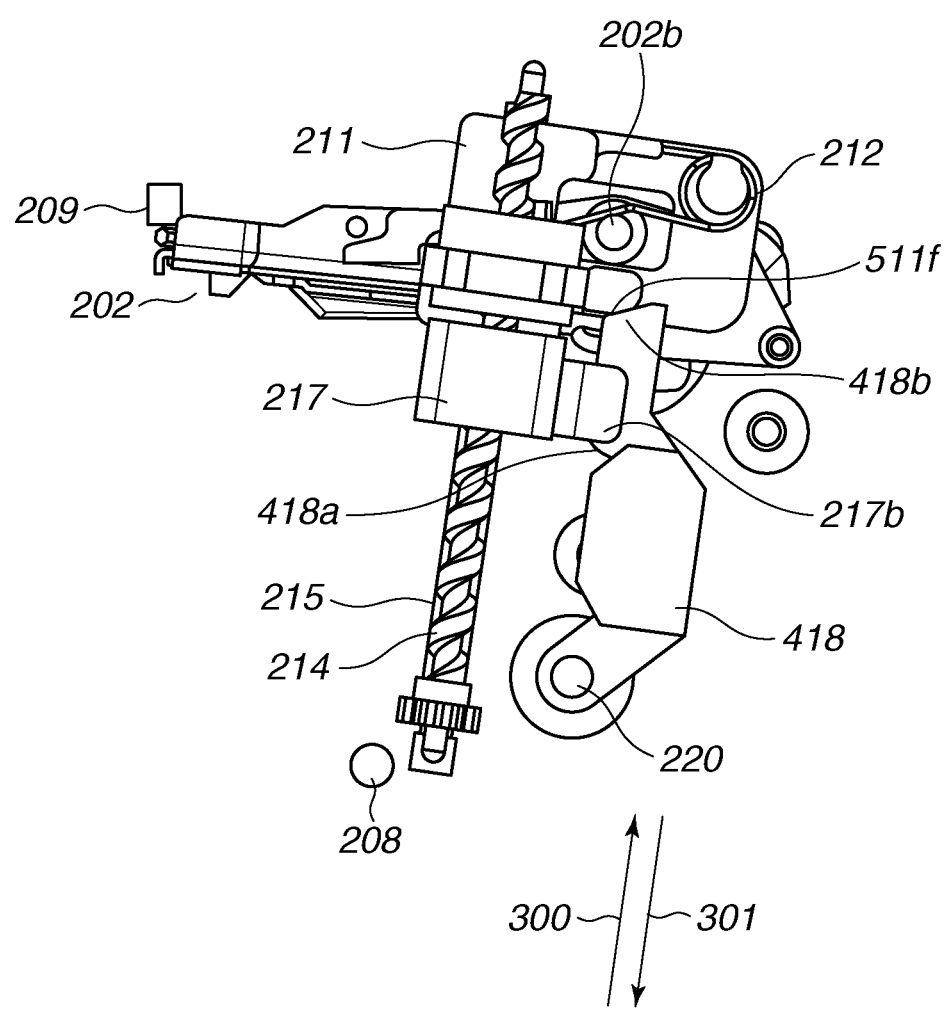
FIG. 28 is a side view illustrating the lock lever according to a first modification example of the second exemplary embodiment.

FIG. 28 is a side view illustrating the mirror driving unit including a lock lever 418 as a modification example of the lock lever 218 according to the second exemplary embodiment. The mirror driving unit illustrated in FIG. 28 differs from that according to the second exemplary embodiment only in that the lock lever 218 is changed to the lock lever 418.

A down lock portion 418a and an up lock portion 418b of the lock lever 418 are formed in a slope shape. This causes, for example, in the state illustrated in FIG. 28, a component of a force applied from the mirror driving holder 511 to act in a direction to rotate the lock lever 418 in the direction of arrow 400. Therefore, a force required for the unlock nut 217 to release the up lock latched portion 511f of the mirror driving holder 511 from being latched by the up lock portion 418b of the lock lever 418 can be made smaller than that in the second exemplary embodiment.

Furthermore, also when the up lock latched portion 511f of the mirror driving holder 511 is latched by the up lock portion 418b of the lock lever 418, the mirror driving holder 511 can be pushed up in the direction of arrow 300 due to the slope shape of the up lock portion 418b.

Since the down lock portion 418a of the lock lever 418 is also formed in a slope shape, even in the mirror-down position, a component of a force applied from the mirror driving holder 511 acts in a direction to rotate the lock lever 418 in the direction of arrow 400. Also, in the mirror-down position, even when the mirror driving holder 511 is latched by the lock lever 418, the mirror driving holder 511 can be pushed down in the direction of arrow 301 due to the slope shape of the down lock portion 418a.

FIGS. 29A, 29B, and 29C illustrate a second modification example of the second exemplary embodiment. The second modification example differs from the above-described second exemplary embodiment only in that the drive nut 510 in the second exemplary embodiment is changed to a drive nut 610 and the mirror driving holder 511 in the second exemplary embodiment is changed to a mirror driving holder 611.

As illustrated in FIGS. 29A, 29B, and 29C, the drive nut 610 includes a protrusion 610a having a pin 610c mounted thereon. The mirror driving holder 611 includes a shaft portion 611j and stoppers 611i and 611h. A torsion spring 630 is arranged in a charged manner such that the coiled portion of the torsion spring 630 is freely fitted on the shaft portion 611j and two arm portions of the torsion spring 630 are arranged between the stoppers 611i and 611h. The torsion spring 630 serves as a second urging member configured to, when the protrusion 610a of the drive nut 610 contacts a rotation restriction portion 611g of the mirror driving holder 611, urge the protrusion 610a in a direction opposite to the contact direction.

In the second modification example, before the protrusion 610a of the drive nut 610 contacts the rotation restriction portion 611g of the mirror driving holder 611, the pin 610c of the drive nut 610 contacts any one of the arm portions of the torsion spring 630. Then, with the pin 610c of the drive nut 610 urging any one of the arm portions of the torsion spring 630, the protrusion 610a of the drive nut 610 contacts the rotation restriction portion 611g of the mirror driving holder 611.

The state illustrated in FIG. 29A corresponds to the state illustrated in FIG. 20B. In the state illustrated in FIG. 29A, with the pin 610c of the drive nut 610 urging the right-hand arm portion of the torsion spring 630, the protrusion 610a of the drive nut 610 contacts the rotation restriction portion 611g of the mirror driving holder 611. Therefore, a clearance occurs between the right-hand arm portion of the torsion spring 630 and the stopper 611i.

When the drive nut 610 rotates in the direction of arrow 502 from the state illustrated in FIG. 29A, the torsion spring 630 boosts the rotation of the drive nut 610.

The state illustrated in FIG. 29B is a state in which the drive nut 610 has rotated in the direction of arrow 502 from the state illustrated in FIG. 29A. In this state, the torsion spring 630 does not boost the rotation of the drive nut 610.

The state illustrated in FIG. 29C corresponds to the state illustrated in FIG. 24B. In the state illustrated in FIG. 29C, the protrusion 610a of the drive nut 610 contacts the rotation restriction portion 611g of the mirror driving holder 611 with the pin 610c of the drive nut 610 urging the left-hand arm portion of the torsion spring 630. Therefore, a clearance occurs between the left-hand arm portion of the torsion spring 630 and the stopper 611h.

In the second modification example, since the torsion spring 630 is provided to boost the pin 610c of the drive nut 710, the drive nut 610 can be smoothly rotated.

As described above, according to the exemplary embodiments of the present invention, a first drive region is set in which only an unlock nut rectilinearly moves without a drive nut rectilinearly moving, and, in the first drive region, a mirror driving holder is released from being latched by a lock lever.

Accordingly, a mirror member can be held in the mirror-down position without consumption of electric power, and any drive source for holding the mirror member in the mirror-down position is not required.

Next, a third exemplary embodiment of the present invention is described with reference to FIGS. 30 to 41.

Figure 30:
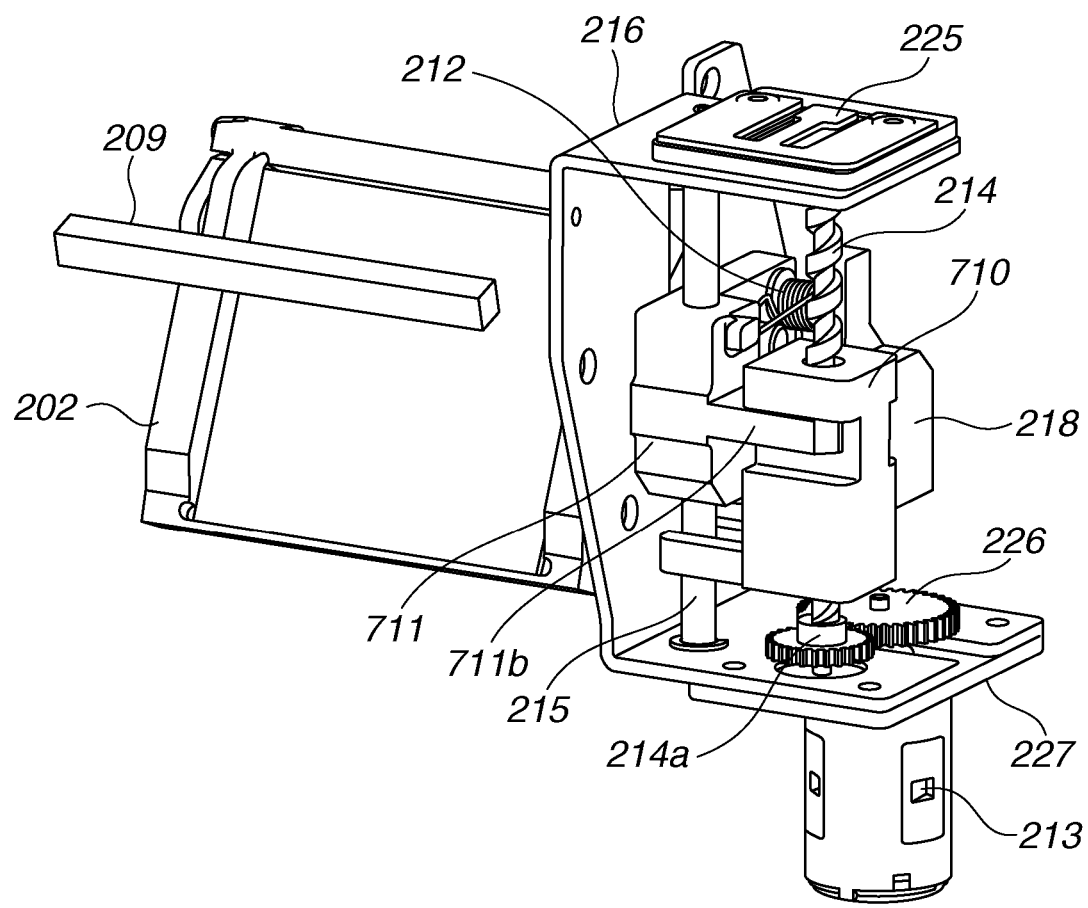
FIG. 30 is a perspective view of a mirror driving unit according to a third exemplary embodiment.

FIG. 30 is a perspective view illustrating a mirror driving unit (a mirror driving device) according to the third exemplary embodiment. Members similar to those in the above-described first exemplary embodiment are assigned with the respective same reference numerals.

As illustrated in FIG. 30, the mirror driving unit includes a main mirror 202, a mirror driving holder 711, a drive nut 710, a lead screw 214, a step motor 213, a lock lever 218, and a guide shaft 215.

The main mirror 202 serves as a mirror member configured to be movable between the mirror-down position and the mirror-up position. The mirror driving holder 711 is restrained in a translatory direction along the guide shaft 215 and serves as a mirror driving member configured to engage with the main mirror 202 to drive the main mirror 202 between the mirror-down position and the mirror-up position.

The mirror driving holder 711 is not in engagement with the lead screw 214. Therefore, even when the lead screw 214 is driven to rotate, the mirror driving holder 711 does not rectilinearly move relative to the lead screw 214.

The step motor 213 serves as a drive source configured to drive and rotate the lead screw 214. The lock lever 218 serves as a restriction member configured to be movable between a restriction position that restricts the rectilinear movement of the mirror driving holder 711 and a restriction release position that releases the restriction of the mirror driving holder 711.

The drive nut 710 meshes with the lead screw 214 and rectilinearly moves due to the rotational driving of the lead screw 214. The drive nut 710 is in engagement with the mirror driving holder 711 with a predetermined clearance therebetween and is configured to drive the mirror driving holder 711 in the translatory direction. The drive nut 710 serves as a drive member configured to drive the lock lever 218 between the restriction position and the restriction release position.

The step motor 213 is mounted to a motor base 227. The motor base 227, to which the step motor 213 is mounted, is mounted to a driving unit base 216. A pinion gear 226 is fixed to the rotational shaft of the step motor 213. The lead screw 214 is rotatably mounted to the driving unit base 216. A leaf spring 225, which urges the lead screw 214 toward the step motor 213, is mounted to the driving unit base 216.

The lead screw 214 is mounted to the driving unit base 216 in such a manner that the lead screw 214 is approximately parallel to a line connecting the position of a drive pin 202b of the main mirror 202 when the main mirror 202 is in the mirror-down position and the position of the drive pin 202b when the main mirror 202 is in the mirror-up position. The lead screw 214 includes a gear portion 214a. The gear portion 214a of the lead screw 214 meshes with the pinion gear 226. The guide shaft 215 is mounted to the driving unit base 216 in parallel with the lead screw 214.

Accordingly, the guide shaft 215 is also mounted to the driving unit base 216 in such a manner that the guide shaft 215 is approximately parallel to a line connecting the position of the drive pin 202b when the main mirror 202 is in the mirror-down position and the position of the drive pin 202b when the main mirror 202 is in the mirror-up position.

Figure 31:
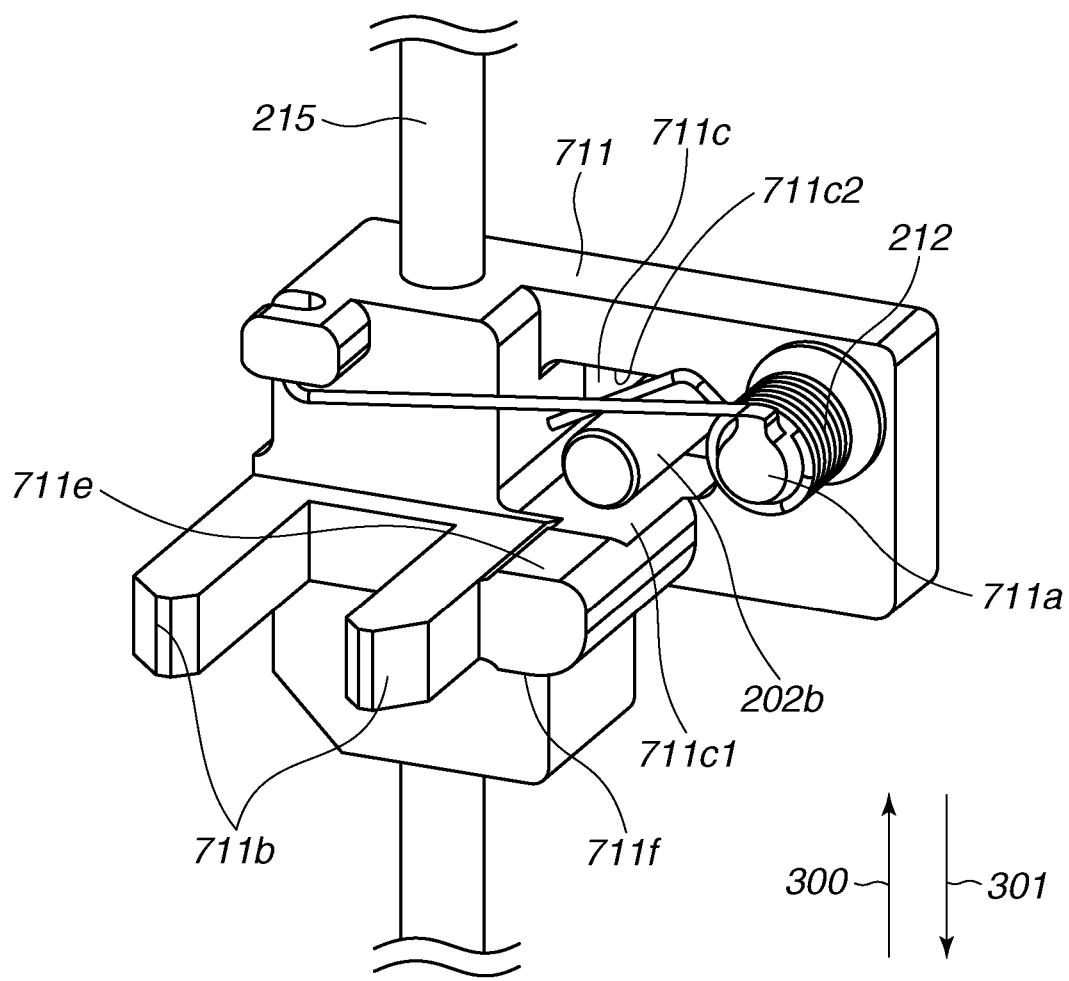
FIG. 31 is an enlarged perspective view of a mirror driving holder according to the third exemplary embodiment.

FIG. 31 is an enlarged perspective view of the mirror driving holder 711.

As illustrated in FIG. 31, a spring mounting portion 711a, drive nut holding portions 711b, and a drive pin engaging portion 711c are formed on the mirror driving holder 711. The coiled portion of a torsion spring 212 is freely fitted on the spring mounting portion 711a. The drive pin 202b, which is formed on the main mirror 202, is inserted into the drive pin engaging portion 711c. Drive pin stoppers 711c1 and 711c2 are formed on the drive pin engaging portion 711c.

One end of the torsion spring 212, which is mounted on the spring mounting portion 711a, is supported by the mirror driving holder 711, and the other end of the torsion spring 212 is supported by the drive pin 202b. This enables the torsion spring 212 to urge the drive pin 202b toward the drive pin stopper 711c1.

Figure 32:
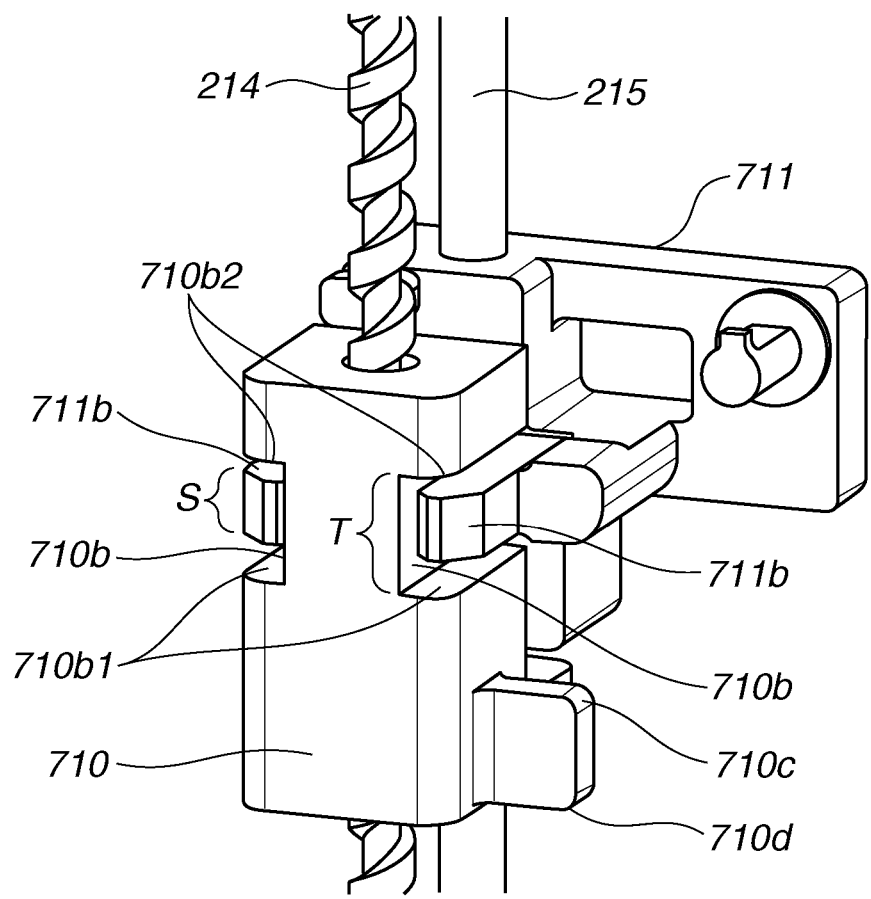
FIG. 32 is an enlarged perspective view of a drive nut and the mirror driving holder according to the third exemplary embodiment.

FIG. 32 is an enlarged perspective view of the drive nut 710 and the mirror driving holder 711.

Recessed portions 710b are formed on the drive nut 710. On the upper and lower surfaces of each of the recessed portions 710b, a lower-end stopper portion 710b1 and an upper-end stopper portion 710b2 are respectively formed perpendicular to the rotational axis of the lead screw 214. When the width of the recessed portion 710b in the direction of rectilinear movement is denoted by T and the thickness of the drive nut holding portion 711b in the direction of rectilinear movement is denoted by S, the width T is set larger than the thickness S of the drive nut holding portion 711b.

The drive nut holding portion 711b is configured to engage with the recessed portion 710b with a predetermined clearance therebetween in the direction parallel to the guide shaft 215. Furthermore, the drive nut holding portion 711b is restrained by the lower-end stopper portion 710b1 and the upper-end stopper portion 710b2 in the direction parallel to the guide shaft 215.

Therefore, the mirror driving holder 711 can move along the guide shaft 215 up to the position in which the drive nut holding portion 711b contacts the lower-end stopper portion 710b1 or the upper-end stopper portion 710b2 of the drive nut 710. In other words, the mirror driving holder 711 can rectilinearly move along the guide shaft 215 by a difference (T−S) between the width of the recessed portion 710b and the thickness of the drive nut holding portion 711b.

When the lead screw 214 is driven to rotate by the step motor 213, the drive nut 710, which meshes with the lead screw 214, rectilinearly moves. As the drive nut 710 rectilinearly moves, the clearance between the lower-end stopper portion 710b1 or the upper-end stopper portion 710b2 of the drive nut 710 and the drive nut holding portion 711b of the mirror driving holder 711 becomes smaller, so that the lower-end stopper portion 710b1 or the upper-end stopper portion 710b2 contacts the drive nut holding portion 711b.

After the lower-end stopper portion 710b1 or the upper-end stopper portion 710b2 contacts the drive nut holding portion 711b, the mirror driving holder 711 rectilinearly moves integrally with the drive nut 710 along the guide shaft 215. Until the lower-end stopper portion 710b1 or the upper-end stopper portion 710b2 contacts the drive nut holding portion 711b, only the drive nut 710 rectilinearly moves relative to the lead screw 214 due to the rotational driving of the lead screw 214. At this time, the mirror driving holder 711 remains stationary without rectilinearly moving relative to the lead screw 214.

Accordingly, there are set a first drive region in which only the drive nut 710 rectilinearly moves without the mirror driving holder 711 rectilinearly moving and a second drive region in which both the mirror driving holder 711 and the drive nut 710 rectilinearly move.

The drive nut 710 further includes a down unlock portion 710c and an up unlock portion 710d. The down unlock portion 710c of the drive nut 710 serves the same function as that of the down unlock portion 217a of the unlock nut 217 in the first and second exemplary embodiments. The up unlock portion 710d of the drive nut 710 serves the same function as that of the up unlock portion 217b of the unlock nut 217 in the first and second exemplary embodiments. Thus, the drive nut 710 serves a function for releasing the mirror driving holder 711 from being restricted for movement by the lock lever 218.

In the third exemplary embodiment, the drive nut 710 can be formed longer in the axial direction of the lead screw 214 than in the first and second exemplary embodiments. Accordingly, the number of teeth of the drive nut 710 meshing with the lead screw 214 becomes greater, so that the drive nut 710 has less backlash with respect to the lead screw 214 and thus becomes able to more smoothly rectilinearly move.

FIGS. 33 to 41 illustrate the mirror driving unit driving the main mirror 202 and the sub-mirror 203 between the mirror-down position and the mirror-up position according to the third exemplary embodiment.

Figure 33:
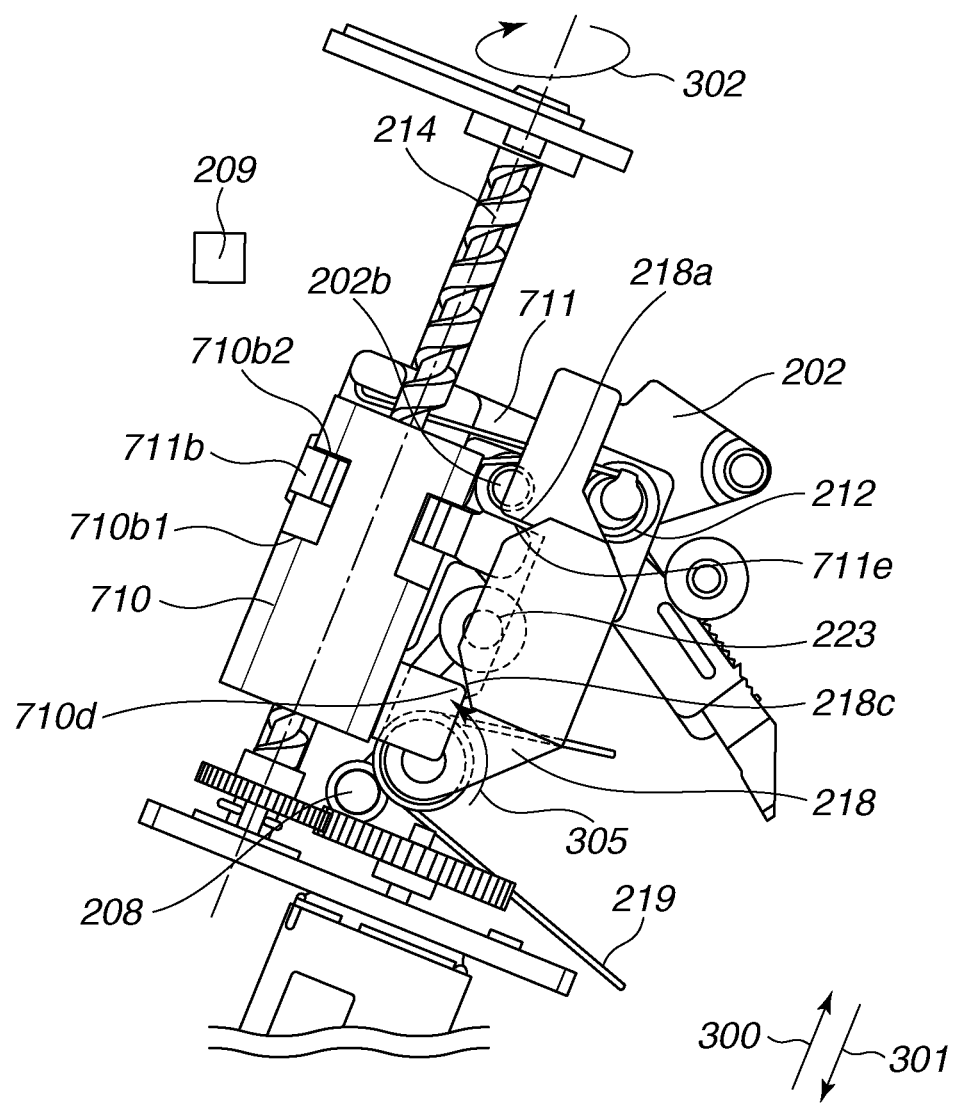
FIGS. 33, 34, 35, 36, 37, 38, 39, 40, and 41 are side views illustrating the mirror driving unit driving the main mirror and the sub-mirror between the mirror-down position and the mirror-up position according to the third exemplary embodiment.

FIG. 33 is a side view of the mirror driving unit when the main mirror 202 and the sub-mirror 203 are in the mirror-down position.

In the state illustrated in FIG. 33, the lock lever 218 is urged by the lock lever urging spring 219 in the direction of arrow 305, and is thus in contact with the second lock lever restriction shaft 223. The down lock portion 218a of the lock lever 218 latches a down lock latched portion 711e of the mirror driving holder 711.

As illustrated in FIG. 33, in this state, the up unlock portion 710d of the drive nut 710 is not in contact with the a first cam portion 218c of the lock lever 218.

Since the drive nut holding portion 711b is in contact with the upper-end stopper portion 710b2, a force for holding the mirror driving holder 711 in the stopped position does not operate, so that the mirror driving holder 711 cannot be held in the mirror-down position. However, since the drive pin engaging portion 711c of the mirror driving holder 711 engages with the drive pin 202b of the main mirror 202, which is latched in the mirror-down position by the down stopper 208, the mirror driving holder 711 can be held in the mirror-down position.

Figure 34:
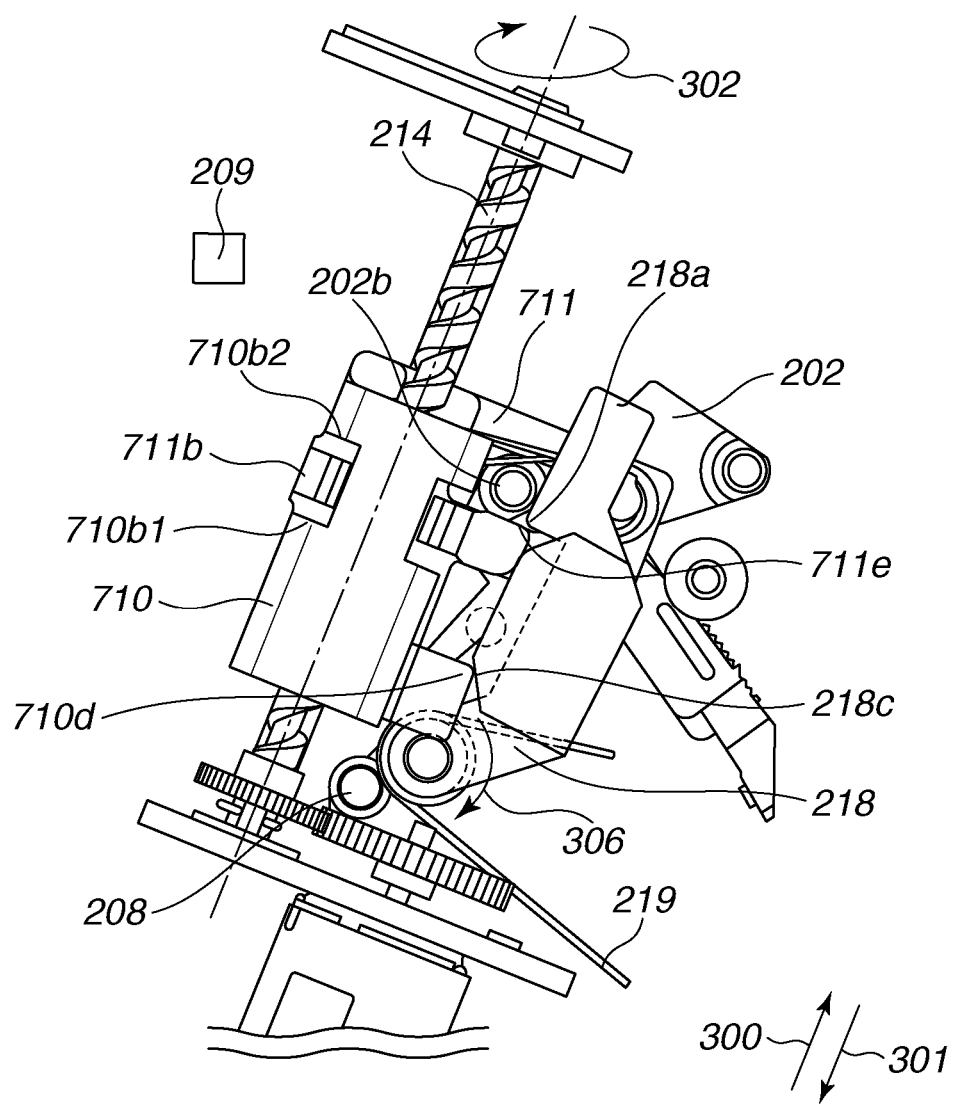

FIG. 34 is a side view of the mirror driving unit in a state in which the lead screw 214 has been driven to rotate in the direction of arrow 302 from the state illustrated in FIG. 33. Between the state illustrated in FIG. 33 and the state illustrated in FIG. 34, the drive nut 710 rectilinearly moves in the direction of arrow 300.

In this state, since the drive nut holding portion 711b is located in between the end portions of the recessed portion 710b, which has rectilinearly moved in the direction of arrow 300, a force in the direction of arrow 300 is not transmitted to the mirror driving holder 711, so that the mirror driving holder 711 remains stopped.

In the state illustrated in FIG. 34, the drive nut 710 rectilinearly moves in the direction of arrow 300, and the up unlock portion 710d of the drive nut 710 contacts the first cam portion 218c of the lock lever 218. Then, the up unlock portion 710d of the drive nut 710 pushes the first cam portion 218c of the lock lever 218 with a force larger than the urging force of the lock lever urging spring 219. This causes the lock lever 218 to rotate in the direction of arrow 306 to release the down lock latched portion 711e from being latched by the down lock portion 218a.

In the state illustrated in FIG. 34, since the mirror driving holder 711 does not rectilinearly move in the direction of arrow 300, the mirror driving holder 711 comes into the same state as the state illustrated in FIG. 33, so that the main mirror 202 and the sub-mirror 203 are in the mirror-down position.

Figure 35:
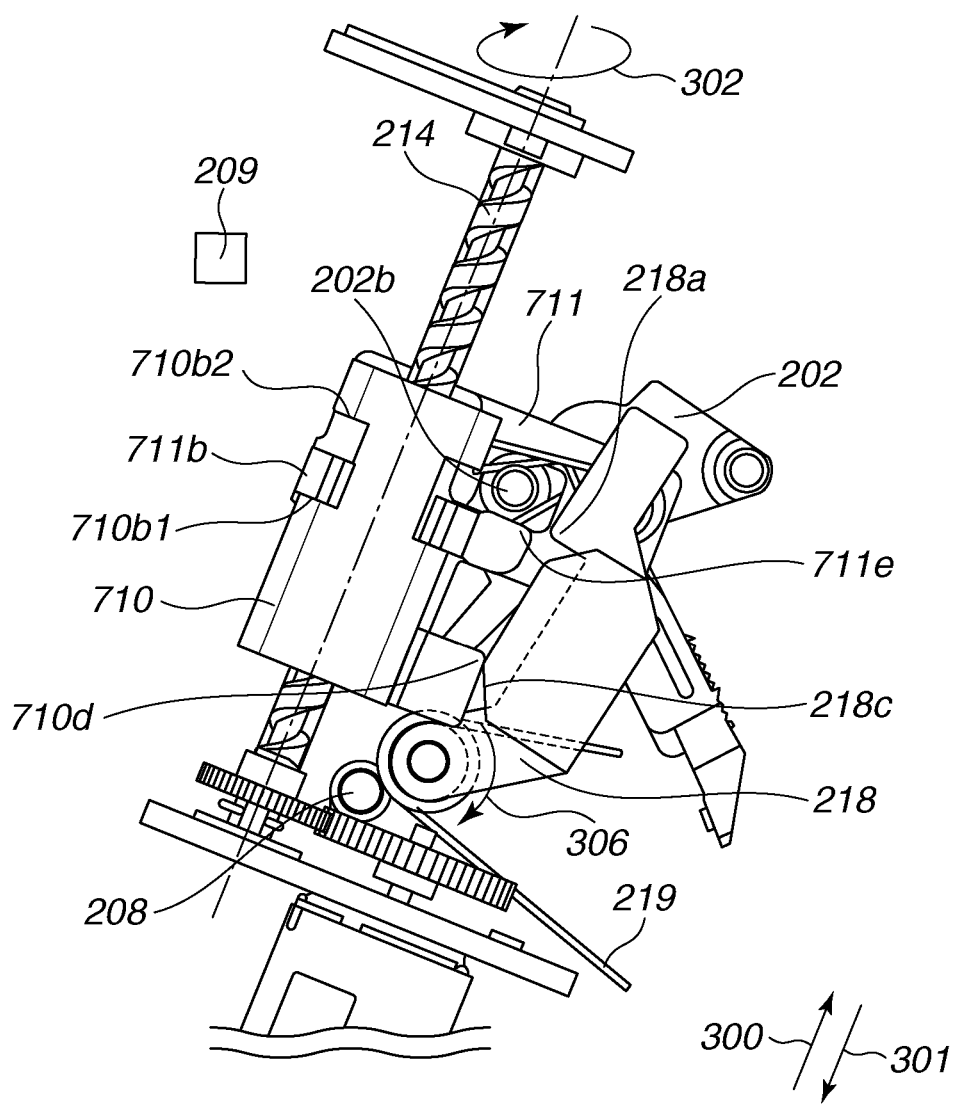

FIG. 35 is a side view of the mirror driving unit in a state in which the lead screw 214 has been driven to rotate in the direction of arrow 302 from the state illustrated in FIG. 34. Even between the state illustrated in FIG. 34 and the state illustrated in FIG. 35, only the drive nut 710 rectilinearly moves in the direction of arrow 300. Then, the lower-end stopper portion 710b1 of the drive nut 710, which rectilinearly moves in direction of arrow 300, contacts the drive nut holding portion 711b of the mirror driving holder 711.

When the lower-end stopper portion 710b1 contacts the drive nut holding portion 711b, a force for moving the drive nut 710 in direction of arrow 300 is transmitted to the mirror driving holder 711. Accordingly, the mirror driving holder 711 rectilinearly moves integrally with the drive nut 710 in direction of arrow 300.

An interval from the state illustrated in FIG. 33 to the state illustrated in FIG. 35 corresponds to the first drive region, in which only the drive nut 710 rectilinearly moves in the direction of arrow 300 due to the rotational driving of the lead screw 214 and the mirror driving holder 711 does not rectilinearly move in the direction of arrow 300. Accordingly, the drive nut 710 can release the mirror driving holder 711 from being latched by the lock lever 218 while the mirror driving holder 711 is in the stopped state.

Figure 36:
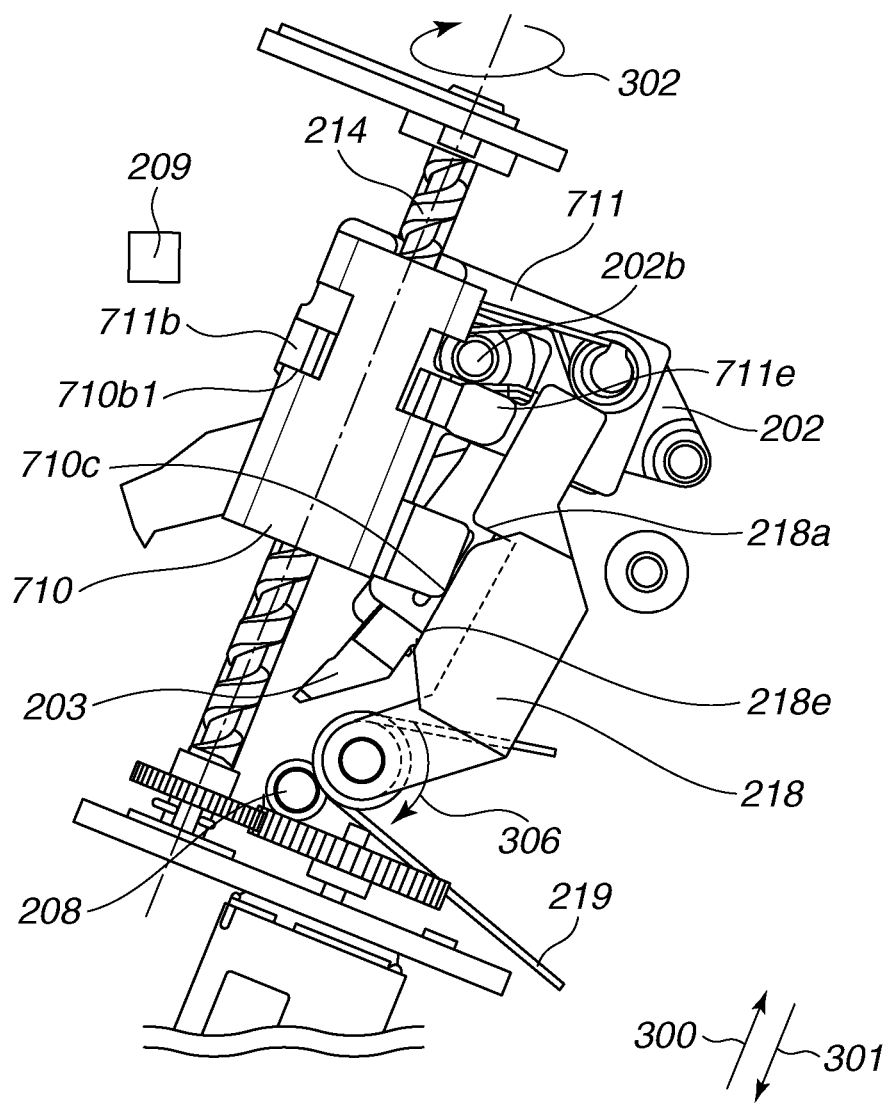

FIG. 36 is a side view of the mirror driving unit in a state in which the lead screw 214 has been driven to rotate in the direction of arrow 302 from the state illustrated in FIG. 35.

When the lead screw 214 is driven to rotate in the direction of arrow 302 from the state illustrated in FIG. 35, the mirror driving holder 711 becomes integral with the drive nut 710, so that the drive nut 710 and the mirror driving holder 711 rectilinearly move in the direction of arrow 300. Accordingly, between the state illustrated in FIG. 35 and the state illustrated in FIG. 36, the drive nut 710 and the mirror driving holder 711 rectilinearly move in the direction of arrow 300.

In the state illustrated in FIG. 36, since the drive nut 710 and the mirror driving holder 711 rectilinearly move in the direction of arrow 300 due to the rotational driving of the lead screw 214, the main mirror 202 and the sub-mirror 203 start the mirror-up operation. At this time, the down unlock portion 710c of the drive nut 710 slides on the sliding surface 218e of the lock lever 218. This keeps a state in which the down lock latched portion 711e is released from being latched by the down lock portion 218a.

Figure 37:
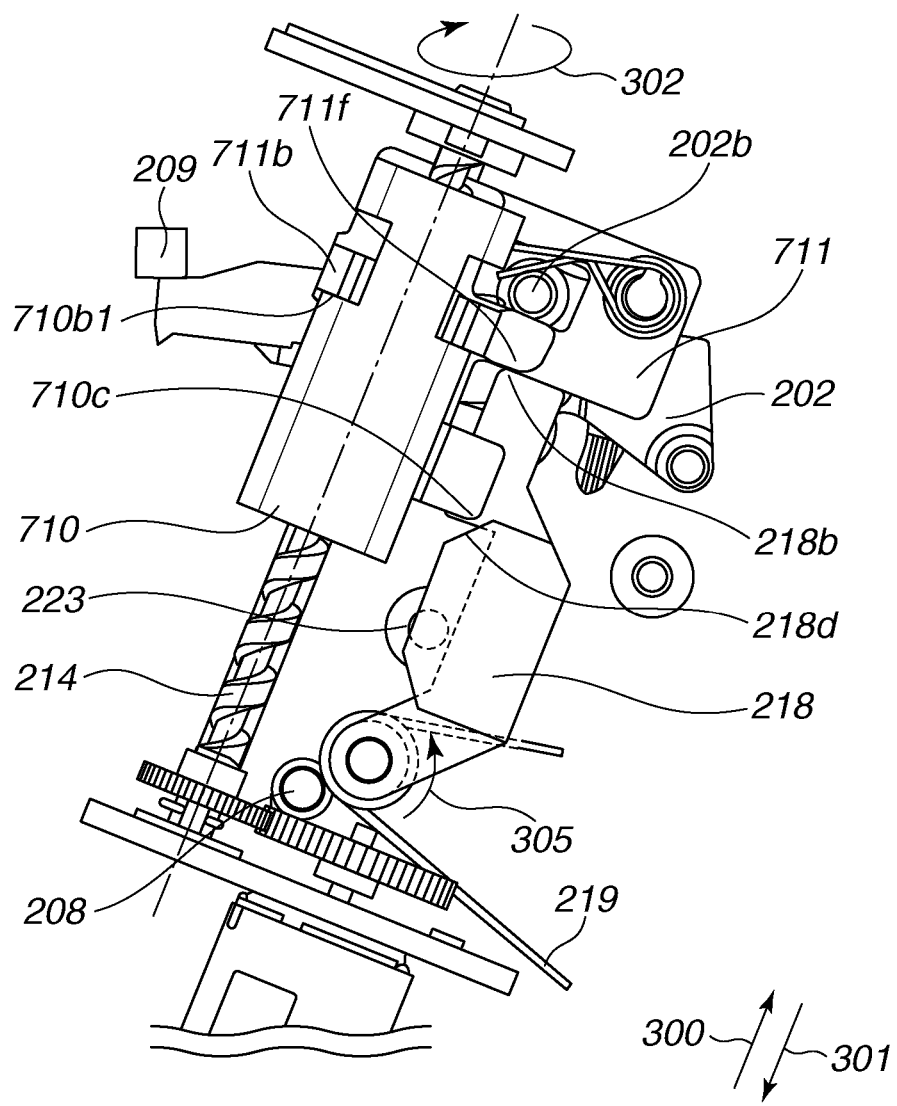

FIG. 37 is a side view of the mirror driving unit in a state in which the lead screw 214 has been driven to rotate in the direction of arrow 302 from the state illustrated in FIG. 36.

Between the state illustrated in FIG. 36 and the state illustrated in FIG. 37, the drive nut 710 and the mirror driving holder 711 rectilinearly move in the direction of arrow 300.

In the state illustrated in FIG. 37, the drive nut 710 and the mirror driving holder 711 rectilinearly move in the direction of arrow 300 due to the rotational driving of the lead screw 214, so that the main mirror 202 and the sub-mirror 203 become located in the mirror-up position.

When the mirror driving unit comes into the state illustrated in FIG. 37 from the state illustrated in FIG. 36, the down unlock portion 710c of the drive nut 710 slides on the second cam portion 218d of the lock lever 218. Accordingly, the lock lever 218 turns in the direction of arrow 305 due to the urging force of the lock lever urging spring 219.

In the state illustrated in FIG. 37, the down unlock portion 710c is away from the second cam portion 218d, and the lock lever 218 contacts the second lock lever restriction shaft 223. At this time, the up lock portion 218b of the lock lever 218 latches the up lock latched portion 711f of the mirror driving holder 711. Accordingly, the lock lever 218 restricts the mirror driving holder 711 from moving in the direction of arrow 301. Therefore, in the state illustrated in FIG. 37, the main mirror 202 and the sub-mirror 203 can be kept in the mirror-up position without the step motor 213 being energized.

An interval from the state illustrated in FIG. 36 to the state illustrated in FIG. 37 corresponds to the second drive region, in which the drive nut 710 and the mirror driving holder 711 rectilinearly move in the direction of arrow 300 due to the rotational driving of the lead screw 214.

Figure 38:
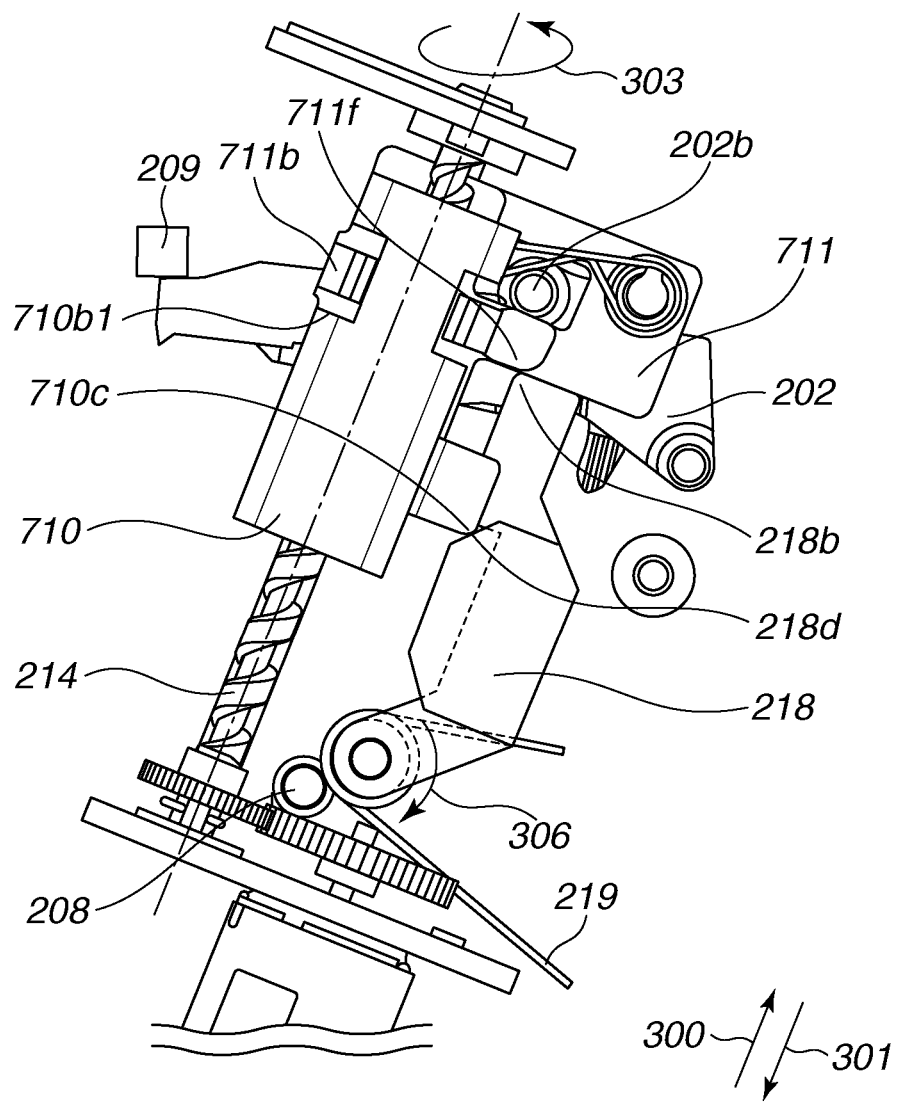

FIG. 38 is a side view of the mirror driving unit in a state in which the lead screw 214 has been driven to rotate in the direction of arrow 303, which is opposite the direction of arrow 302, from the state illustrated in FIG. 37, so that only the drive nut 710 has rectilinearly moved in the direction of arrow 301.

Between the state illustrated in FIG. 37 and the state illustrated in FIG. 38, the drive nut 710 moves rectilinearly in the direction of arrow 301. At this time, the drive nut holding portion 711b is located in between the lower-end stopper portion 710b1 and the upper-end stopper portion 710b2 of the drive nut 710, which has rectilinearly moved in the direction of arrow 301. Therefore, a force in the direction of arrow 301 is not transmitted to the mirror driving holder 711, so that the mirror driving holder 711 remains stopped.

When the drive nut 710 moves rectilinearly in the direction of arrow 301 from the state illustrated in FIG. 37, the drive nut holding portion 711b ceases to be in contact with the lower-end stopper portion 710b1. However, since the up lock latched portion 711f of the mirror driving holder 711 is latched by the up lock portion 218b of the lock lever 218, the mirror driving holder 711 is latched in the mirror-up position.

In the state illustrated in FIG. 38, only the drive nut 710 rectilinearly moves in the direction of arrow 301, and the down unlock portion 710c of the drive nut 710 contacts the second cam portion 218d. Then, the down unlock portion 710c of the drive nut 710 pushes the second cam portion 218d of the lock lever 218 with a force larger than the urging force of the lock lever urging spring 219. This causes the lock lever 218 to turn in the direction of arrow 306 to release the up lock latched portion 711f from being latched by the up lock portion 218b.

Figure 39:
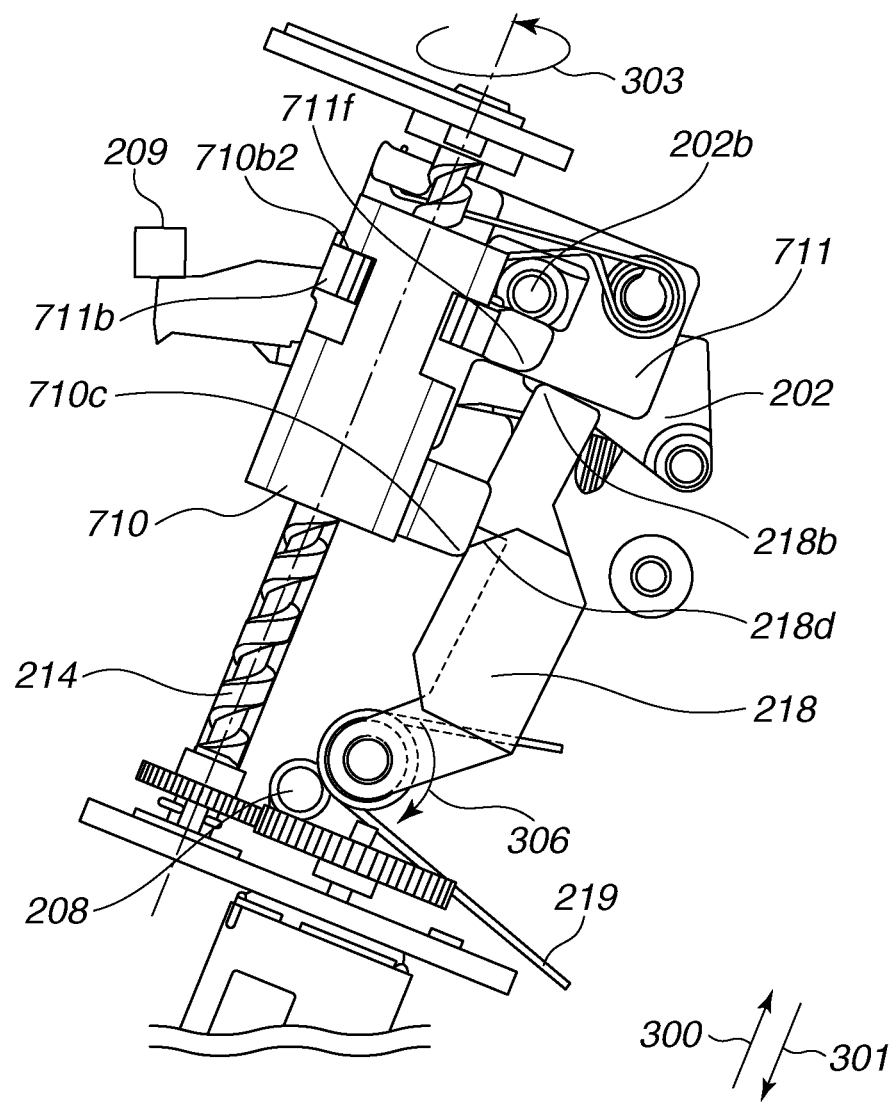

FIG. 39 is a side view of the mirror driving unit in a state in which the lead screw 214 has been driven to rotate in the direction of arrow 303 from the state illustrated in FIG. 38.

Even between the state illustrated in FIG. 38 and the state illustrated in FIG. 39, only the drive nut 710 rectilinearly moves in the direction of arrow 301.

At approximately the same timing that the up lock latched portion 711f is released from being latched by the up lock portion 218b, the upper-end stopper portion 710b2 of the drive nut 710 contacts the drive nut holding portion 711b. Accordingly, a force for moving the drive nut 710 in the direction of arrow 301 is transmitted to the mirror driving holder 711, so that the mirror driving holder 711 starts to rectilinearly move integrally with the drive nut 710 in the direction of arrow 301.

An interval from the state illustrated in FIG. 37 to the state illustrated in FIG. 39 corresponds to the first drive region, in which only the drive nut 710 rectilinearly moves in the direction of arrow 301 due to the rotational driving of the lead screw 214 and the mirror driving holder 711 does not rectilinearly move in the direction of arrow 301. Accordingly, the mirror driving holder 711 can be released from being latched by the lock lever 218 while the mirror driving holder 711 is in the stopped state.

Figure 40:
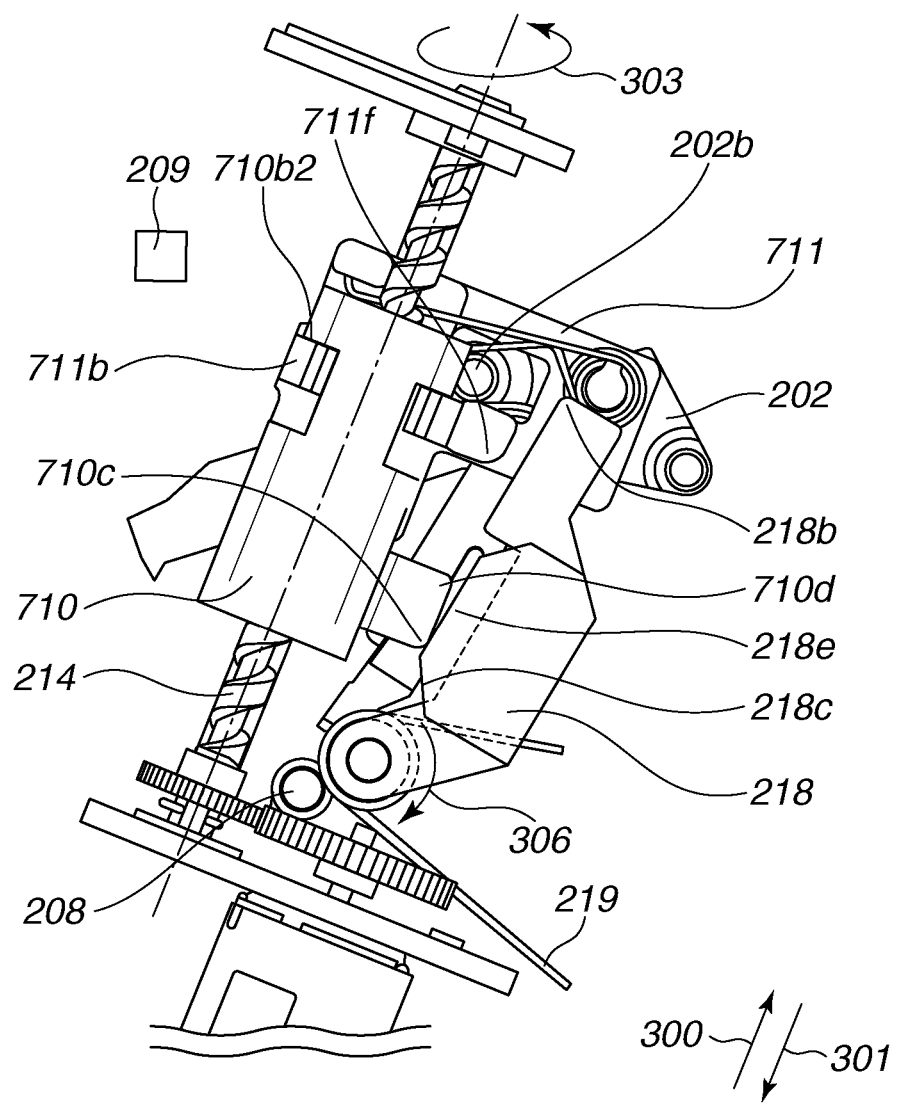

FIG. 40 is a side view of the mirror driving unit in a state in which the lead screw 214 has been driven to rotate in the direction of arrow 303 from the state illustrated in FIG. 39.

When the lead screw 214 is driven to rotate in the direction of arrow 303 from the state illustrated in FIG. 39, the mirror driving holder 711 becomes integral with the drive nut 710, so that the drive nut 710 and the mirror driving holder 711 rectilinearly move in the direction of arrow 301.

In the state illustrated in FIG. 40, since the drive nut 710 and the mirror driving holder 711 rectilinearly move in the direction of arrow 301 due to the rotational driving of the lead screw 214, the main mirror 202 and the sub-mirror 203 start the mirror-down operation. At this time, the down unlock portion 710c of the drive nut 710 slides on the sliding surface 218e of the lock lever 218. This keeps a state in which the up lock latched portion 711f is released from being latched by the up lock portion 218b.

Figure 41:
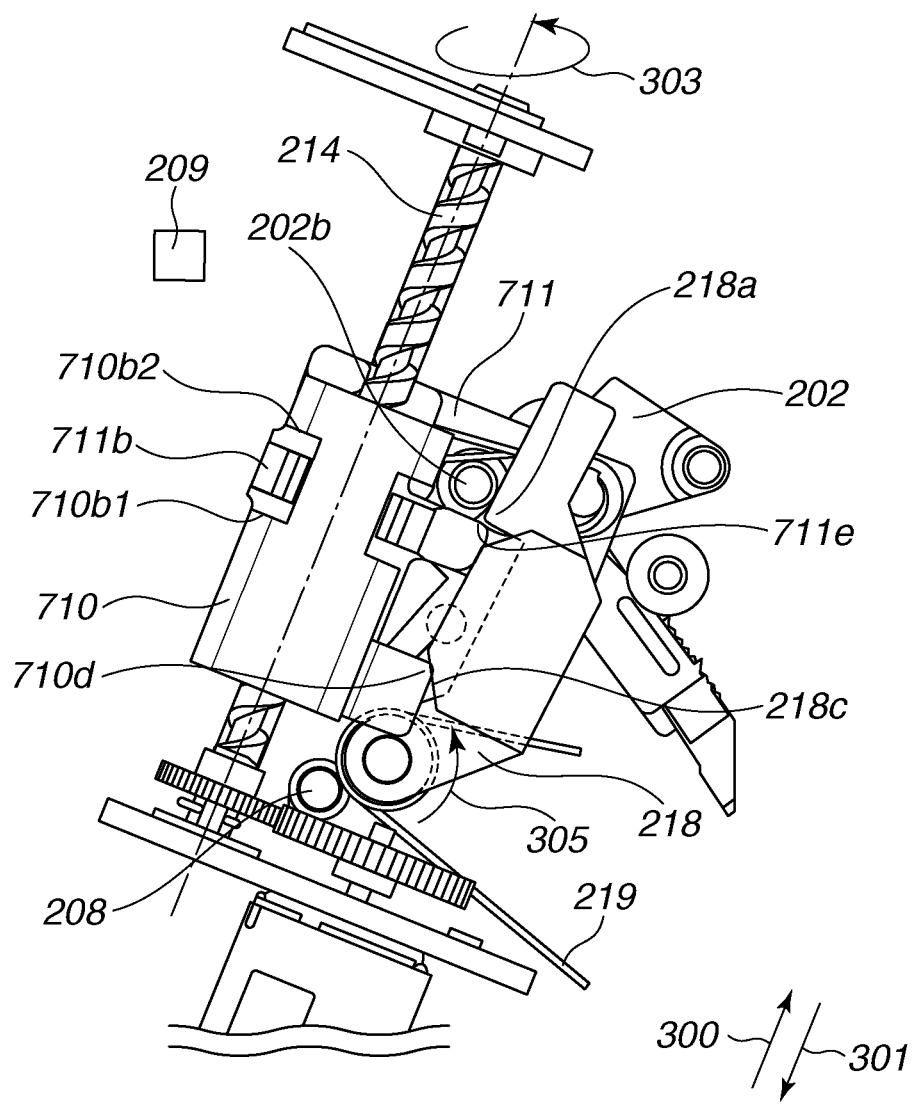

FIG. 41 is a side view of the mirror driving unit in a state in which the lead screw 214 has been driven to rotate in the direction of arrow 303 from the state illustrated in FIG. 40. When the lead screw 214 is driven to rotate in the direction of arrow 303 from the state illustrated in FIG. 40, the drive nut 710 and the mirror driving holder 711 rectilinearly move in the direction of arrow 301. Then, the up unlock portion 710d of the drive nut 710 slides on the first cam portion 218c of the lock lever 218, so that the lock lever 218 turns in the direction of arrow 305 due to the urging force of the lock lever urging spring 219.

Then, when the lead screw 214 is driven to rotate in the direction of arrow 303 from the state illustrated in FIG. 41, the up unlock portion 710d moves away from the first cam portion 218c, so that the lock lever 218 contacts the second lock lever restriction shaft 223. Accordingly, the down lock portion 218a of the lock lever 218 latches the down lock latched portion 711e of the mirror driving holder 711. This returns the mirror driving unit to the state illustrated in FIG. 33. Therefore, in the state illustrated in FIG. 33, the main mirror 202 and the sub-mirror 203 can be kept in the mirror-down position without the step motor 213 being energized.

An interval from the state illustrated in FIG. 39 to the state illustrated in FIG. 33 corresponds to the second drive region, in which the drive nut 710 and the mirror driving holder 711 rectilinearly move in the direction of arrow 301 due to the rotational driving of the lead screw 214.

As described above, according to the third exemplary embodiment, forming a predetermined clearance between the drive nut 710 and the mirror driving holder 711 enables the setting of the first drive region, in which only the drive nut 710 rectilinearly moves. Then, in the first drive region, the mirror driving holder 711 is released from being latched by the lock lever 218.

Next, a fourth exemplary embodiment of the present invention is described with reference to FIG. 42 to FIGS. 56A, 56B, and 56C.

Figure 42:
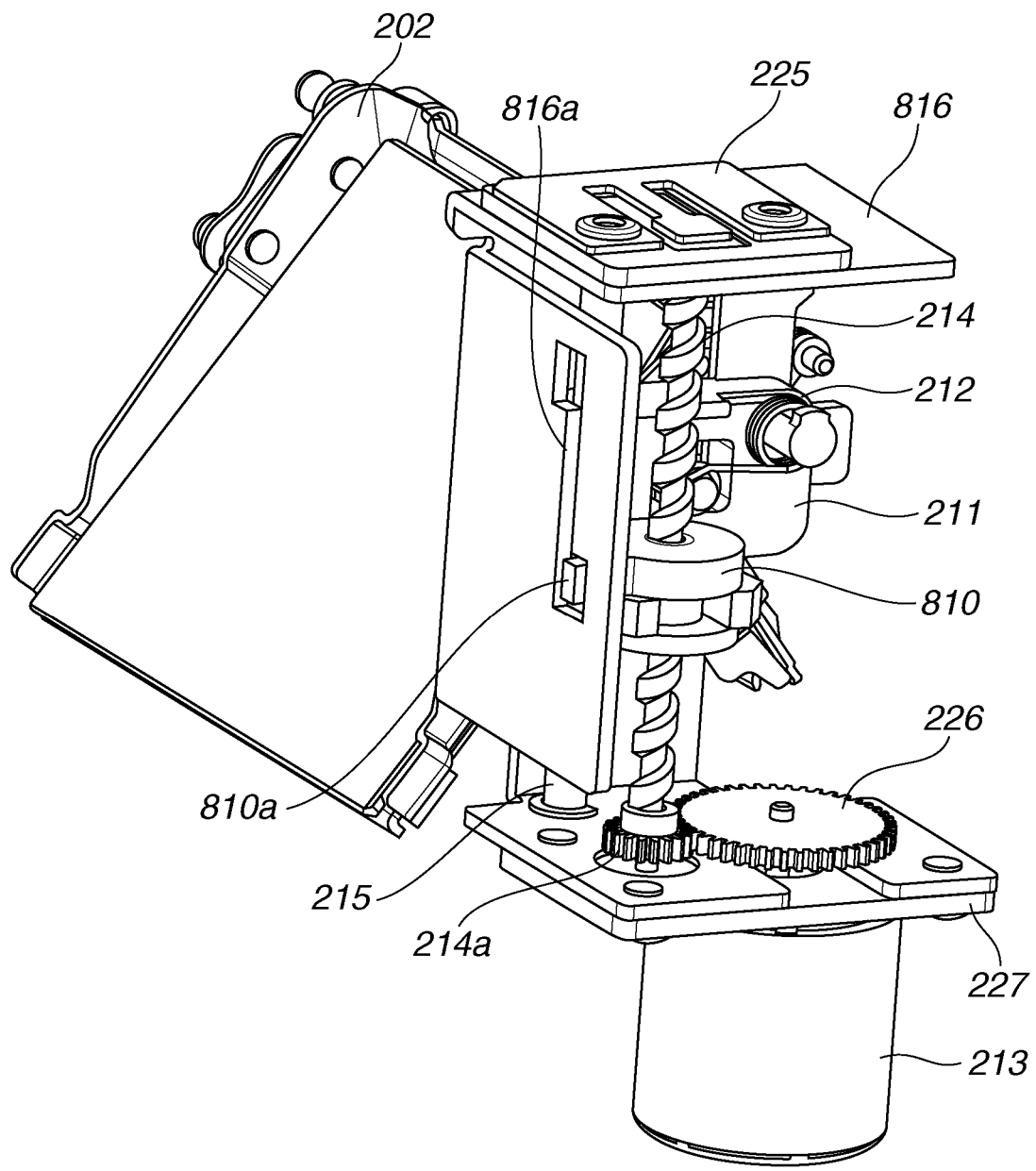
FIG. 42 is a perspective view of a mirror driving unit according to a fourth exemplary embodiment.

FIG. 42 is a perspective view of a mirror driving unit (a mirror driving device) according to the fourth exemplary embodiment.

As illustrated in FIG. 42, the mirror driving unit includes a main mirror 202, a mirror driving holder 211, a drive nut 810, a lead screw 214, a step motor 213, and a driving unit base 816.

The main mirror 202 functions as a mirror member configured to be movable between the mirror-down position and the mirror-up position. The mirror driving holder 211 function as a mirror driving member configured to drive the main mirror 202 between the mirror-down position and the mirror-up position by rectilinearly moving in the direction of arrow 300 (a fourth direction) or in the direction of arrow 301 (a third direction).

The drive nut 810 meshes with the lead screw 214 and serves as a rotary member that is rotatably mounted to the mirror driving holder 211. The step motor 213 functions as a drive source. The lead screw 214 functions as a lead screw configured to be driven by the step motor 213 to rotate in the direction of arrow 302 (a second direction) or in the direction of arrow 303 (a first direction). The driving unit base 816, in which a restriction slot 816a is formed, functions as a restriction member.

The step motor 213 is mounted to a motor base 227. The motor base 227, to which the step motor 213 is mounted, is mounted to the driving unit base 816. A pinion gear 226 is fixed to the rotational shaft of the step motor 213. The lead screw 214 is rotatably mounted to the driving unit base 816. A leaf spring 225, which urges the lead screw 214 toward the step motor 213, is mounted to the driving unit base 816.

The lead screw 214 is mounted to the driving unit base 816 in such a manner that the lead screw 214 is approximately parallel to a line connecting the position of a drive pin 202b of the main mirror 202 when the main mirror 202 is in the mirror-down position and the position of the drive pin 202b when the main mirror 202 is in the mirror-up position. The lead screw 214 includes a gear portion 214a. The gear portion 214a of the lead screw 214 meshes with the pinion gear 226. A guide shaft 215 is mounted to the driving unit base 816 in parallel with the lead screw 214.

Accordingly, the guide shaft 215 is also mounted to the driving unit base 816 in such a manner that the guide shaft 215 is approximately parallel to a line connecting the position of the drive pin 202b when the main mirror 202 is in the mirror-down position and the position of the drive pin 202b when the main mirror 202 is in the mirror-up position.

Figure 43:
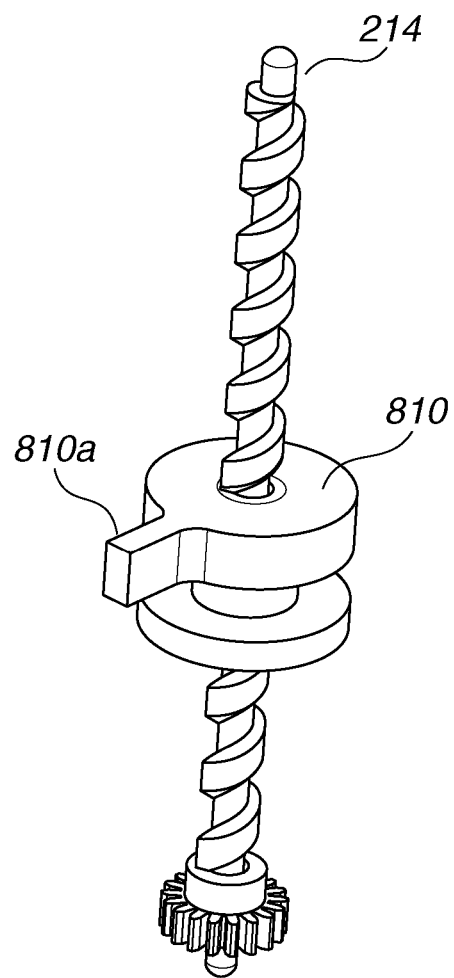
FIG. 43 is an enlarged perspective view of a lead screw and a drive nut according to the fourth exemplary embodiment.

FIG. 43 is an enlarged perspective view of the lead screw 214 and the drive nut 810. As illustrated in FIG. 43, a protrusion 810a is formed on the drive nut 810.

Figure 44:
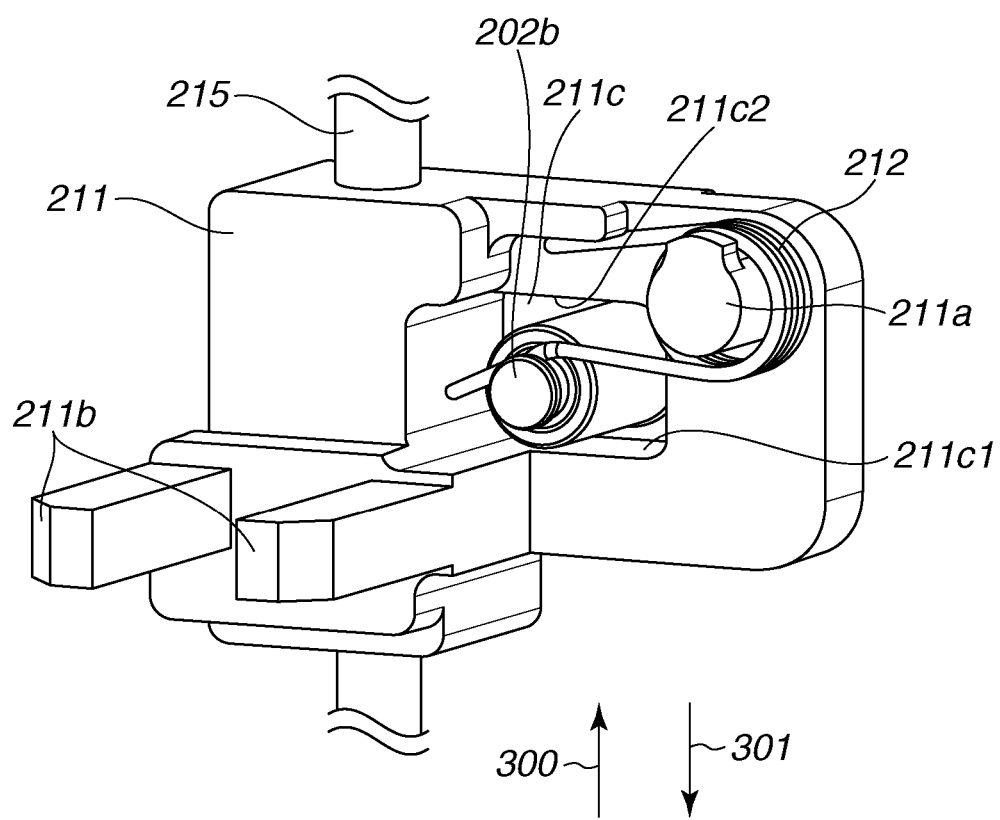
FIG. 44 is an enlarged perspective view of a mirror driving holder according to the fourth exemplary embodiment.

FIG. 44 is an enlarged perspective view of the mirror driving holder 211. The mirror driving holder 211 is configured to rectilinearly move in the direction of arrow 300 or arrow 301 while being guided by the guide shaft 215.

As illustrated in FIG. 44, a spring mounting portion 211a, a drive nut holding portion 211b, and a drive pin engaging portion 211c are formed on the mirror driving holder 211. The coiled portion of a torsion spring 212 is freely fitted on the spring mounting portion 211a. The drive pin 202b, which is formed on the main mirror 202, is inserted into the drive pin engaging portion 211c. Drive pin stoppers 211c1 and 211c2 are formed on the drive pin engaging portion 211c.

One end of the torsion spring 212, which is mounted on the spring mounting portion 211a, is supported by the mirror driving holder 211, and the other end of the torsion spring 212 is supported by the drive pin 202b. This enables the torsion spring 212 to urge the drive pin 202b toward the drive pin stopper 211c1.

The drive nut 810, which meshes with the lead screw 214, is rotatably held by the drive nut holding portion 211b.

Figure 45:
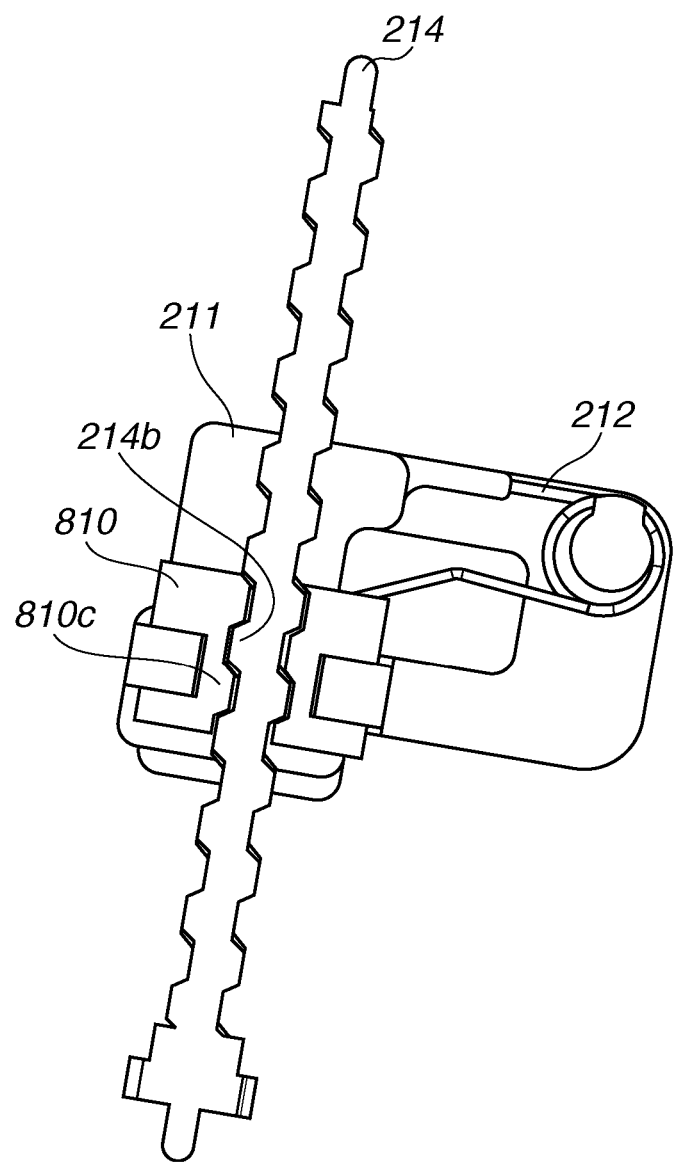
FIG. 45 is a sectional view of the lead screw and a drive nut taken along a rotational center axis of the lead screw according to the fourth exemplary embodiment.

FIG. 45 is a sectional view of the lead screw 214 and the drive nut 810 taken along the rotational center axis of the lead screw 214. As illustrated in FIG. 45, the tooth 214b of the lead screw 214 meshes with the tooth 810c of the drive nut 810. When the lead screw 214 rotates, the drive nut 810 also rotates in the same direction as the rotational direction of the lead screw 214 due to the frictional force occurring at the contact surface between the tooth 214b of the lead screw 214 and the tooth 810c of the drive nut 810.

Therefore, when the lead screw 214 is driven to rotate, the drive nut 810 rotates together with the lead screw 214 without rectilinearly moving along the lead screw 214. In other words, when the drive nut 810 is allowed to rotate relative to the mirror driving holder 211, the drive nut 810 and the mirror driving holder 211 do not rectilinearly move even when the lead screw 214 is driven to rotate.

Figure 46:
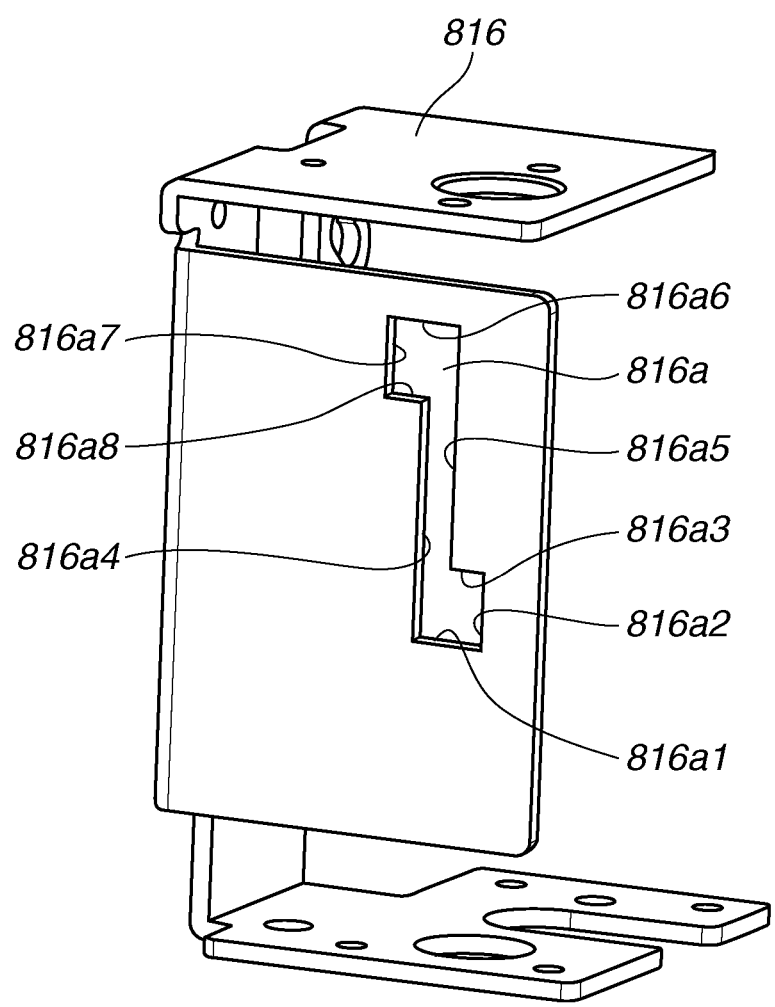
FIG. 46 is an enlarged perspective view of a driving unit base according to the fourth exemplary embodiment.

FIG. 46 is an enlarged perspective view of the driving unit base 816. As illustrated in FIG. 46, the restriction slot 816a is formed in the driving unit base 816. The restriction slot 816a has a first surface 816a1 to an eighth surface 816a8. Each of the first surface 816a1, the third surface 816a3, the sixth surface 816a6, and the eighth surface 816a8 is formed to be a surface approximately perpendicular to the axial direction of the lead screw 214. Each of the second surface 816a2, the fourth surface 816a4, the fifth surface 816a5, and the seventh surface 816a7 is formed to be a surface approximately parallel to the axial direction of the lead screw 214. As illustrated in FIG. 42, when the lead screw 214, with which the drive nut 810 is meshed, is mounted to the driving unit base 816, the protrusion 810a of the drive nut 810 engages with the restriction slot 816a.

FIGS. 47A, 47B, and 47C to FIGS. 56A, 56B, and 56C illustrate the mirror driving unit driving the main mirror 202 and the sub-mirror 203 between the mirror-down position and the mirror-up position according to the fourth exemplary embodiment.

Figure 47A:
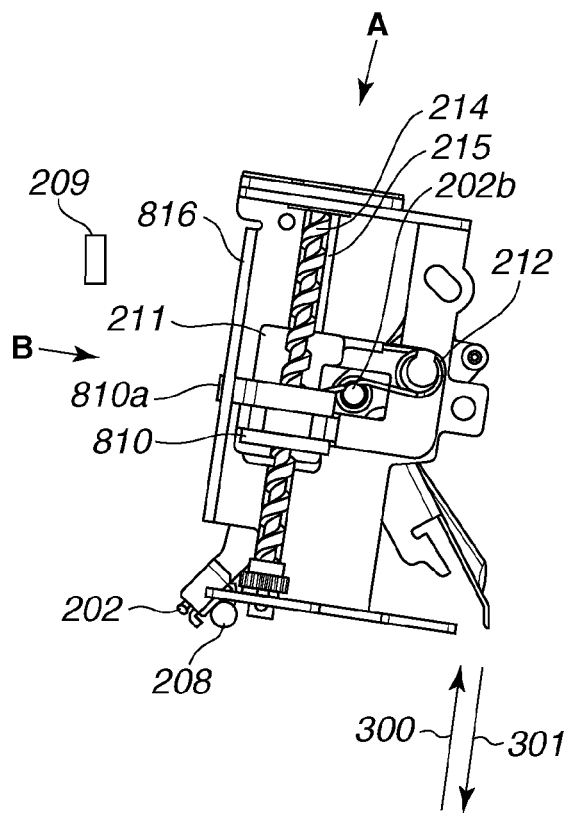
Figure 47B:
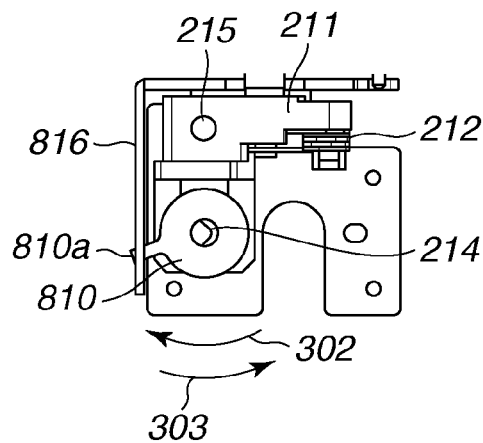
Figure 47C:
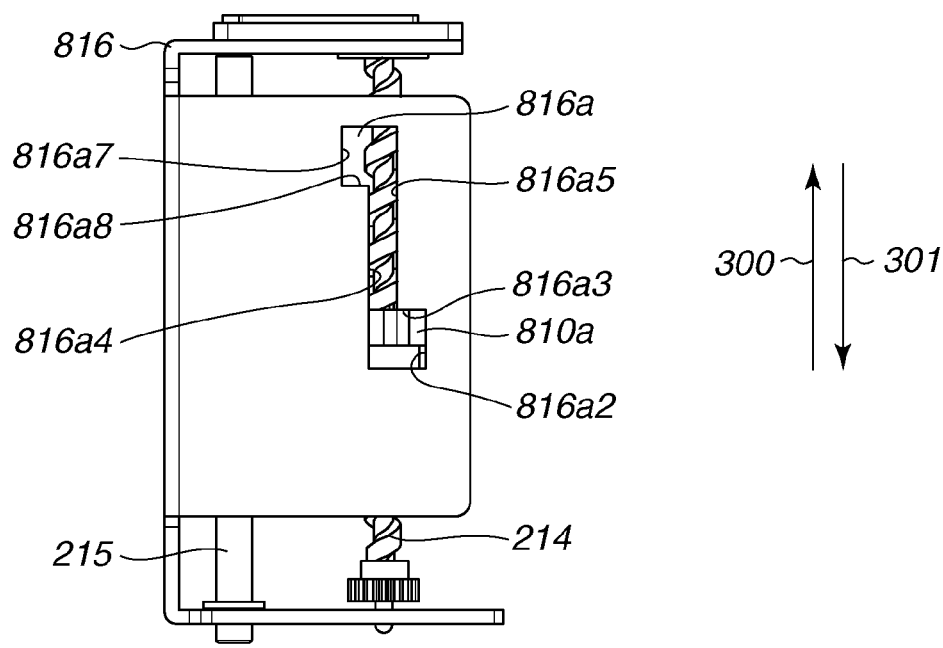

FIG. 47A is a side view of the mirror driving unit when the main mirror 202 and the sub-mirror 203 are in the mirror-down position. FIG. 47B illustrates the mirror driving holder 211, the drive nut 810, the torsion spring 212, the lead screw 214, the guide shaft 215, and the driving unit base 816 in the state illustrated in FIG. 47A as viewed from the direction A in FIG. 47A. FIG. 47C illustrates the drive nut 810, the lead screw 214, the guide shaft 215, and the driving unit base 816 in the state illustrated in FIG. 47A as viewed from the direction B in FIG. 47A.

As illustrated in FIG. 47A, when the main mirror 202 and the sub-mirror 203 are in the mirror-down position, the main mirror 202 is in contact with the down stopper 208, and the drive pin 202b is not in contact with the drive pin stopper 211c1. Accordingly, the angle of the main mirror 202 in the mirror-down position is determined only by the position of the down stopper 208 and the position of the main mirror rotational shaft 202c. Therefore, there are no variations in position of the main mirror 202 and the sub-mirror 203 in the mirror-down position due to any mounting error of the mirror driving unit or any component tolerance of the mirror driving unit.

As illustrated in FIG. 47C, the protrusion 810a of the drive nut 810 is in contact with the second surface 816a2 of the restriction slot 816a. At this time, the upper end surface of the protrusion 810a is latched by the third surface 816a3 of the restriction slot 816a, so that the drive nut 810 is restricted from rectilinearly moving in the direction of arrow 300. In this state, the mirror driving holder 211 is also restricted from rectilinearly moving in the direction of arrow 300.

Accordingly, in the state illustrated in FIG. 47A, the main mirror 202 and the sub-mirror 203 can be kept in the mirror-down position without the step motor 213 being energized.

In the state illustrated in FIG. 47A, the restriction slot 816a restricts the rotation in the direction of arrow 303 and the rectilinear movement in the direction of arrow 300 of the drive nut 810, and allows the rotation in the direction of arrow 302 and the rectilinear movement in the direction of arrow 301 of the drive nut 810.

Figure 48A:
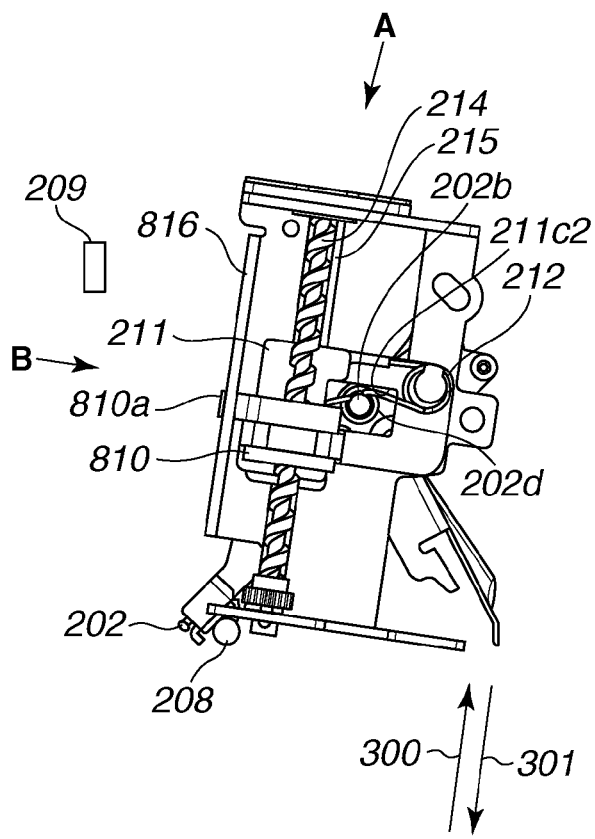
Figure 48B:
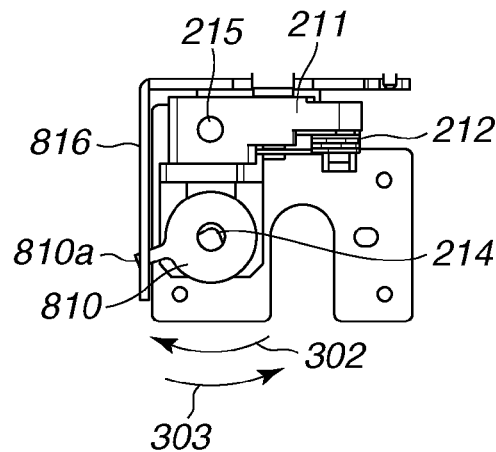
Figure 48C:
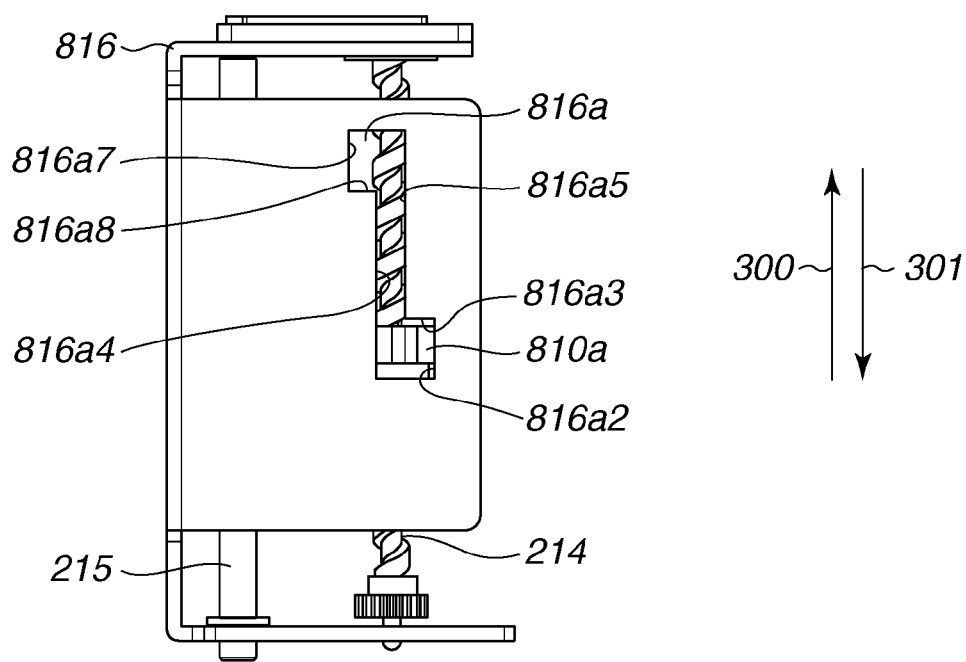

As the lead screw 214 is driven by the step motor 213 to rotate in the direction of arrow 303 from the state illustrated in FIG. 47A, the mirror driving unit comes into the state illustrated in FIGS. 48A, 48B, and 48C.

FIG. 48A is a side view of the mirror driving unit when the main mirror 202 and the sub-mirror 203 are in the mirror-down position. FIG. 48B illustrates the mirror driving holder 211, the drive nut 810, the torsion spring 212, the lead screw 214, the guide shaft 215, and the driving unit base 816 in the state illustrated in FIG. 48A as viewed from the direction A in FIG. 48A. FIG. 48C illustrates the drive nut 810, the lead screw 214, the guide shaft 215, and the driving unit base 816 in the state illustrated in FIG. 48A as viewed from the direction B in FIG. 48A.

When the lead screw 214 is driven to rotate in the direction of arrow 303, as illustrated in FIG. 48C, the drive nut 810 and the mirror driving holder 211 rectilinearly move in the direction of arrow 301 while the protrusion 810a is in contact with the second surface 816a2 of the restriction slot 816a. At this time, since the main mirror 202 is in contact with the down stopper 208, as illustrated in FIG. 48A, the drive pin 202b contacts the drive pin stopper 211c2 against the urging force of the torsion spring 212.

As illustrated in FIG. 48C, a clearance occurs between the upper end surface of the protrusion 810a and the third surface 816a3 of the restriction slot 816a. Furthermore, at this time, a clearance also occurs between the lower end surface of the protrusion 810a and the first surface 816a1 of the restriction slot 816a.

In the state illustrated in FIG. 48A, the restriction slot 816a restricts the rotation in the direction of arrow 303 of the drive nut 810, and allows the rotation in the direction of arrow 302 and the rectilinear movement in the direction of arrow 300 and in the direction of arrow 301 of the drive nut 810.

Figure 49A:
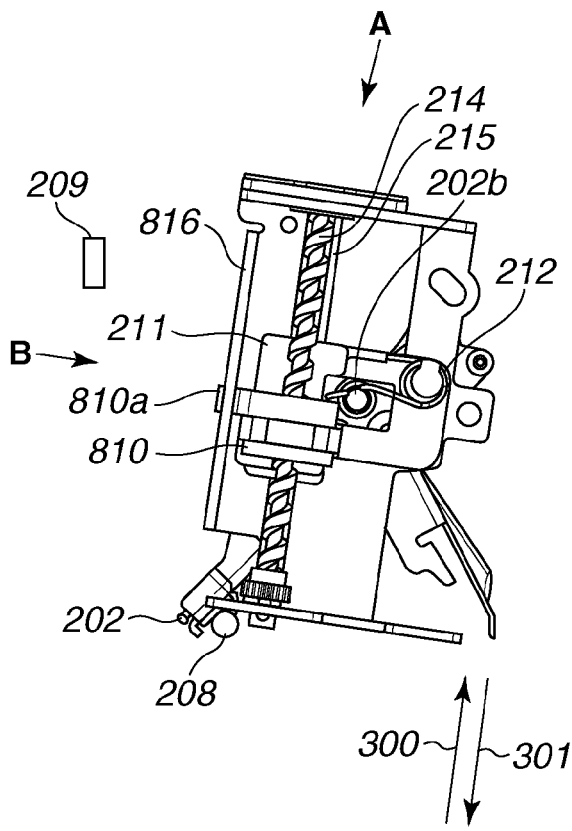
Figure 49B:
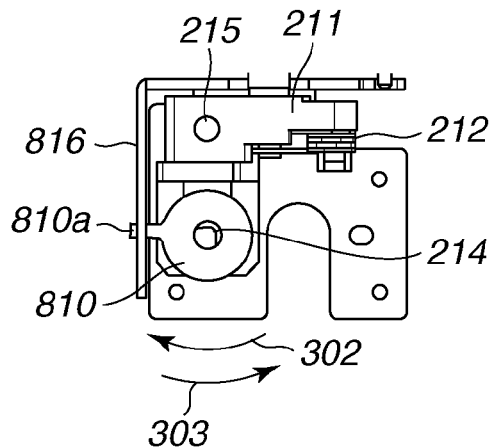
Figure 49C:
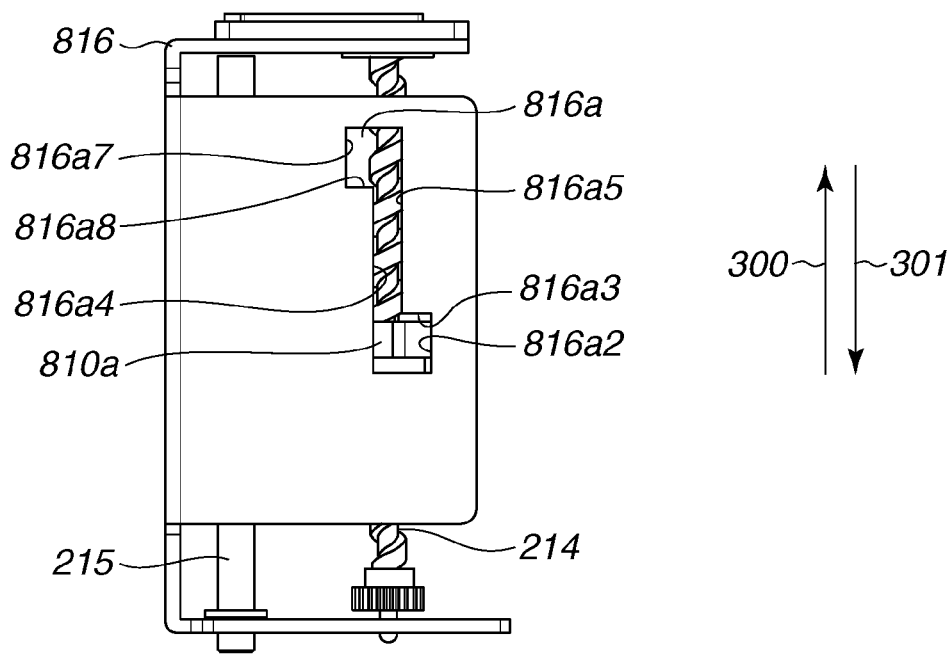

As the lead screw 214 is driven by the step motor 213 to rotate in the direction of arrow 302 from the state illustrated in FIG. 48A, the mirror driving unit comes into the state illustrated in FIGS. 49A, 49B, and 49C.

FIG. 49A is a side view of the mirror driving unit when the main mirror 202 and the sub-mirror 203 are in the mirror-down position. FIG. 49B illustrates the mirror driving holder 211, the drive nut 810, the torsion spring 212, the lead screw 214, the guide shaft 215, and the driving unit base 816 in the state illustrated in FIG. 49A as viewed from the direction A in FIG. 49A. FIG. 49C illustrates the drive nut 810, the lead screw 214, the guide shaft 215, and the driving unit base 816 in the state illustrated in FIG. 49A as viewed from the direction B in FIG. 49A.

As illustrated in FIGS. 49B and 49C, when the lead screw 214 is driven to rotate in the direction of arrow 302, the drive nut 810 rotates in the direction of arrow 302 until the protrusion 810a contacts the fourth surface 816a4 of the restriction slot 816a. As illustrated in FIG. 49C, there are clearances between the restriction slot 816a and the upper end surface and the lower end surface of the protrusion 810a. Therefore, the drive nut 810 can be rotated in the direction of arrow 302 from the state illustrated in FIG. 48A to the state illustrated in FIG. 49A without being affected by a friction which would otherwise occur between the restriction slot 816*a* and the protrusion 810*a*.

In the state illustrated in FIG. 49A, the restriction slot 816*a* restricts the rotation in the direction of arrow 302 of the drive nut 810, and allows the rotation in the direction of arrow 303 and the rectilinear movement in the direction of arrow 300 and in the direction of arrow 301 of the drive nut 810.

Figure 50A:
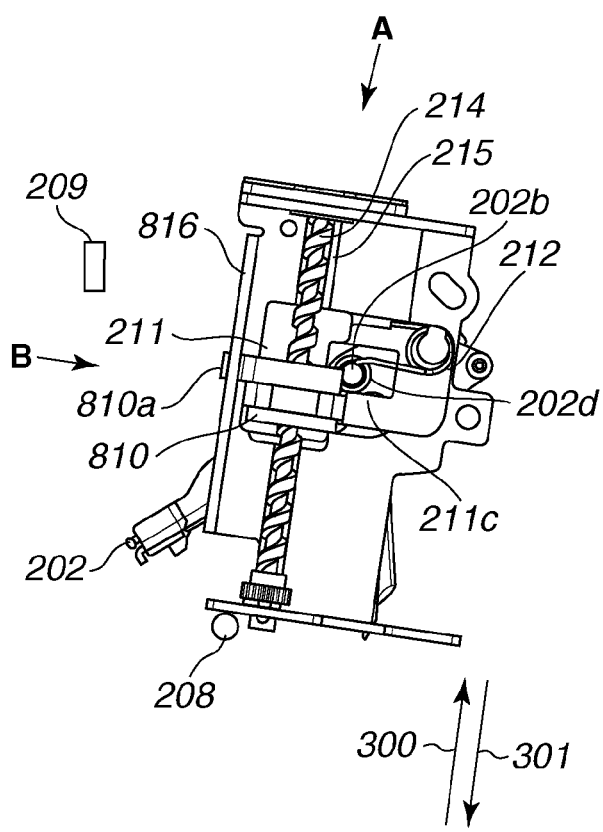
Figure 50B:
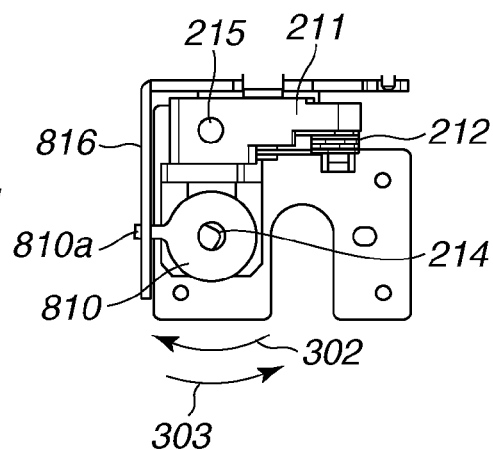
Figure 50C:
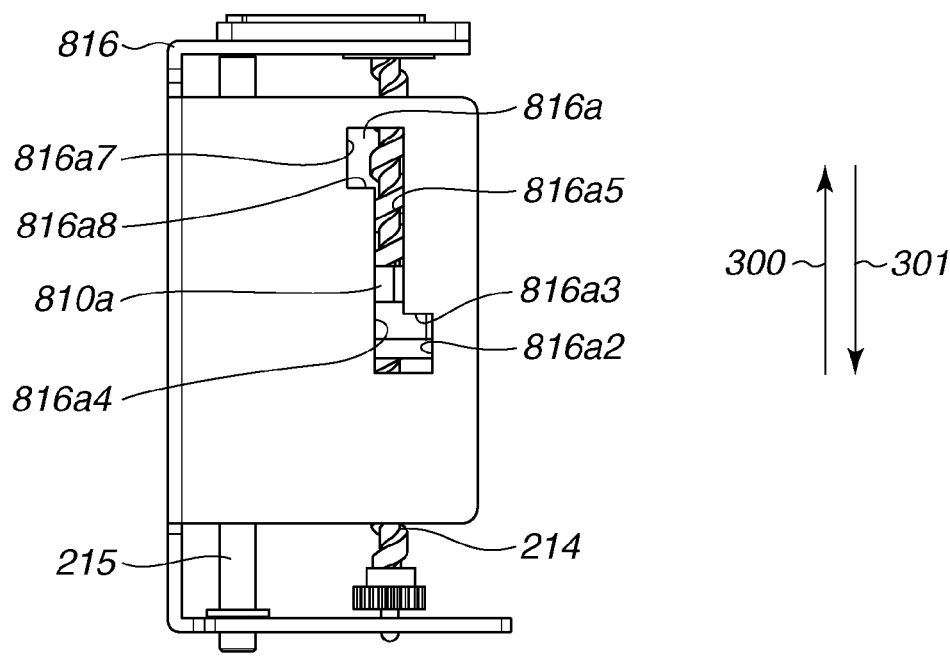

As the lead screw 214 is driven by the step motor 213 to rotate in the direction of arrow 302 from the state illustrated in FIG. 49A, the mirror driving unit comes into the state illustrated in FIGS. 50A, 50B, and 50C.

FIG. 50A is a side view of the mirror driving unit when the main mirror 202 and the sub-mirror 203 are performing the mirror-up operation. FIG. 50B illustrates the mirror driving holder 211, the drive nut 810, the torsion spring 212, the lead screw 214, the guide shaft 215, and the driving unit base 816 in the state illustrated in FIG. 50A as viewed from the direction A in FIG. 50A. FIG. 50C illustrates the drive nut 810, the lead screw 214, the guide shaft 215, and the driving unit base 816 in the state illustrated in FIG. 50A as viewed from the direction B in FIG. 50A.

When the lead screw 214 is driven to rotate in the direction of arrow 302, as illustrated in FIG. 50C, the drive nut 810 and the mirror driving holder 211 rectilinearly move in the direction of arrow 300 while the protrusion 810*a* is in contact with the fourth surface 816*a*4 of the restriction slot 816*a*. Accordingly, as illustrated in FIG. 50A, the main mirror 202 and the sub-mirror 203 start the mirror-up operation, and the main mirror 202 moves away from the down stopper 208.

In the state illustrated in FIG. 50A, the restriction slot 816*a* restricts the rotation in the direction of arrow 302 of the drive nut 810, and allows the rotation in the direction of arrow 303 and the rectilinear movement in the direction of arrow 300 and in the direction of arrow 301 of the drive nut 810. Even in the state illustrated in FIG. 50A, the restriction slot 816*a* allows the rotation in the direction of arrow 303 of the drive nut 810, but the allowable amount of rotation of the drive nut 810 is smaller than that illustrated in FIG. 49A.

Figure 51A:
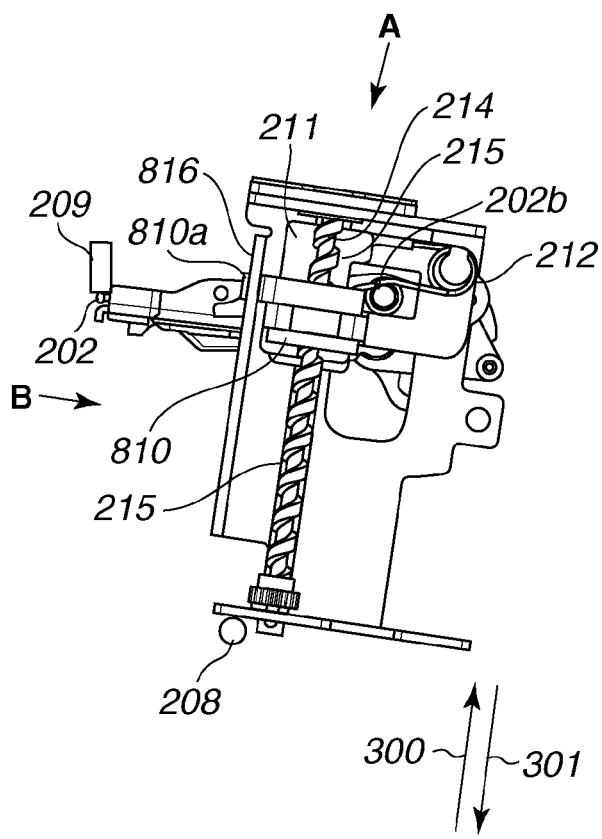
Figure 51B:
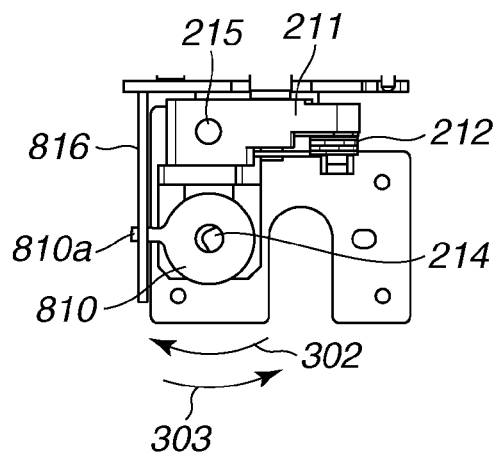
Figure 51C:
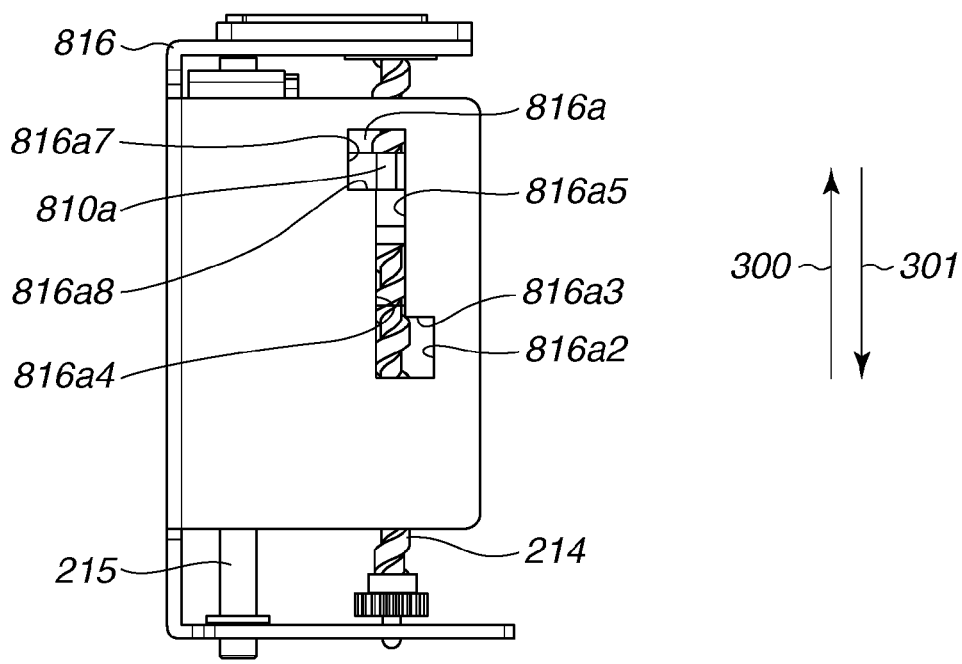

As the lead screw 214 is driven by the step motor 213 to rotate in the direction of arrow 302 from the state illustrated in FIG. 50A, the mirror driving unit comes into the state illustrated in FIGS. 51A, 51B, and 51C.

FIG. 51A is a side view of the mirror driving unit when the main mirror 202 and the sub-mirror 203 are in the mirror-up position. FIG. 51B illustrates the mirror driving holder 211, the drive nut 810, the torsion spring 212, the lead screw 214, the guide shaft 215, and the driving unit base 816 in the state illustrated in FIG. 51A as viewed from the direction A in FIG. 51A. FIG. 51C illustrates the drive nut 810, the lead screw 214, the guide shaft 215, and the driving unit base 816 in the state illustrated in FIG. 51A as viewed from the direction B in FIG. 51A.

As illustrated in FIG. 51A, when the main mirror 202 and the sub-mirror 203 are in the mirror-up position, the main mirror 202 contacts the up stopper 209. Since the up stopper 209 is formed of an elastic material, such as moltoprene or rubber, for shock absorption, when the bounce of the main mirror 202 has converged, the up stopper 209 is compressed and deformed by receiving a force in the direction of arrow 300 from the main mirror 202.

The mirror-up position of the main mirror 202 is previously set in consideration of such a deformation of the up stopper 209, and is thus designed not to interfere with a photographic light flux, which passes through the photographic lens 100 and then falls on the image sensor 201.

In this state, as illustrated in FIG. 51C, the protrusion 810*a* is released from contacting the fourth surface 816*a*4 of the restriction slot 816*a*.

As illustrated in FIGS. 51A to 51C, when the main mirror 202 has been driven up to the mirror-up position, the restriction slot 816*a* allows the rotation in the direction of arrow 302 of the drive nut 810. In the state illustrated in FIGS. 51A to 51C, the restriction slot 816*a* further allows the rotation in the direction of arrow 303 and the rectilinear movement in the direction of arrow 300 and in the direction of arrow 301 of the drive nut 810.

During a period from the state illustrated in FIG. 49A to immediately before the state illustrated in FIG. 51A, the drive nut 810 is restricted from rotating in the direction of arrow 302 and is allowed to rotate in the direction of arrow 303 and to rectilinearly move in the direction of arrow 300 and in the direction of arrow 301.

Figure 52A:
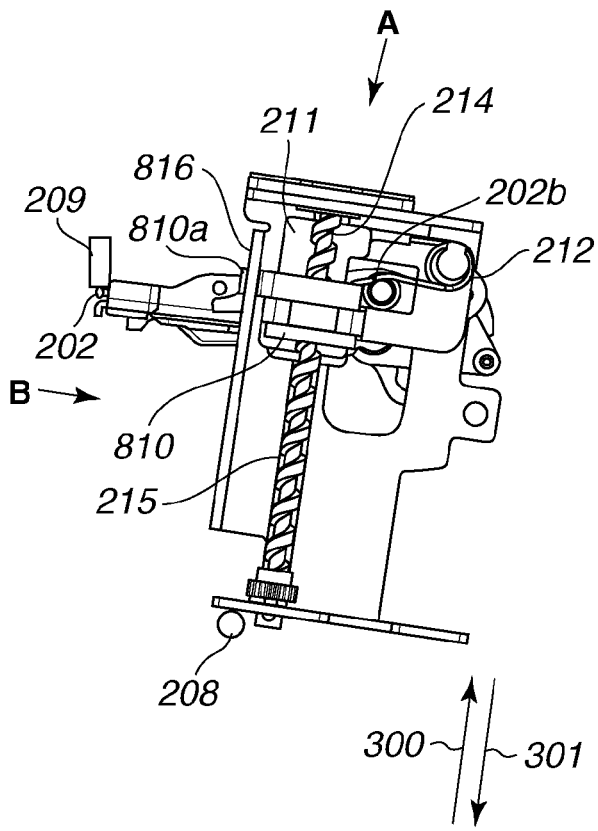
Figure 52B:
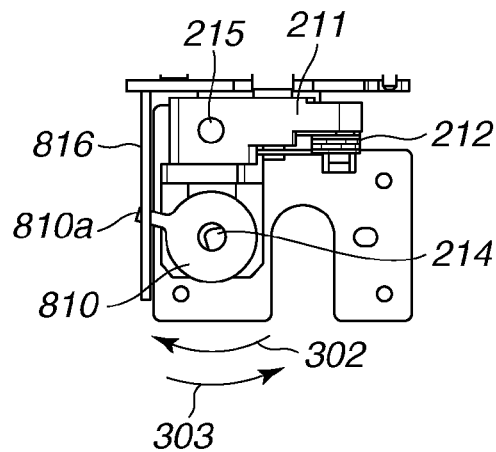
Figure 52C:
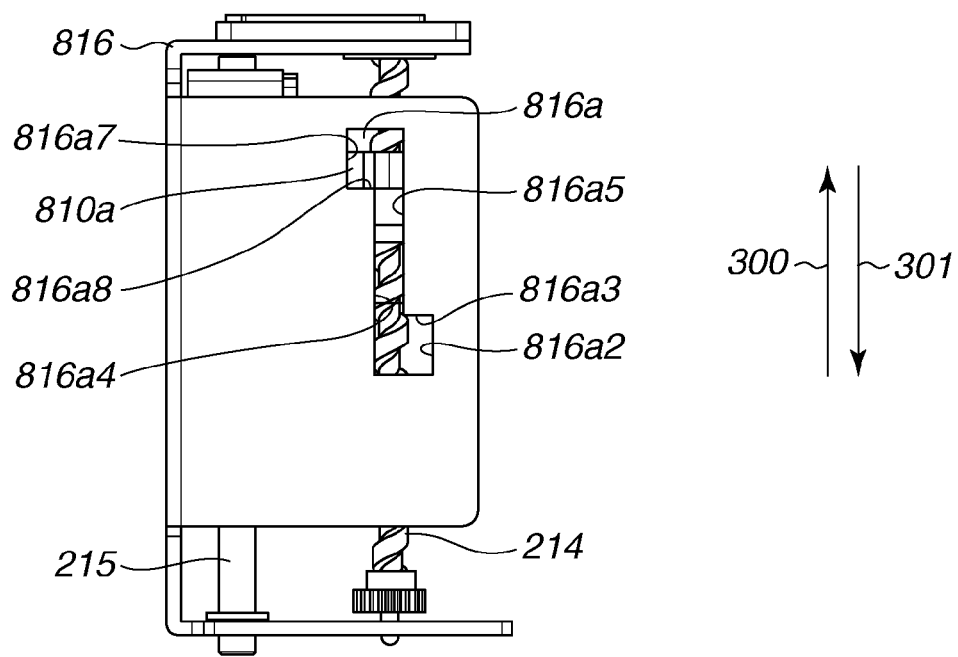

As the lead screw 214 is driven by the step motor 213 to rotate in the direction of arrow 302 from the state illustrated in FIG. 51A, the mirror driving unit comes into the state illustrated in FIGS. 52A, 52B, and 52C.

FIG. 52A is a side view of the mirror driving unit when the main mirror 202 and the sub-mirror 203 are in the mirror-up position. FIG. 52B illustrates the mirror driving holder 211, the drive nut 810, the torsion spring 212, the lead screw 214, the guide shaft 215, and the driving unit base 816 in the state illustrated in FIG. 52A as viewed from the direction A in FIG. 52A. FIG. 52C illustrates the drive nut 810, the lead screw 214, the guide shaft 215, and the driving unit base 816 in the state illustrated in FIG. 52A as viewed from the direction B in FIG. 52A.

When the lead screw 214 is driven to rotate in the direction of arrow 302, as illustrated in FIGS. 52B and 52C, the protrusion 810*a* rotates in the direction of arrow 302 until contacting the seventh surface 816*a*7 of the restriction slot 816*a*. At this time, the lower end surface of the protrusion 810*a* slides on the eighth surface 816*a*8 of the restriction slot 816*a*. Between the state illustrated in FIG. 51A and the state illustrated in FIG. 52A, the drive nut 810 rotates together with the lead screw 214 and does not rectilinearly move in the direction of arrow 300.

As illustrated in FIG. 52C, the protrusion 810*a* is in contact with the seventh surface 816*a*7 of the restriction slot 816*a*. At this time, the lower end surface of the protrusion 810*a* is latched by the eighth surface 816*a*8 of the restriction slot 816*a*, so that the drive nut 810 is restricted from rectilinearly moving in the direction of arrow 301. In this state, the mirror driving holder 211 is also restricted from rectilinearly moving in the direction of arrow 301.

Accordingly, in the state illustrated in FIG. 52A, the main mirror 202 and the sub-mirror 203 can be kept in the mirror-up position without the step motor 213 being energized.

In the state illustrated in FIG. 52A, the drive nut 810 is restricted from rotating in the direction of arrow 302 and from rectilinearly moving in the direction of arrow 301 and is allowed to rotate in the direction of arrow 303 and to rectilinearly move in the direction of arrow 300.

Figure 53A:
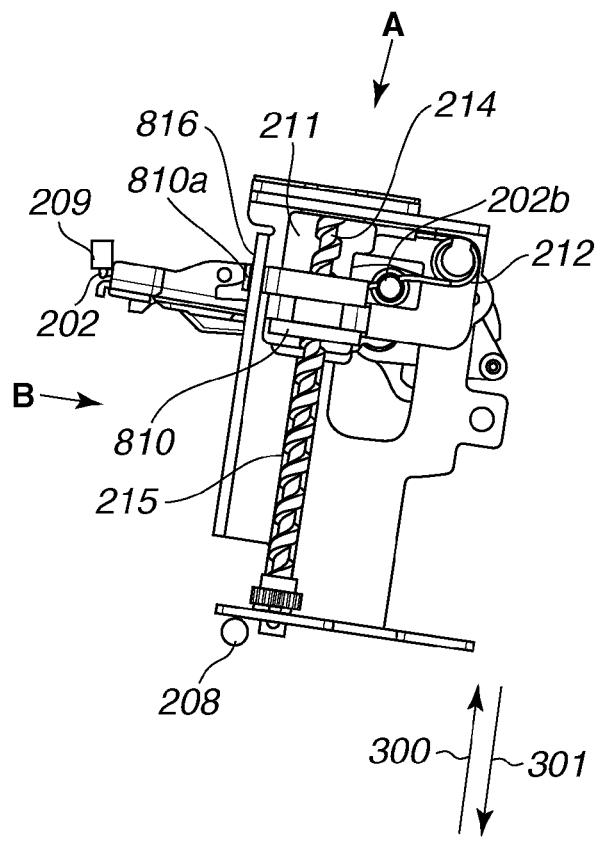
Figure 53B:
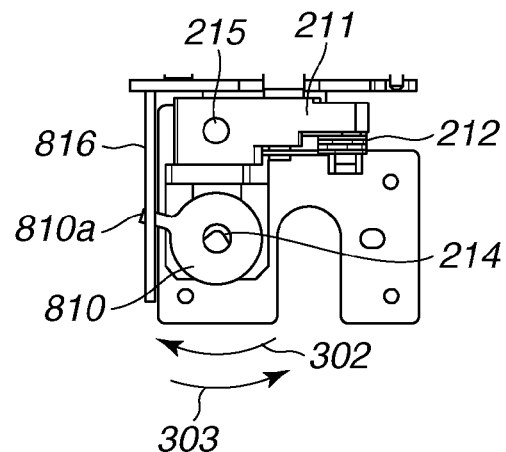
Figure 53C:
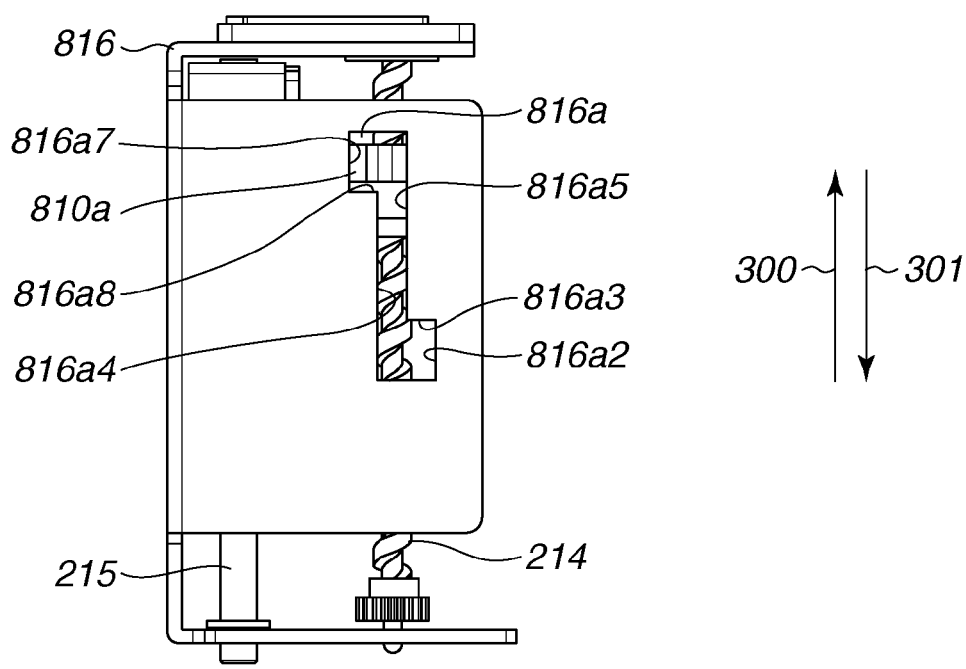

As the lead screw 214 is driven by the step motor 213 to rotate in the direction of arrow 302 from the state illustrated in FIG. 52A, the mirror driving unit comes into the state illustrated in FIGS. 53A, 53B, and 53C.

FIG. 53A is a side view of the mirror driving unit when the main mirror 202 and the sub-mirror 203 are in the mirror-up position. FIG. 53B illustrates the mirror driving holder 211, the drive nut 810, the torsion spring 212, the lead screw 214, the guide shaft 215, and the driving unit base 816 in the state illustrated in FIG. 53A as viewed from the direction A in FIG. 53A. FIG. 53C illustrates the drive nut 810, the lead screw 214, the guide shaft 215, and the driving unit base 816 in the state illustrated in FIG. 53A as viewed from the direction B in FIG. 53A.

When the lead screw 214 is driven to rotate in the direction of arrow 302, as illustrated in FIG. 53C, the drive nut 810 and the mirror driving holder 211 rectilinearly move in the direction of arrow 300 with the protrusion 810a kept in contact with the seventh surface 816a7 of the restriction slot 816a. At this time, the main mirror 202 further compresses and deforms the up stopper 209.

As illustrated in FIG. 53C, a clearance also occurs between the lower end surface of the projection 810a and the eighth surface 816a8 of the restriction slot 816a. Furthermore, at this time, a clearance occurs between the upper end surface of the projection 810a and the sixth surface 816a6 of the restriction slot 816a.

In the state illustrated in FIG. 53A, the restriction slot 816a restricts the rotation in the direction of arrow 302 of the drive nut 810, and allows the rotation in the direction of arrow 303 and the rectilinear movement in the direction of arrow 300 and in the direction of arrow 301 of the drive nut 810.

As the lead screw 214 is driven by the step motor 213 to rotate in the direction of arrow 303 from the state illustrated in FIG. 53A, the mirror driving unit comes into the state illustrated in FIGS. 54A, 54B, and 54C.

FIG. 54A is a side view of the mirror driving unit when the main mirror 202 and the sub-mirror 203 are in the mirror-up position. FIG. 54B illustrates the mirror driving holder 211, the drive nut 810, the torsion spring 212, the lead screw 214, the guide shaft 215, and the driving unit base 816 in the state illustrated in FIG. 54A as viewed from the direction A in FIG. 54A. FIG. 54C illustrates the drive nut 810, the lead screw 214, the guide shaft 215, and the driving unit base 816 in the state illustrated in FIG. 54A as viewed from the direction B in FIG. 54A.

When the lead screw 214 is driven to rotate in the direction of arrow 303, as illustrated in FIGS. 54B and 54C, the drive nut 810 rotates in the direction of arrow 303 until the protrusion 810a contacts the fifth surface 816a5 of the restriction slot 816a. As illustrated in FIG. 53C, there are clearances between the restriction slot 816a and the upper end surface and the lower end surface of the protrusion 810a. Therefore, the drive nut 810 can be rotated in the direction of arrow 303 from the state illustrated in FIG. 53A to the state illustrated in FIG. 54A without being affected by a friction which would otherwise occur between the restriction slot 816a and the protrusion 810a.

As illustrated in FIG. 54A, when the mirror driving holder 211 drives the main mirror 202 to the mirror-down position, the restriction slot 816a restricts the rotation in the direction of arrow 303 of the drive nut 810, and allows the rectilinear movement in the direction of arrow 301 of the drive nut 810. In the state illustrated in FIG. 54A, the restriction slot 816a further allows the rotation in the direction of arrow 302 and the rectilinear movement in the direction of arrow 300 of the drive nut 810.

As the lead screw 214 is driven by the step motor 213 to rotate in the direction of arrow 303 from the state illustrated in FIG. 54A, the mirror driving unit comes into the state illustrated in FIGS. 55A, 55B, and 55C.

FIG. 55A is a side view of the mirror driving unit when the main mirror 202 and the sub-mirror 203 are performing the mirror-down operation. FIG. 55B illustrates the mirror driving holder 211, the drive nut 810, the torsion spring 212, the lead screw 214, the guide shaft 215, and the driving unit base 816 in the state illustrated in FIG. 55A as viewed from the direction A in FIG. 55A. FIG. 55C illustrates the drive nut 810, the lead screw 214, the guide shaft 215, and the driving unit base 816 in the state illustrated in FIG. 55A as viewed from the direction B in FIG. 55A.

When the lead screw 214 is driven to rotate in the direction of arrow 303, as illustrated in FIG. 55C, the drive nut 810 and the mirror driving holder 211 rectilinearly move in the direction of arrow 301 with the protrusion 810a kept in contact with the fifth surface 816a5 of the restriction slot 816a. Accordingly, as illustrated in FIG. 55A, the main mirror 202 and the sub-mirror 203 start the mirror-down operation, and the main mirror 202 moves away from the up stopper 209.

As illustrated in FIG. 55A, when the mirror driving holder 211 drives the main mirror 202 to the mirror-down position, the restriction slot 816a restricts the rotation in the direction of arrow 303 of the drive nut 810, and allows the rectilinear movement in the direction of arrow 301 of the drive nut 810. In the state illustrated in FIG. 55A, the restriction slot 816a further allows the rotation in the direction of arrow 302 and the rectilinear movement in the direction of arrow 300 of the drive nut 810. Even in the state illustrated in FIG. 55A, the restriction slot 816a allows the rotation in the direction of arrow 302 of the drive nut 810, but the allowable amount of rotation of the drive nut 810 is smaller than that illustrated in FIG. 54A.

Figure 56A:
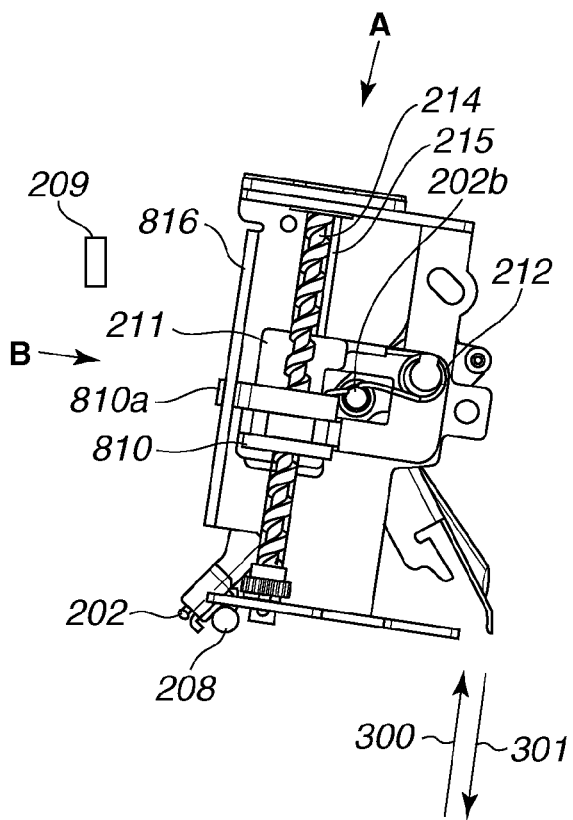
Figure 56B:
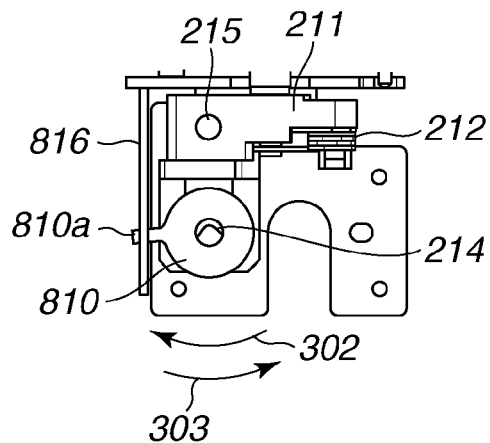
Figure 56C:
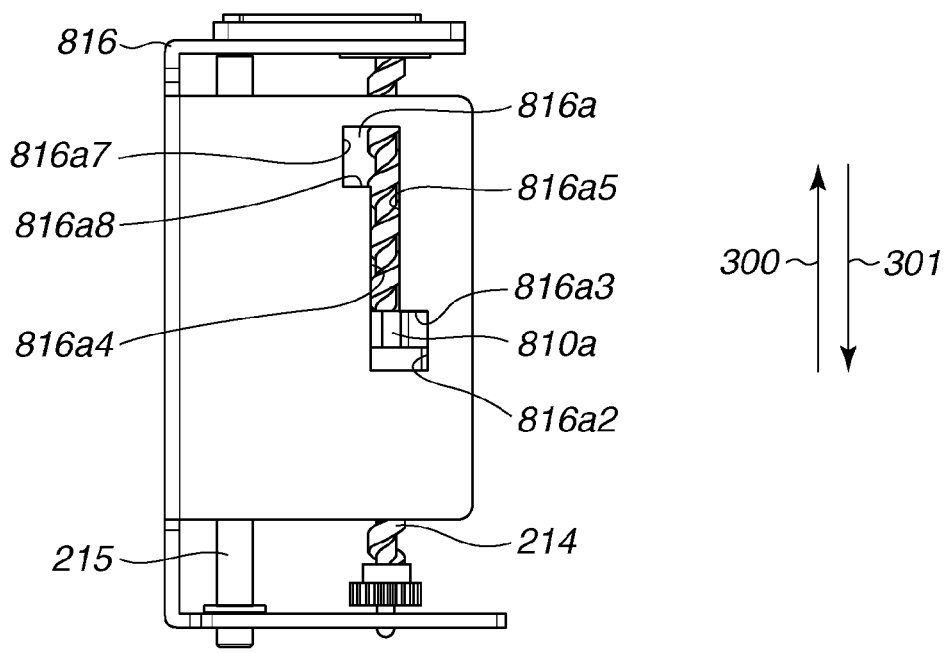

As the lead screw 214 is driven by the step motor 213 to rotate in the direction of arrow 303 from the state illustrated in FIG. 55A, the mirror driving unit comes into the state illustrated in FIGS. 56A, 56B, and 56C.

FIG. 56A is a side view of the mirror driving unit when the main mirror 202 and the sub-mirror 203 are in the mirror-down position. FIG. 56B illustrates the mirror driving holder 211, the drive nut 810, the torsion spring 212, the lead screw 214, the guide shaft 215, and the driving unit base 816 in the state illustrated in FIG. 56A as viewed from the direction A in FIG. 56A. FIG. 56C illustrates the drive nut 810, the lead screw 214, the guide shaft 215, and the driving unit base 816 in the state illustrated in FIG. 56A as viewed from the direction B in FIG. 56A.

As illustrated in FIG. 56A, when the main mirror 202 and the sub-mirror 203 are in the mirror-down position, the main mirror 202 contacts the down stopper 208.

In this state, as illustrated in FIG. 56C, the projection 810a is released from contacting the fifth surface 816a5 of the restriction slot 816a.

As illustrated in FIG. 56A, when the main mirror 202 has been driven up to the mirror-down position, the restriction slot 816a allows the rotation in the direction of arrow 303 of the drive nut 810. In the state illustrated in FIG. 56A, the restriction slot 816a further allows the rotation in the direction of arrow 302 and the rectilinear movement in the direction of arrow 300 and in the direction of arrow 301 of the drive nut 810.

During a period from the state illustrated in FIG. 54A to immediately before the state illustrated in FIG. 56A, the drive nut 810 is restricted from rotating in the direction of arrow 303 and is allowed to rotate in the direction of arrow 302 and to rectilinearly move in the direction of arrow 300 and in the direction of arrow 301.

When the lead screw 214 is driven by the step motor 213 to rotate in the direction of arrow 303 from the state illustrated in FIG. 56A, the protrusion 810a rotates in the direction of arrow 303 until contacting the second surface 816a2 of the restriction slot 816a. At this time, the upper end surface of the protrusion 810a slides on the third surface 816a3 of the restriction slot 816a. Between the state illustrated in FIG. 56A and the state illustrated in FIG. 47A, the drive nut 810 rotates together with the lead screw 214 and does not rectilinearly move in the direction of arrow 301.

When the camera body 200 starts the shooting operation with the main mirror 202 and the sub-mirror 203 kept in the mirror-down position illustrated in FIG. 47A, the step motor 213 drives and rotates the lead screw 214 in the direction of arrow 303 to cause the mirror driving unit to come into the state illustrated in FIG. 48A. After that, the step motor 213 drives and rotates the lead screw 214 in the direction of arrow 302 to start the mirror-up operation described with reference to FIGS. 49A, 49B, and 49C to FIGS. 52A, 52B, and 52C. Then, the camera body 200 performs the exposure operation with the main mirror 202 and the sub-mirror 203 kept in the mirror-up position illustrated in FIG. 52A. When the exposure operation is completed, the step motor 213 drives and rotates the lead screw 214 in the direction of arrow 302 to cause the mirror driving unit to come into the state illustrated in FIG. 53A. After that, the step motor 213 drives and rotates the lead screw 214 in the direction of arrow 303 to perform the mirror-down operation described with reference to FIGS. 54A, 54B, and 54C to FIGS. 56A, 56B, and 56C.

In the present exemplary embodiment, when the mirror driving holder 211 drives the main mirror 202 between the mirror-down position and the mirror-up position, the rotation of the drive nut 810 relative to the mirror driving holder 211 is restricted. Accordingly, the drive nut 810 rectilinearly moves together with the mirror driving holder 211. When the mirror driving holder 211 has driven the main mirror 202 up to the mirror-down position or the mirror-up position, the rotation of the drive nut 810 relative to the mirror driving holder 211 is allowed and the rectilinear movement of the drive nut 810 is restricted. Accordingly, a mirror member can be held in the mirror-down position without consumption of electric power, and any drive source for holding the mirror member in the mirror-down position is not required.

Figure 57:
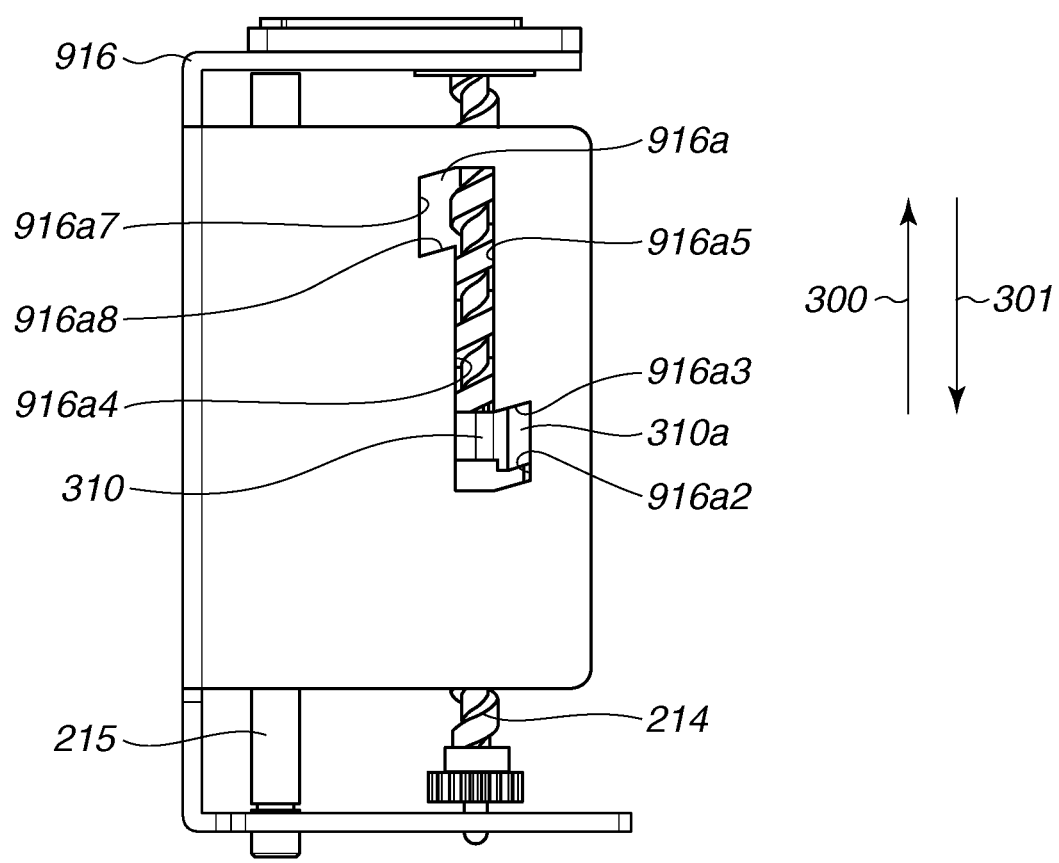
FIG. 57 is a side view illustrating components of the mirror driving unit according to a modification example of the fourth exemplary embodiment.

FIG. 57 illustrates a modification example of the fourth exemplary embodiment. FIG. 57 corresponds to FIG. 47C. The modification example illustrated in FIG. 57 differs from the above-described fourth exemplary embodiment in the shape of a projection 310a of a drive nut 310, which corresponds to the drive nut 810, and the shape of a restriction slot 916a of a driving unit base 916, which corresponds to the driving unit base 816.

More specifically, in above-described fourth exemplary embodiment, each of the third surface 816a3 and the eighth surface 816a8 of the restriction slot 816a is formed to be a surface approximately perpendicular to the axial direction of the lead screw 214. In contrast, in the modification example of the fourth exemplary embodiment, a third surface 916a3 of the restriction slot 916a, on which the projection 310a of the drive nut 310 slides when the main mirror 202 comes into the mirror-down position, is formed to be a surface inclined upward. Also, an eighth surface 916a8 of the restriction slot 916a, on which the projection 310a of the drive nut 310 slides when the main mirror 202 comes into the mirror-up position, is formed to be a surface inclined downward.

Accordingly, in the modification example of the fourth exemplary embodiment, the main mirror 202 and the sub-mirror 203 can be more surely kept in the mirror-down position or in the mirror-up position without the step motor 213 being energized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-125067 filed Jun. 13, 2013, No. 2013-125068 filed Jun. 13, 2013, and No. 2014-040965 filed Mar. 3, 2014, which are hereby incorporated by reference herein in their entirety.

What is claimed is:

1. A mirror driving device comprising:
a drive source;
a lead screw configured to be driven by the drive source;
a mirror member configured to be movable between a mirror-down position and a mirror-up position;
a mirror driving member configured to rectilinearly move to drive the mirror member between the mirror-down position and the mirror-up position; and
a restriction unit configured to switch between a restriction state that restricts a rectilinear movement of the mirror driving member and a restriction release state that releases the restriction state,
wherein, in a case where the mirror member is in the mirror-up position or the mirror-down position, the restriction unit switches between the restriction state and the restriction release state in response to driving of the lead screw without allowing the mirror driving member to rectilinearly move, and
wherein the mirror driving member rectilinearly moves in response to driving of the lead screw after the restriction unit switches from the restriction state to the restriction release state.

2. The mirror driving device according to claim 1, wherein the restriction unit comprises:
a restriction member configured to be movable between a restriction position that restricts the rectilinear movement of the mirror driving member and a restriction release position that releases the restriction state; and
a drive member meshing with the lead screw and configured to rectilinearly move as the lead screw is driven to drive the restriction member between the restriction position and the restriction release position,
wherein, in a case where the mirror member is in the mirror-down position, the restriction member moves between the restriction position and the restriction release position,
wherein a first drive region is set in which, as the lead screw is driven, the drive member rectilinearly moves and the mirror driving member does not rectilinearly move, and
wherein, in the first drive region, the drive member drives the restriction member from the restriction position to the restriction release position.

3. The mirror driving device according to claim 2, wherein, in a case where the mirror member is in the mirror-up position, the restriction member is in the restriction position, and
wherein, in the first drive region, the drive member drives the restriction member from the restriction position to the restriction release position.

4. The mirror driving device according to claim 2, wherein a second drive region is set in which, as the lead screw is driven, the drive member and the mirror driving member rectilinearly move, and
wherein, in the second drive region, the drive member holds the restriction member in the restriction release position.

5. The mirror driving device according to claim 2, wherein the restriction unit further comprises a first urging member configured to urge the restriction member toward the restriction position, and
wherein the drive member drives the restriction member from the restriction position to the restriction release position against an urging force of the first urging member.

6. The mirror driving device according to claim 2, wherein the mirror driving member meshes with the lead screw, and
wherein the first drive region is set by setting an amount of backlash between the lead screw and the mirror driving member larger than an amount of backlash between the lead screw and the drive member.

7. The mirror driving device according to claim 1, wherein the mirror driving member includes a mirror driving portion engaging with the mirror member, and a rotatable meshing portion meshing with the lead screw and rotatably mounted to the mirror driving portion,
wherein, in a case where the restriction unit is in the restriction state, the rotatable meshing portion is allowed to rotate relative to the mirror driving portion, and the mirror driving member does not rectilinearly move even if the lead screw is driven to rotate, and
wherein, in a case where the restriction unit is in the restriction release state, the rotatable meshing portion is restricted from rotating relative to the mirror driving portion, and the mirror driving member rectilinearly moves as the lead screw is driven to rotate.

8. The mirror driving device according to claim 7, wherein a projection is formed on the rotatable meshing portion, and
wherein, in a case where the projection does not contact the mirror driving portion, the rotatable meshing portion is not restricted from rotating relative to the mirror driving portion, and
wherein, in a case where the projection contacts the mirror driving portion, the rotatable meshing portion is restricted from rotating relative to the mirror driving portion.

9. The mirror driving device according to claim 8, wherein the mirror driving member further includes a second urging member configured to urge the projection in a direction opposite to a direction in which the projection contacts the mirror driving portion, and
wherein, in a case where the projection contacts the mirror driving portion, the second urging member urges the projection in the direction.

10. The mirror driving device according to claim 2, wherein a recessed portion having a predetermined width size in a direction of the rectilinear movement is formed on the drive member,
wherein an engaging portion engaging with the recessed portion is formed on the mirror driving member, and
wherein the first drive region is set by providing a clearance between the recessed portion and the engaging portion by forming the width size of the recessed portion larger than a width of the engaging portion in the direction of the rectilinear movement of the mirror driving member.

11. A mirror driving device comprising:
a drive source;
a lead screw configured to be driven by the drive source;
a mirror member configured to be movable between a mirror-down position and a mirror-up position;
a mirror driving member configured to rectilinearly move to drive the mirror member between the mirror-down position and the mirror-up position;
a rotational member meshing with the lead screw and rotatably mounted on the mirror driving member; and
a restriction member configured to restrict a rectilinear movement of the mirror driving member by engaging with at least a part of the rotational member,
wherein, in a case where the mirror member is in the mirror-up position or the mirror-down position, the restriction member allows the rotational member to rotate,
wherein, in a case where the mirror member is in the mirror-up position or the mirror-down position, the rotational member rotates between a restriction position that restricts the rectilinear movement of the mirror driving member and a restriction release position that releases the rectilinear movement from being restricted in response to driving of the lead screw, and
wherein, in a case where the mirror member is in between the mirror-up position and the mirror-down position, the rotational member rectilinearly moves together with the mirror driving member.

12. The mirror driving device according to claim 11, wherein, in a case where the mirror member is in the mirror-up position and the rotational member is in the restriction position, as the rotational member is rotated in a first direction, the rotational member moves from the restriction position to the restriction release position,
wherein, in a case where the mirror member is in the mirror-up position and the rotational member is in the restriction release position, the restriction member restricts the rotational member from rotating in the first direction, and the rotational member rectilinearly moves to the mirror-down position together with the mirror driving member, and
wherein, in a case where the mirror member is in the mirror-down position and the rotational member is in the restriction release position, as the rotational member is rotated in the first direction, the rotational member moves from the restriction release position to the restriction position.

13. The mirror driving device according to claim 12, wherein, in a case where the mirror member is in the mirror-down position and the rotational member is in the restriction position, as the rotational member is rotated in a second direction, the rotational member moves from the restriction position to the restriction release position,
wherein, in a case where the mirror member is in the mirror-down position and the rotational member is in the restriction release position, the restriction member restricts the rotational member from rotating in the second direction, and the rotational member rectilinearly moves to the mirror-up position together with the mirror driving member,
wherein, in a case where the mirror member is in the mirror-up position and the rotational member is in the restriction release position, as the rotational member is rotated in the second direction, the rotational member moves from the restriction release position to the restriction position, and
wherein the first direction and the second direction differ from each other.

* * * * *